United States Patent
Macha et al.

(10) Patent No.: US 10,810,053 B2
(45) Date of Patent: *Oct. 20, 2020

(54) METHODS, SYSTEMS AND APPARATUS TO DYNAMICALLY FACILITATE BOUNDARYLESS, HIGH AVAILABILITY M..N WORKING CONFIGURATION MANAGEMENT WITH SUPPLEMENTAL RESOURCE

(71) Applicant: Schneider Electric Systems USA, Inc., Foxboro, MA (US)

(72) Inventors: Raja Ramana Macha, Trabuco Canyon, CA (US); Andrew Lee David Kling, Salem, MA (US); Frans Middeldorp, Geldrop (NL); Nestor Jesus Camino, Jr., Hingham, MA (US); James Gerard Luth, Foxboro, MA (US); James P. McIntyre, San Jose, CA (US)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/312,335

(22) PCT Filed: Jun. 23, 2017

(86) PCT No.: PCT/US2017/039145
§ 371 (c)(1),
(2) Date: Dec. 21, 2018

(87) PCT Pub. No.: WO2017/223537
PCT Pub. Date: Dec. 28, 2017

(65) Prior Publication Data
US 2019/0347171 A1 Nov. 14, 2019

Related U.S. Application Data

(60) Provisional application No. 62/354,669, filed on Jun. 24, 2016.

(51) Int. Cl.
*G06F 9/50* (2006.01)
*G06F 11/20* (2006.01)
(Continued)

(52) U.S. Cl.
CPC ....... *G06F 9/5083* (2013.01); *G05B 19/4155* (2013.01); *G06F 9/5088* (2013.01);
(Continued)

(58) Field of Classification Search
CPC .................................................. G06F 9/5083
(Continued)

(56) References Cited

U.S. PATENT DOCUMENTS 6,292,822 B1    9/2001  Hardwick
8,577,795 B2 *  11/2013 Clubb ................. G06Q 20/105
                                                    705/39
(Continued)

FOREIGN PATENT DOCUMENTS

WO    WO2014058944    4/2014
WO    WO2015155571    10/2015

OTHER PUBLICATIONS

PCT International Search Report for International Application No. PCT/US2017/039145 dated Sep. 11, 2017, 2 pages.
(Continued)

*Primary Examiner* — Fritz Alphonse
(74) *Attorney, Agent, or Firm* — Locke Lord LLP

(57) ABSTRACT

In a Boundaryless Control High Availability ("BCHA") system (e.g., industrial control system) comprising multiple computing resources (or computational engines) running on multiple machines, technology for computing in real time the overall system availability based upon the capabilities/characteristics of the available computing resources, applications to execute and the distribution of the applications across those resources is disclosed. In some embodiments,
(Continued)

the disclosed technology can dynamically manage, coordinate recommend certain actions to system operators to maintain availability of the overall system at a desired level. High Availability features may be implemented across a variety of different computing resources distributed across various aspects of a BCHA system and/or computing resources. Two example implementations of BCHA systems described involve an M:N working configuration and M:N+R working configuration.

39 Claims, 29 Drawing Sheets

(51) Int. Cl.
    *G06F 11/30*     (2006.01)
    *H04L 29/08*     (2006.01)
    *G05B 19/4155*     (2006.01)

(52) U.S. Cl.
    CPC ........ *G06F 11/203* (2013.01); *G06F 11/3006* (2013.01); *G06F 11/3055* (2013.01); *H04L 67/1034* (2013.01); *G05B 2219/31449* (2013.01); *G06F 2201/805* (2013.01); *G06F 2201/86* (2013.01); *G06F 2209/5011* (2013.01)

(58) Field of Classification Search
    USPC .......................................................... 714/4
    See application file for complete search history.

(56) References Cited

U.S. PATENT DOCUMENTS

| | | |
|---|---|---|
| 8,943,372 B2 | 1/2015 | Frank et al. |
| 2003/0126200 A1 | 7/2003 | Wolff |
| 2004/0022279 A1 | 2/2004 | Kailbach et al. |
| 2006/0190243 A1 | 8/2006 | Barkai et al. |
| 2007/0234366 A1 | 10/2007 | Morich et al. |
| 2009/0122706 A1 | 5/2009 | Alfano et al. |
| 2014/0269739 A1 | 9/2014 | Evans et al. |
| 2016/0072730 A1 | 3/2016 | Jubran et al. |

OTHER PUBLICATIONS

PCT Written Opinion of the International Searching Authority for International Application No. PCT/US2017/039145 dated Sep. 11, 2017, 4 pages.
Haddad, I., "The HAS Architecture: A Highly Available and Scalable Cluster Architecture for Web Servers", Mar. 2006, a Thesis in the Department of Computer Science and Software Engineering, Presented in Partial Fulfillment of the Requirements for the Degree of Doctor of Philosophy at Concordia University, Montreal, Quebec, Canada, Cover page and pp. 94-190.
Haddad, I., "The HAS Architecture: A Highly Available and Scalable Cluster Architecture for Web Servers", a Thesis in the Dept. of Computer Science & Software Engineering, Presented in Partial Fulfillment of the Requirements for the Degree of Doctor of Philosophy at Concordia University, Montreal, Quebec, Canada, Mar. 2006, 264 pages.
Extended European Search Report for European Patent Application No. 17816352.3 dated Jan. 17, 2020, 10 pages.
Extended European Search Report for European Patent Application No. 17816355.6 dated Jan. 15, 2020, 10 pages.
Extended European Search Report for European Patent Application No. 17816356.4 dated Jan. 8, 2020, 10 pages.
PCT Search Report for International Patent Application No. PCT/US2017/039142 dated Sep. 13, 2017, 2 pages.
PCT Written Opinion of the International Searching Authority for International Patent Application No. PCT/US2017/039142 dated Sep. 13, 2017, 19 pages.
PCT Search Report for International Patent Application No. PCT/US2017/039138 dated Aug. 31, 2017, 2 pages.
PCT Written Opinion of the International Searching Authority for International Patent Application No. PCT/US2017/039138 dated Aug. 31, 2017, 6 pages.
Bozman, J., "White Paper—Advancing Availability and Cluster Software Worldwide", May 2009, Sponsored by NEC Corporation, IDC, Global Headquarters, 15 pages.

* cited by examiner

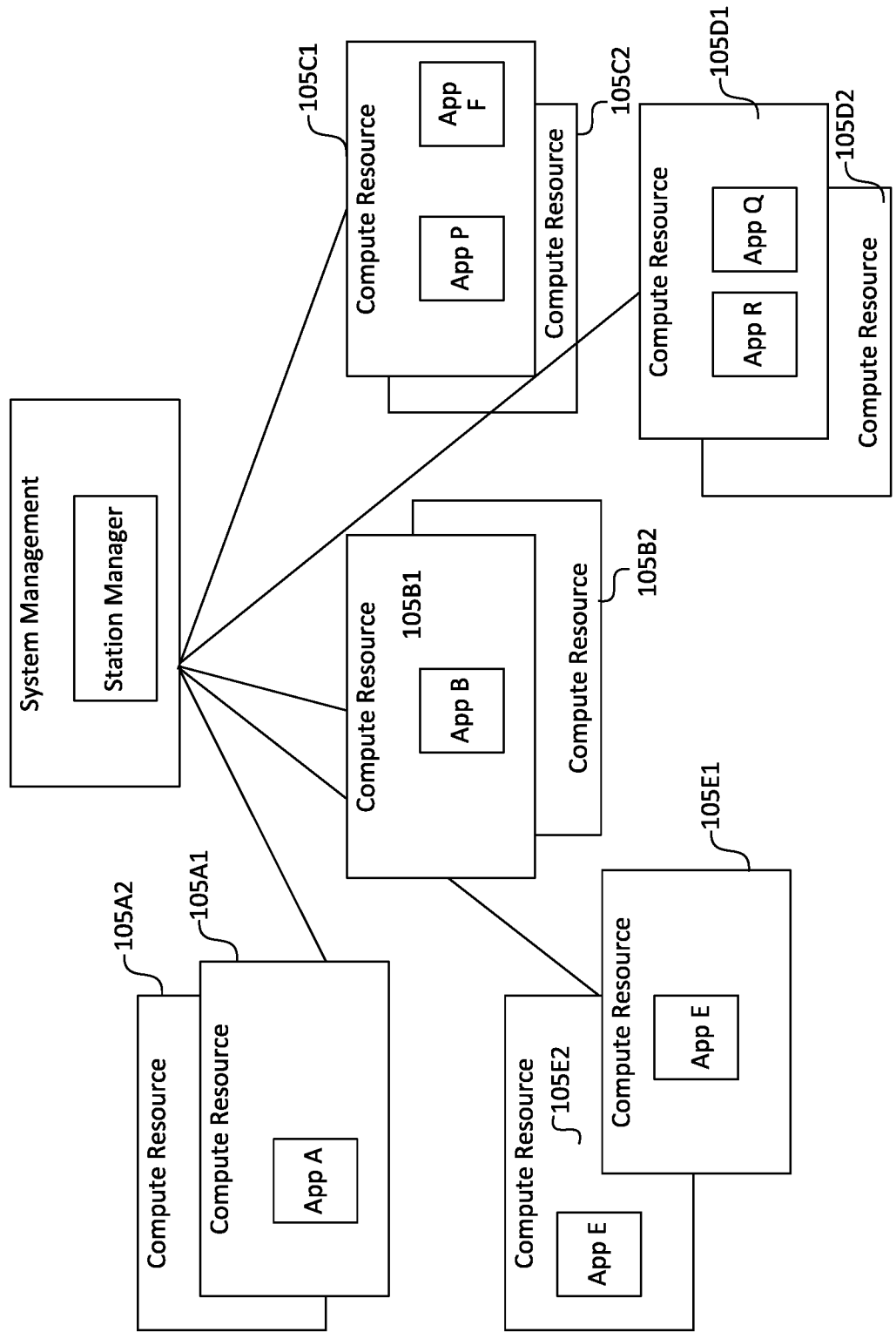
Fig. 1C1

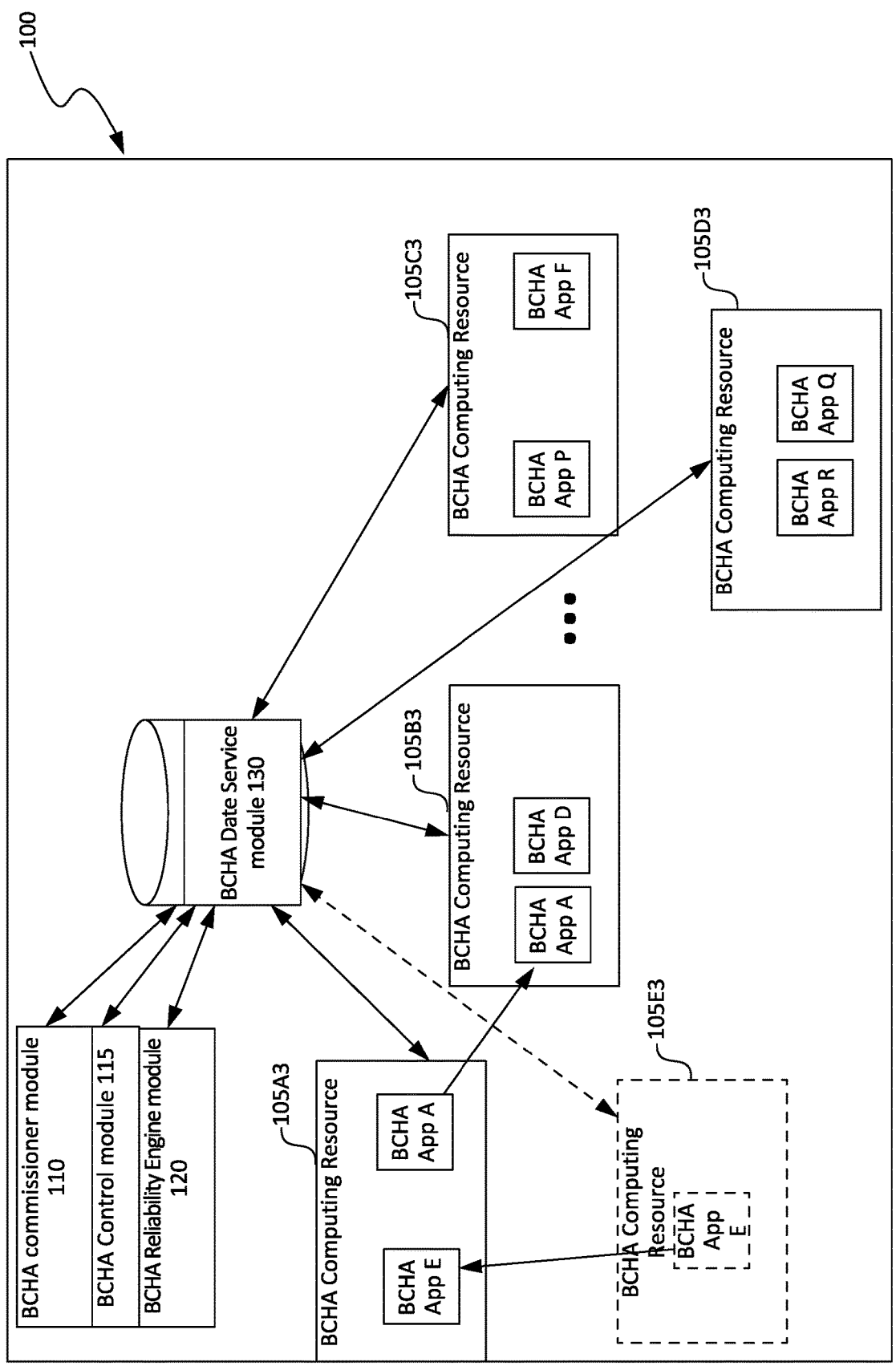
Fig. 1C2

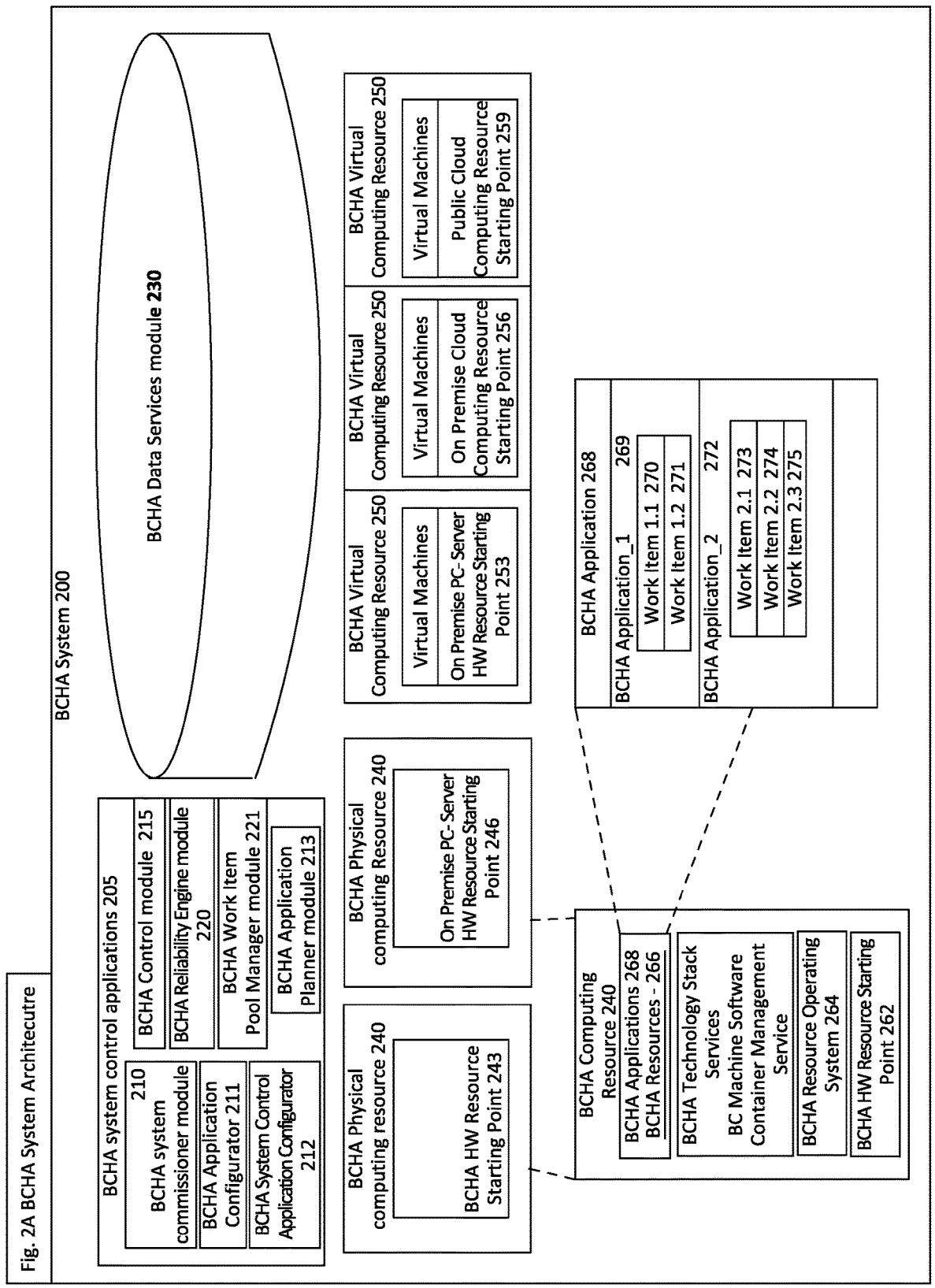
Fig. 2A BCHA System Architecture

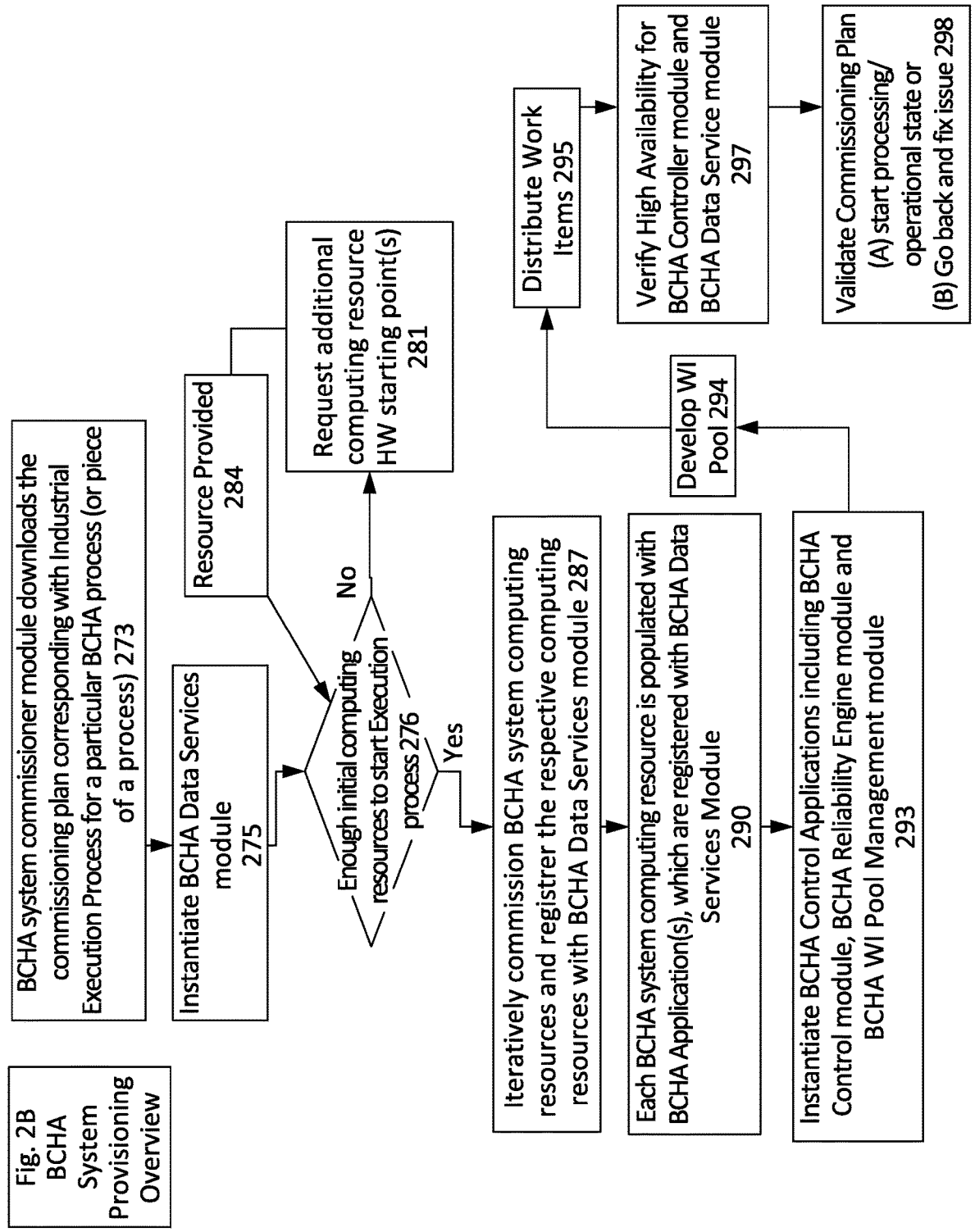

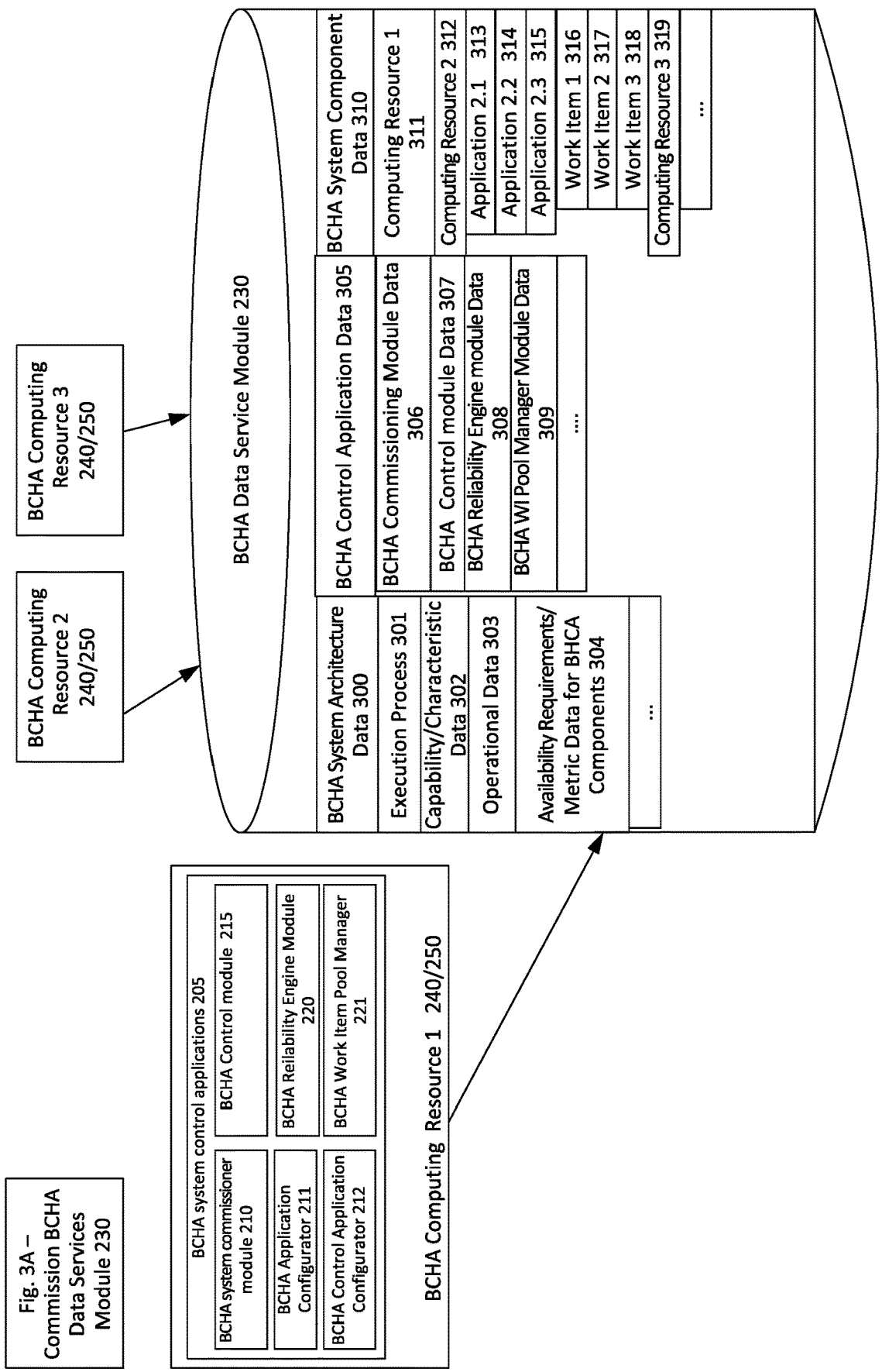
Fig. 3A – Commission BCHA Data Services Module 230

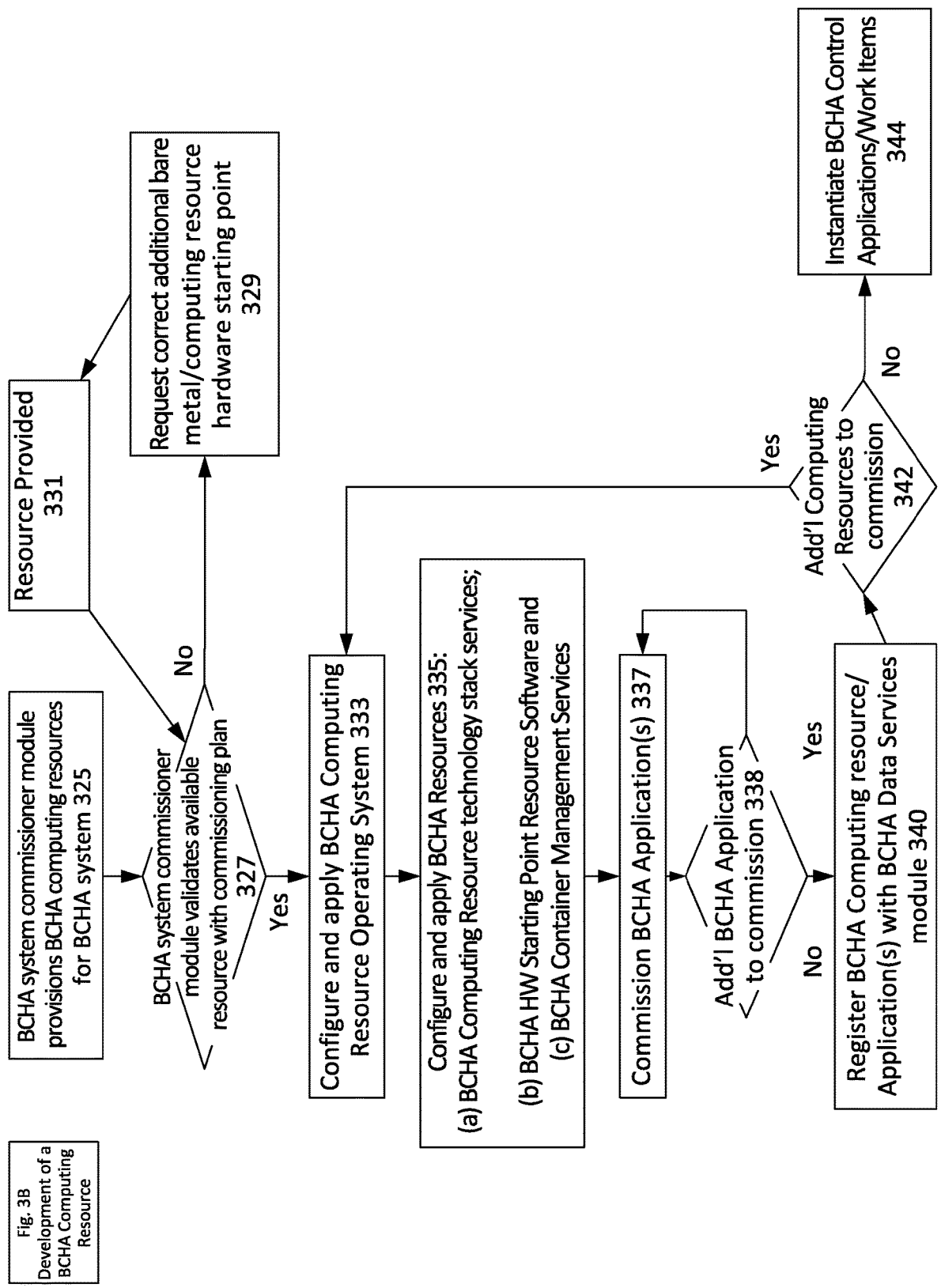

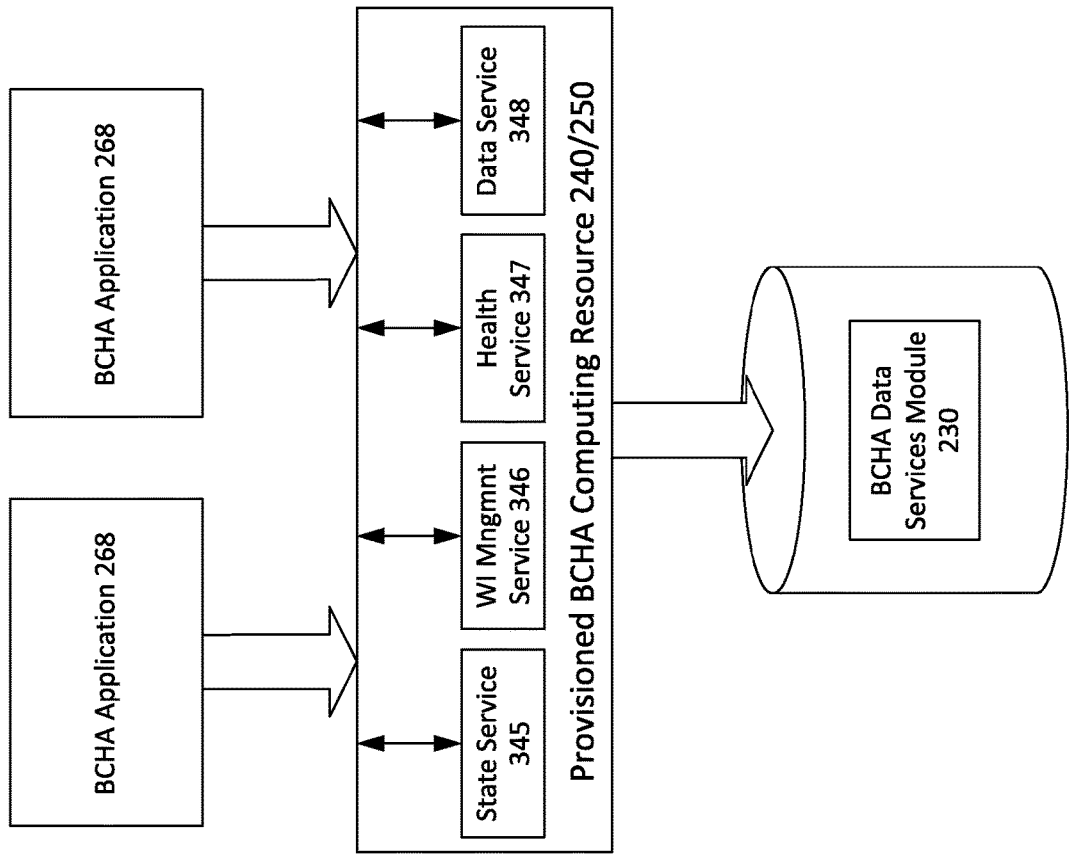
Fig. 3C – Commision BCHA Application

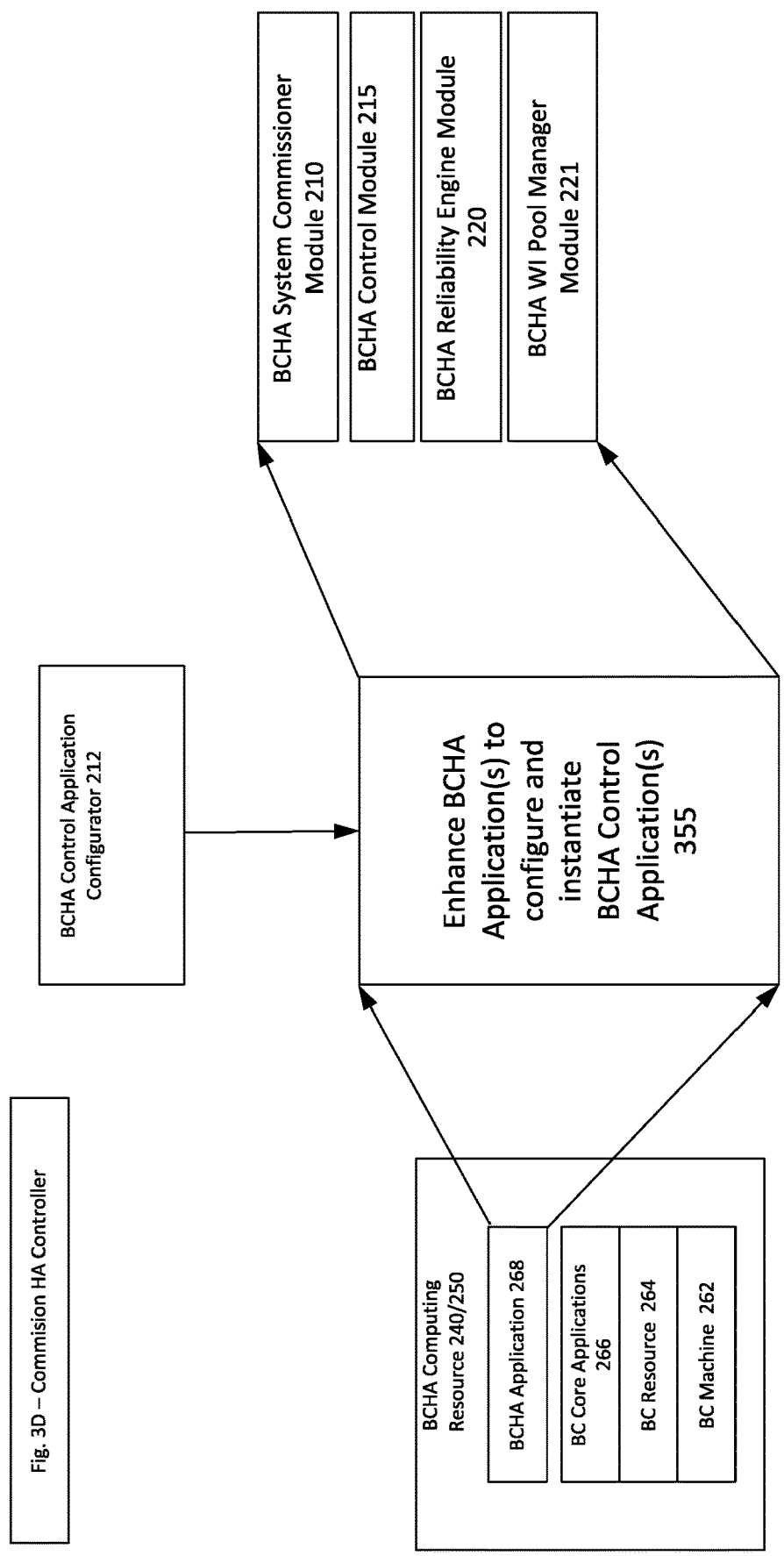

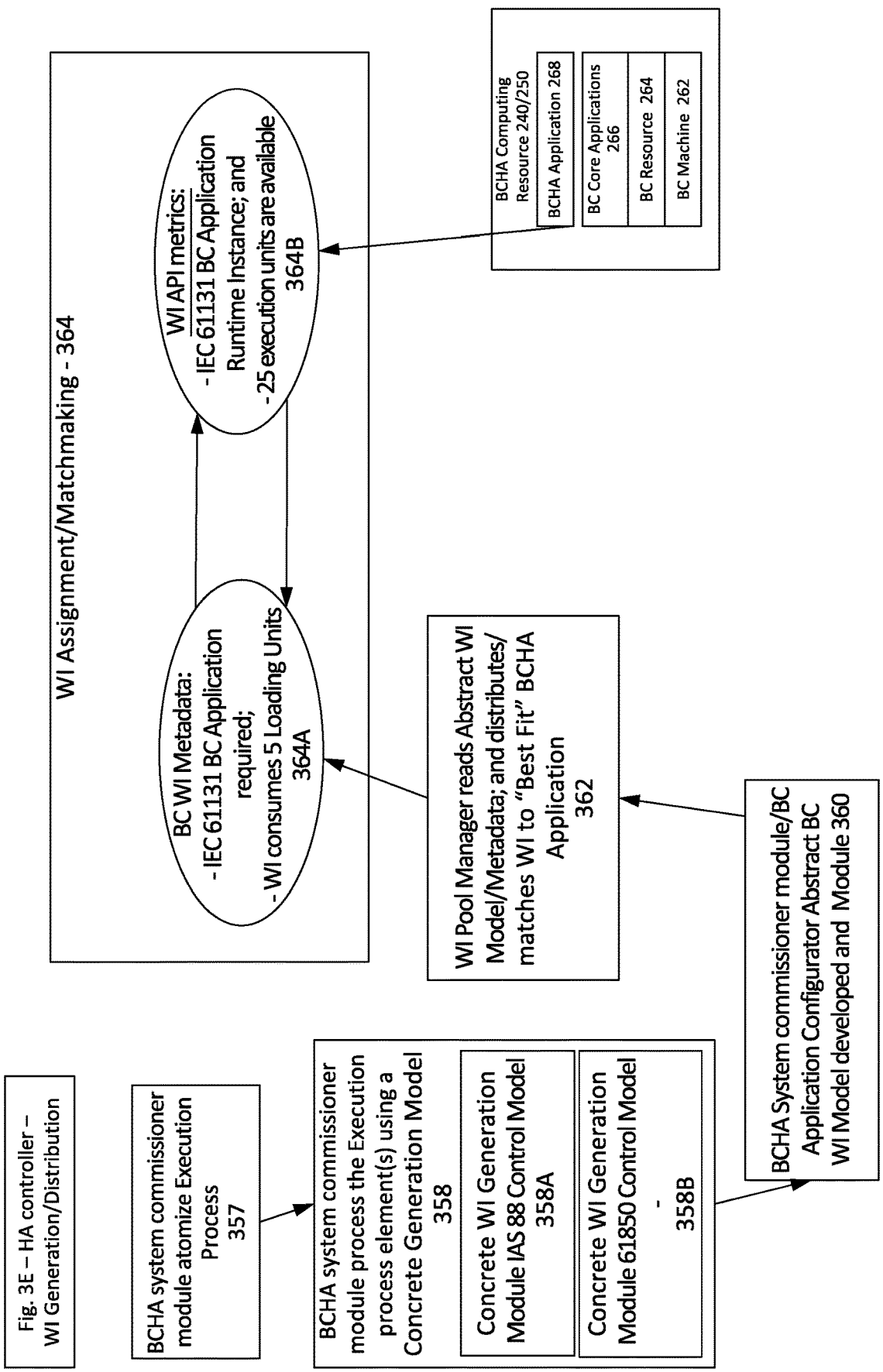
Fig. 3E – HA controller – WI Generation/Distribution

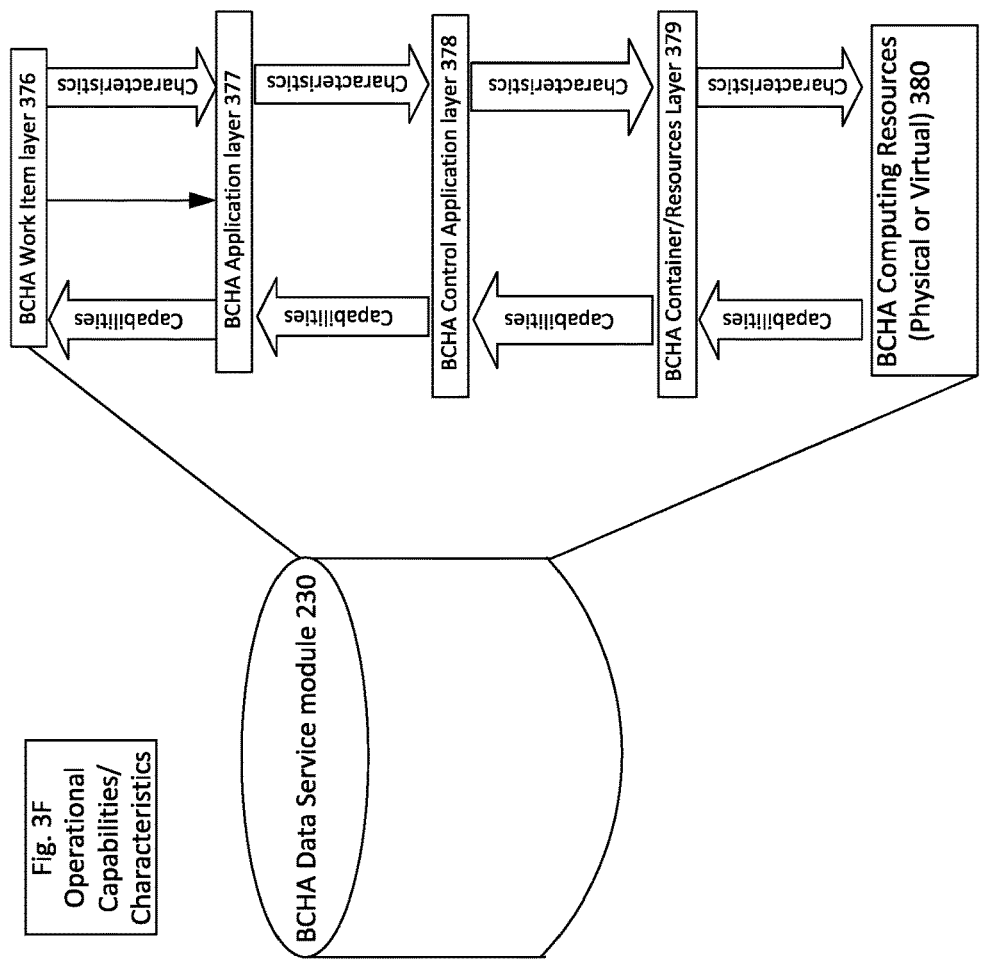

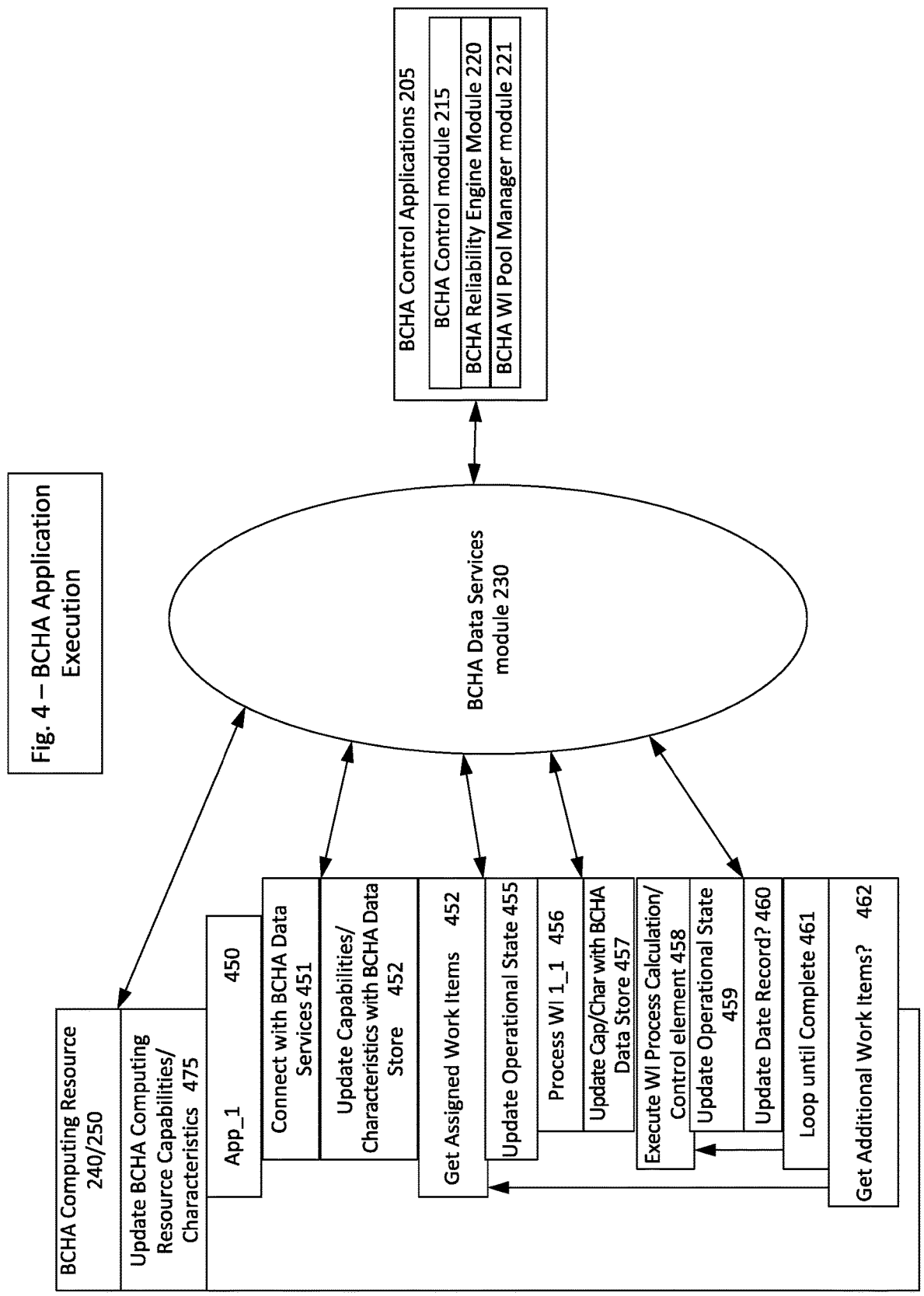

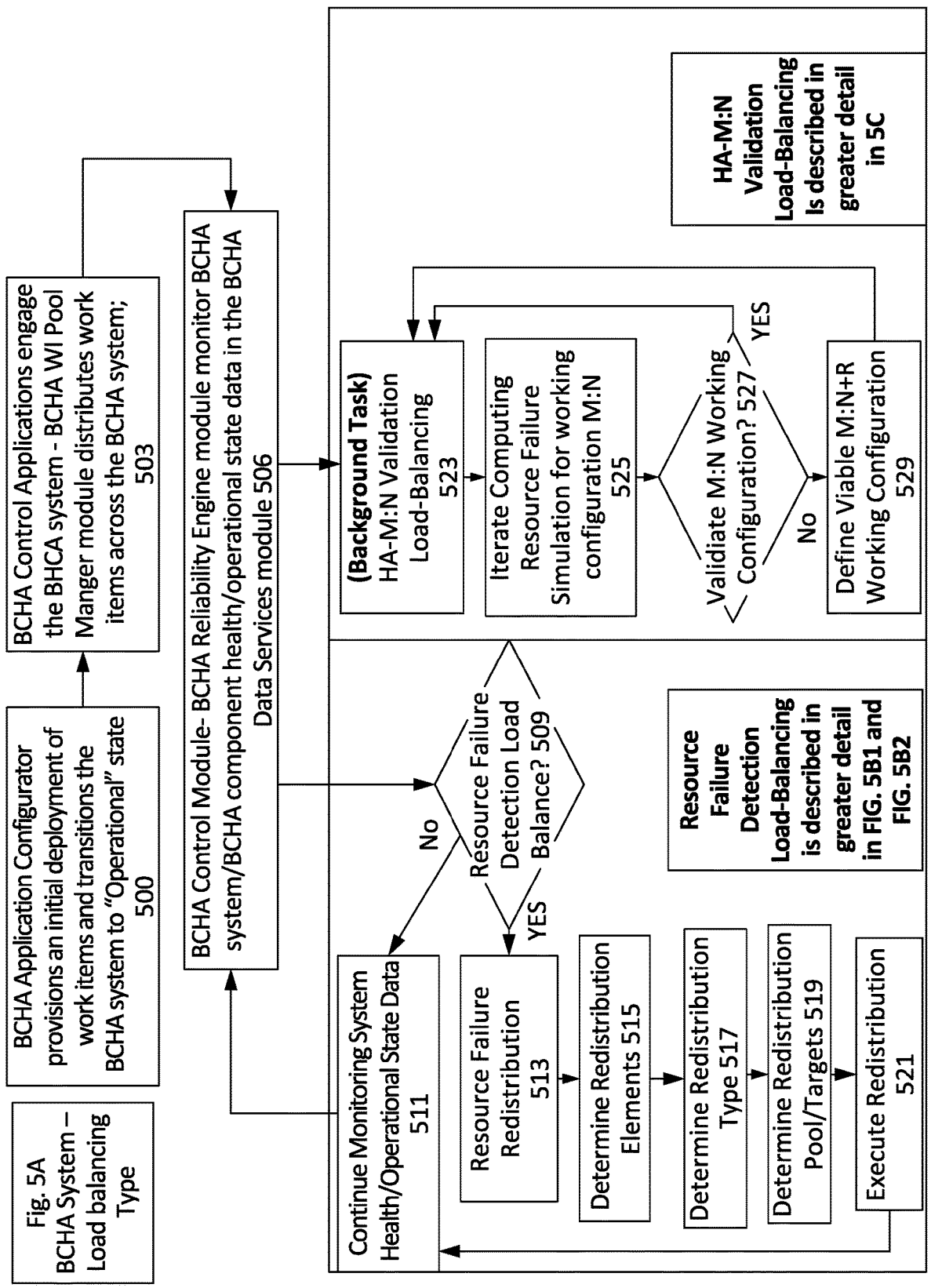

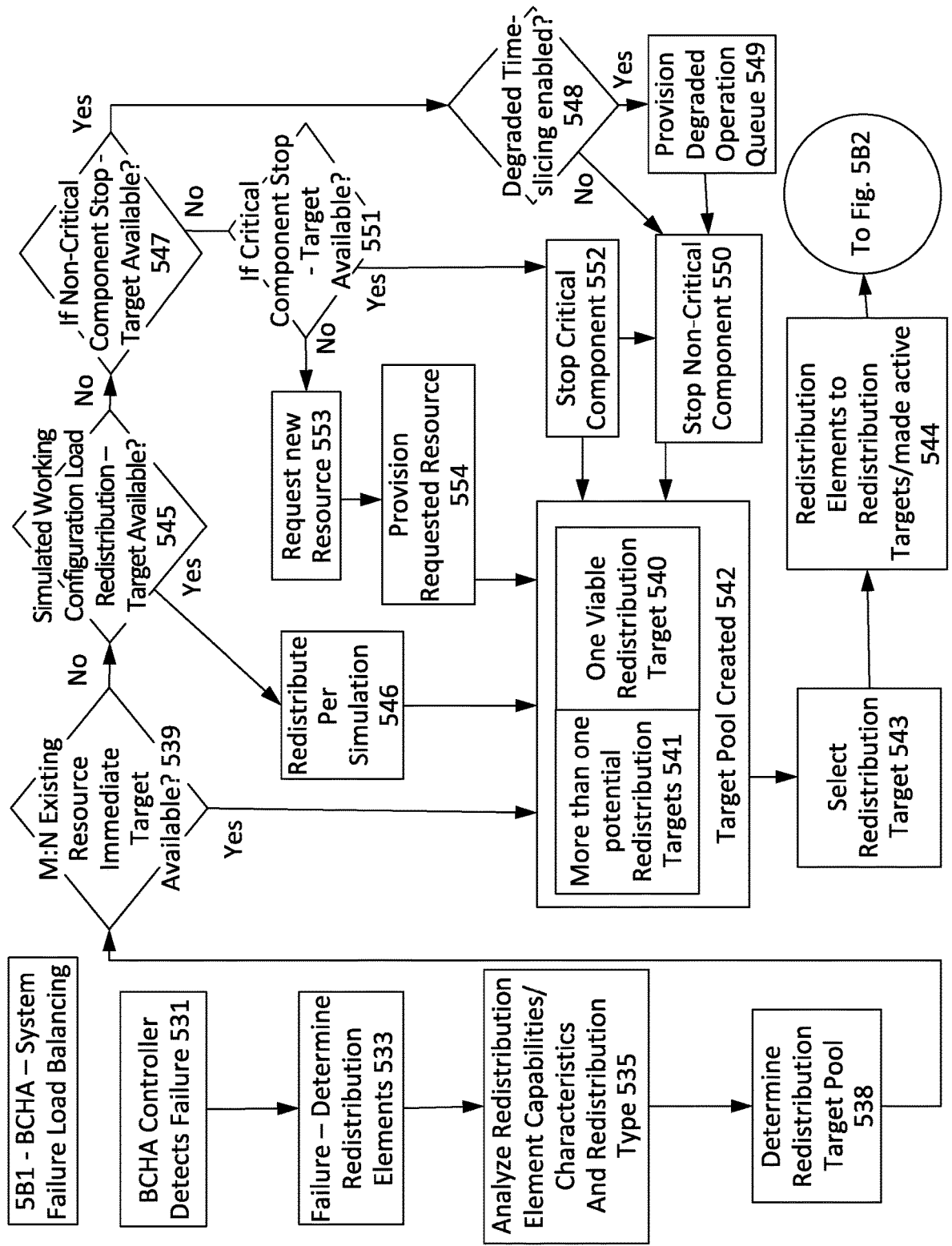

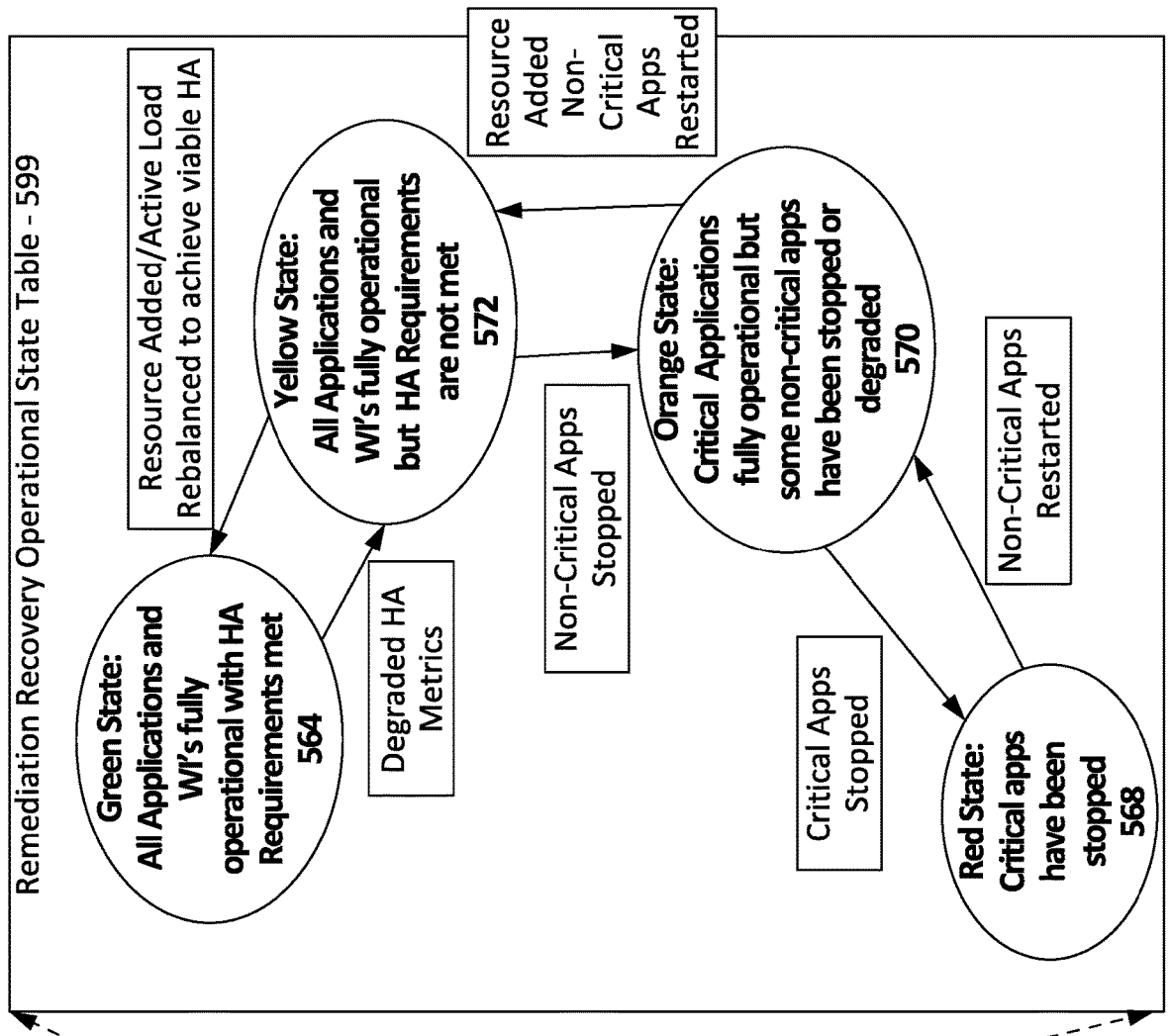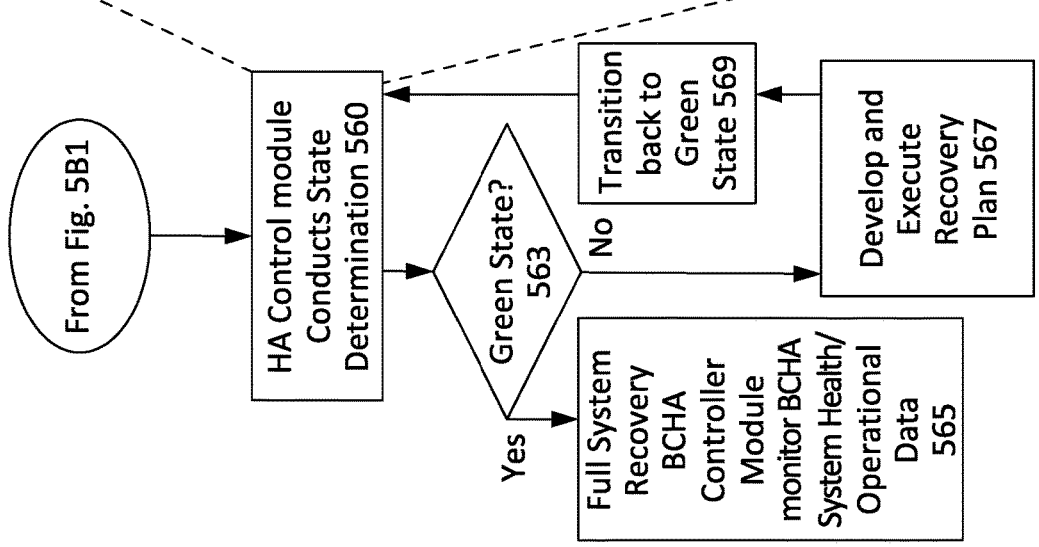

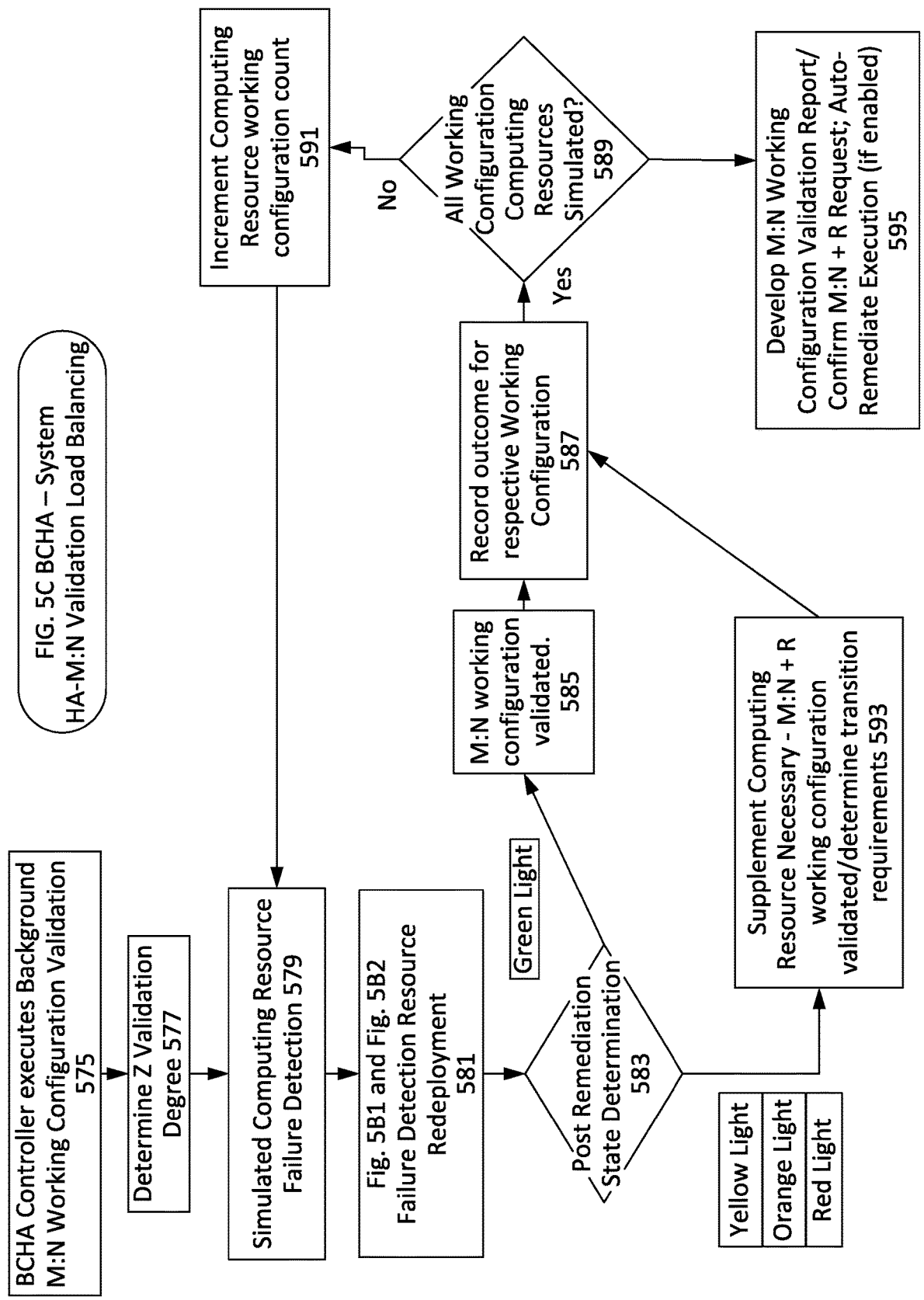
FIG. 5C BCHA – System HA-M:N Validation Load Balancing

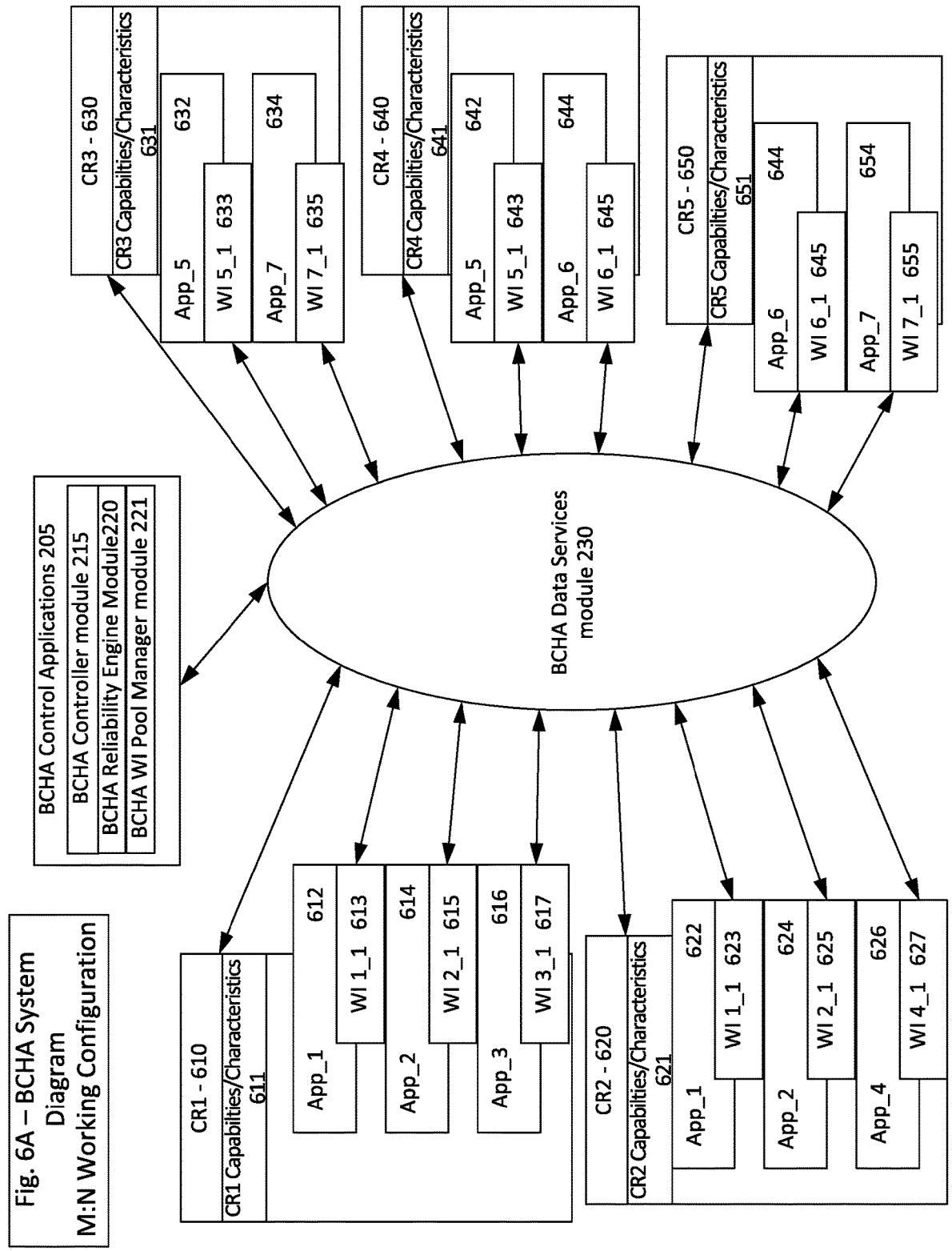

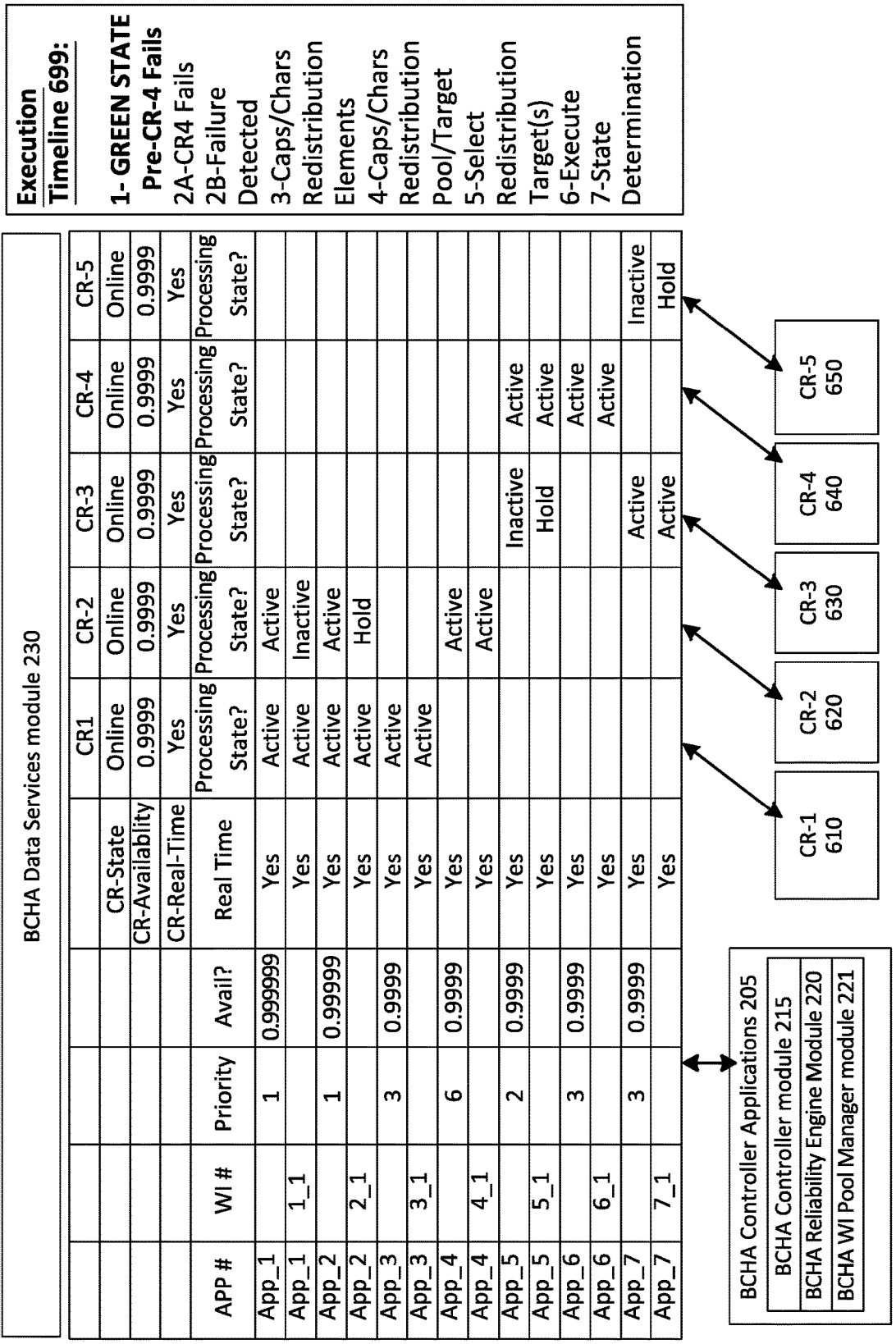
Fig. 6B1 – BCHA System Diagram - System Health/Operational State Monitoring

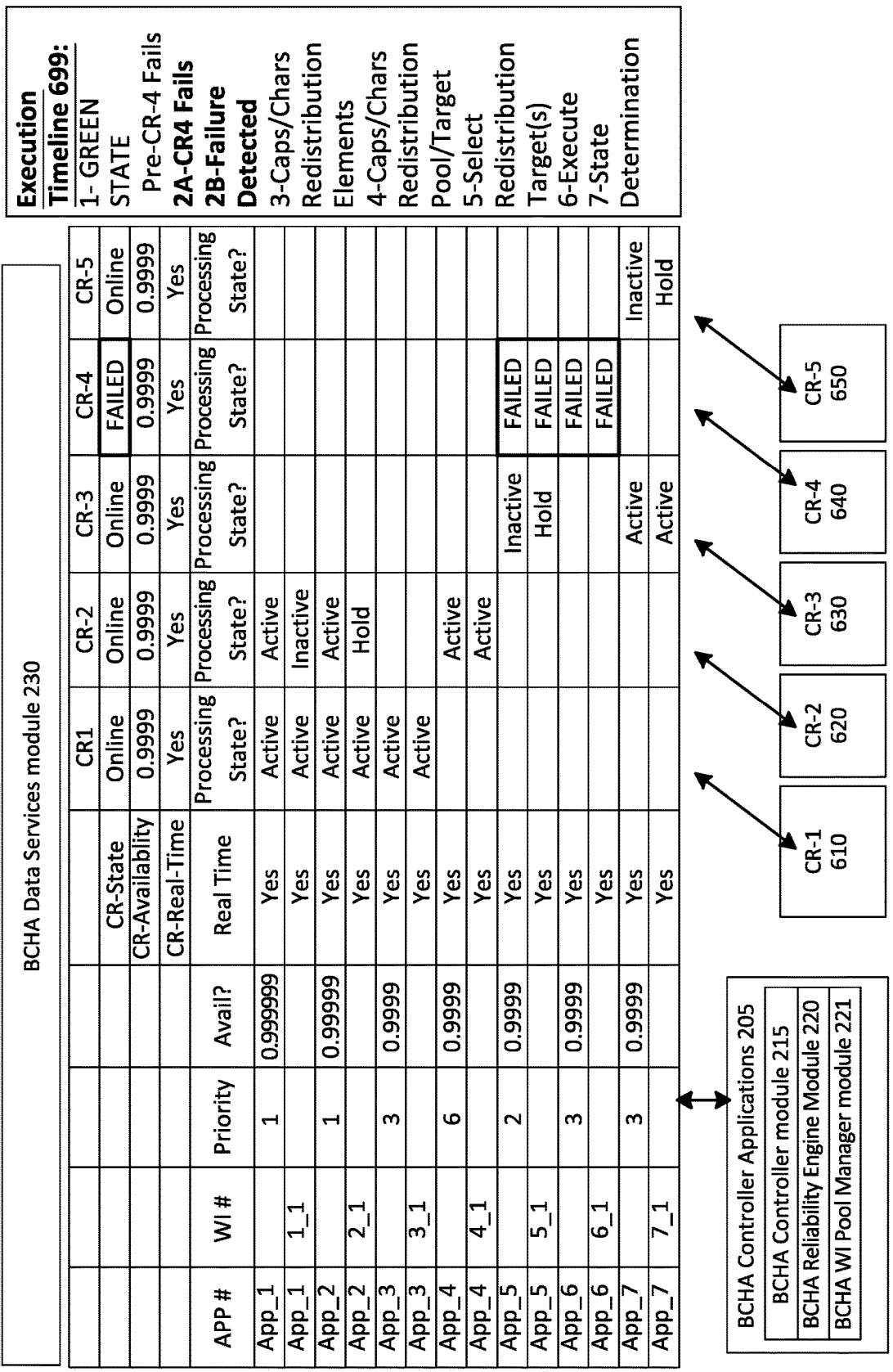
Fig. 6B2 – BCHA System Diagram - Failure Detction

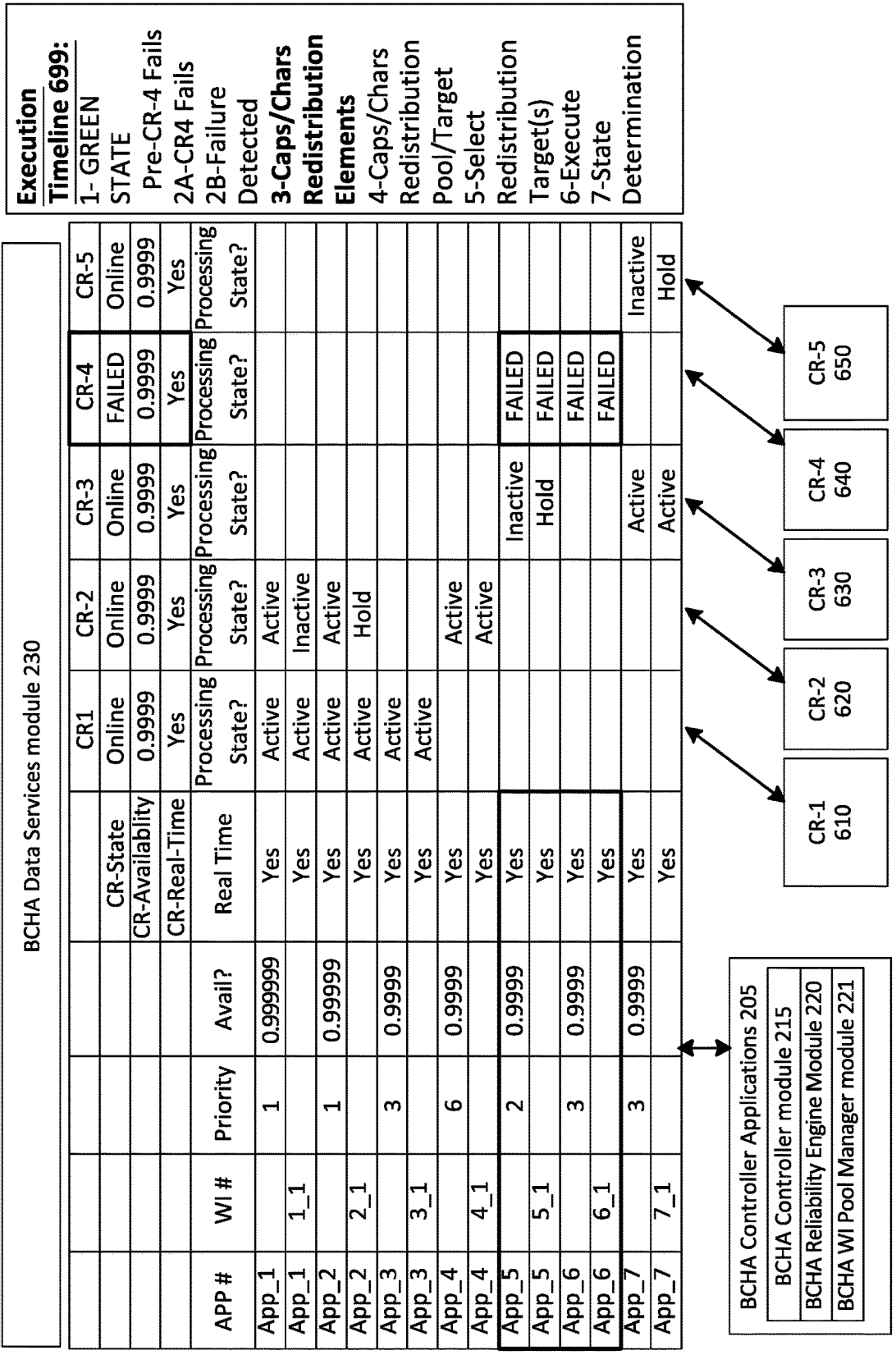
Fig. 6B3 – BCHA System Diagram – Assess Redistribution Element Capabilities/Characteristics

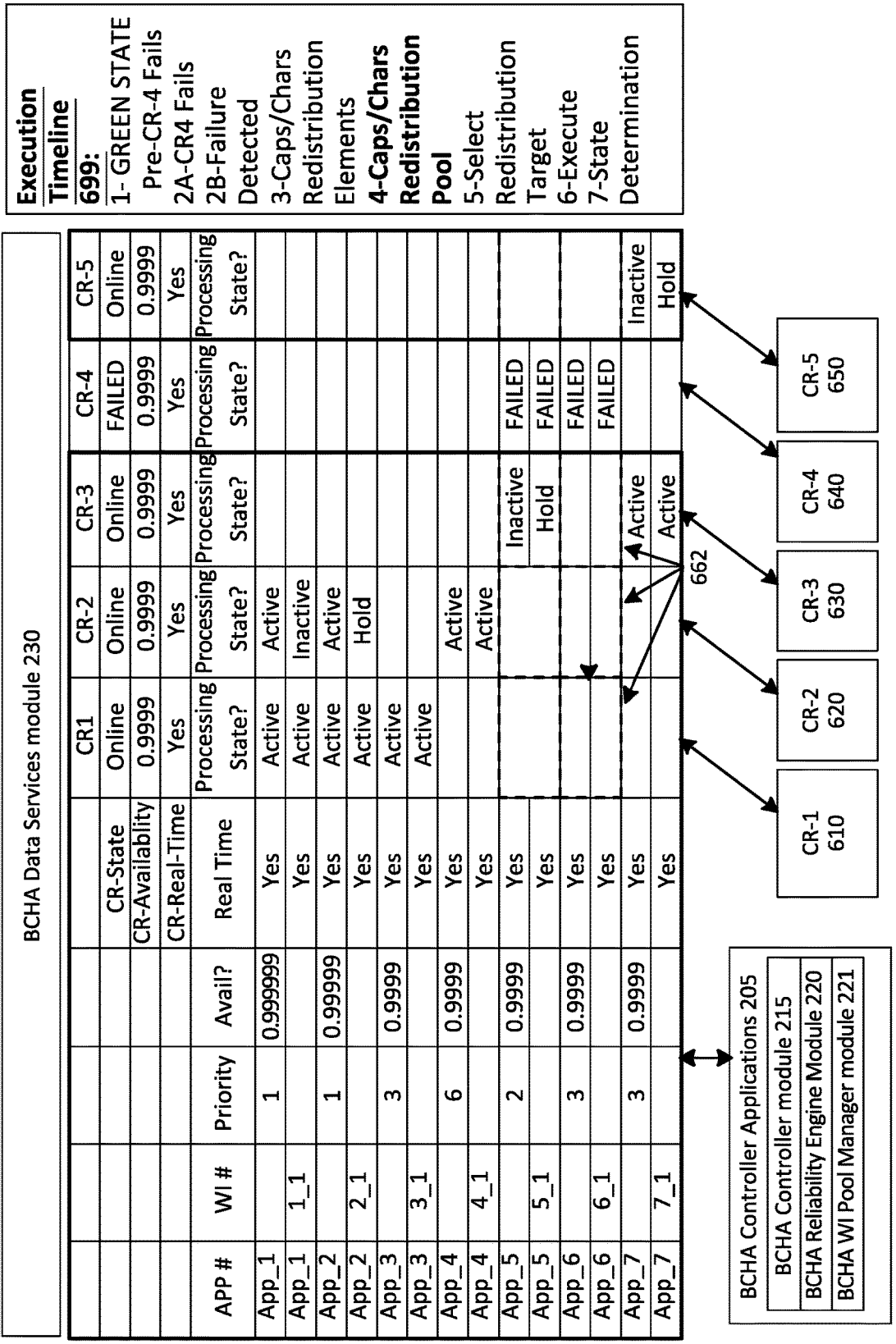

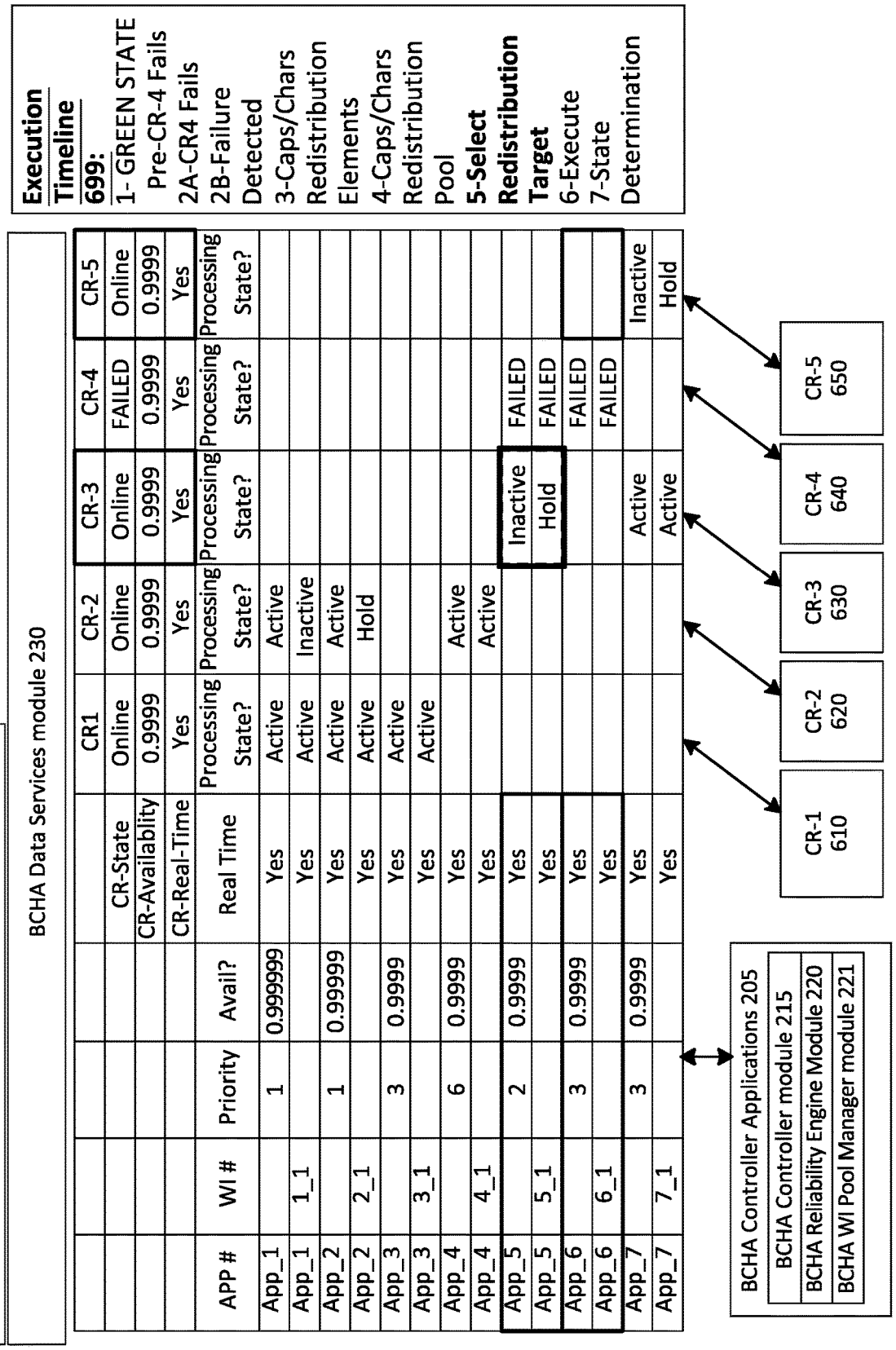

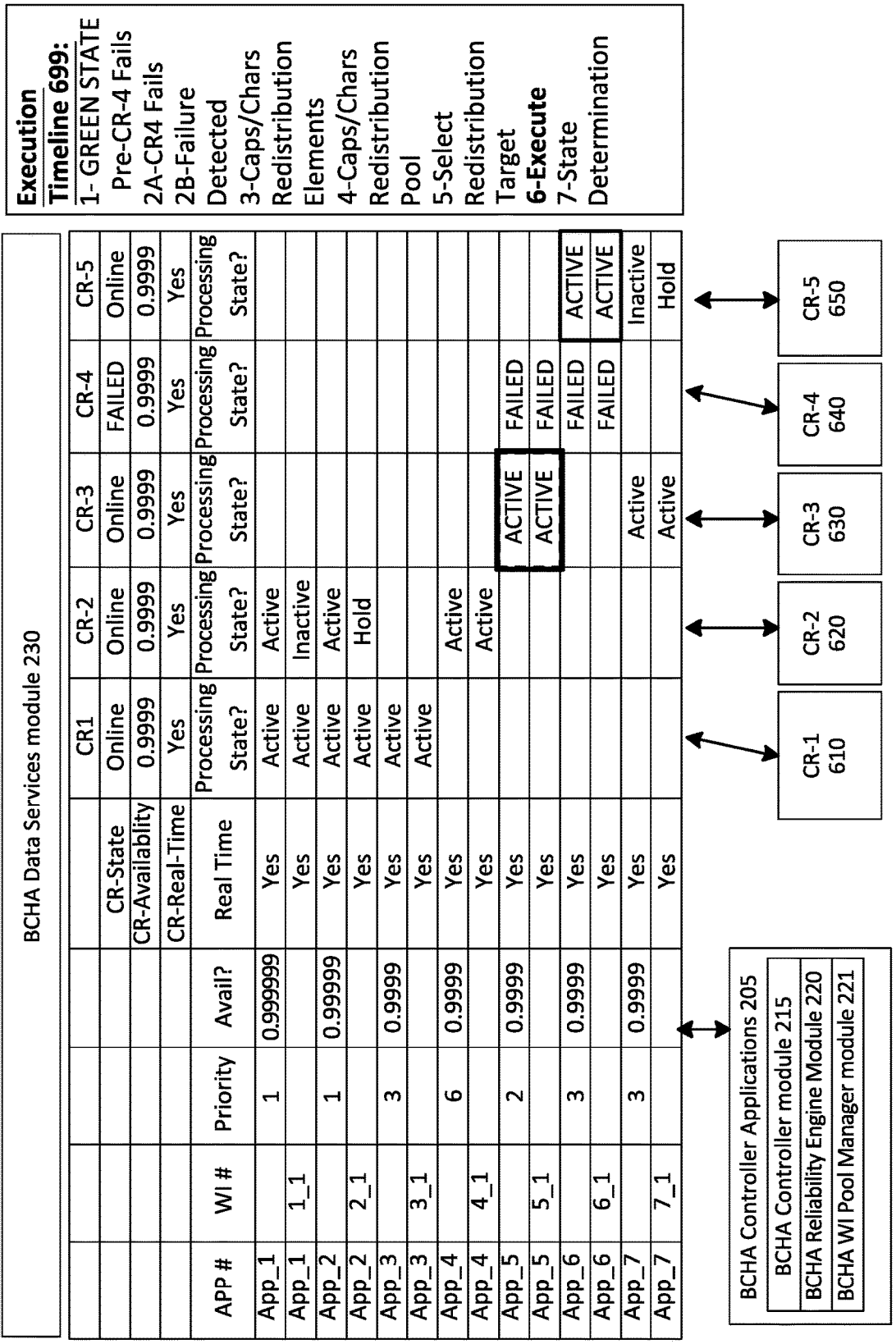

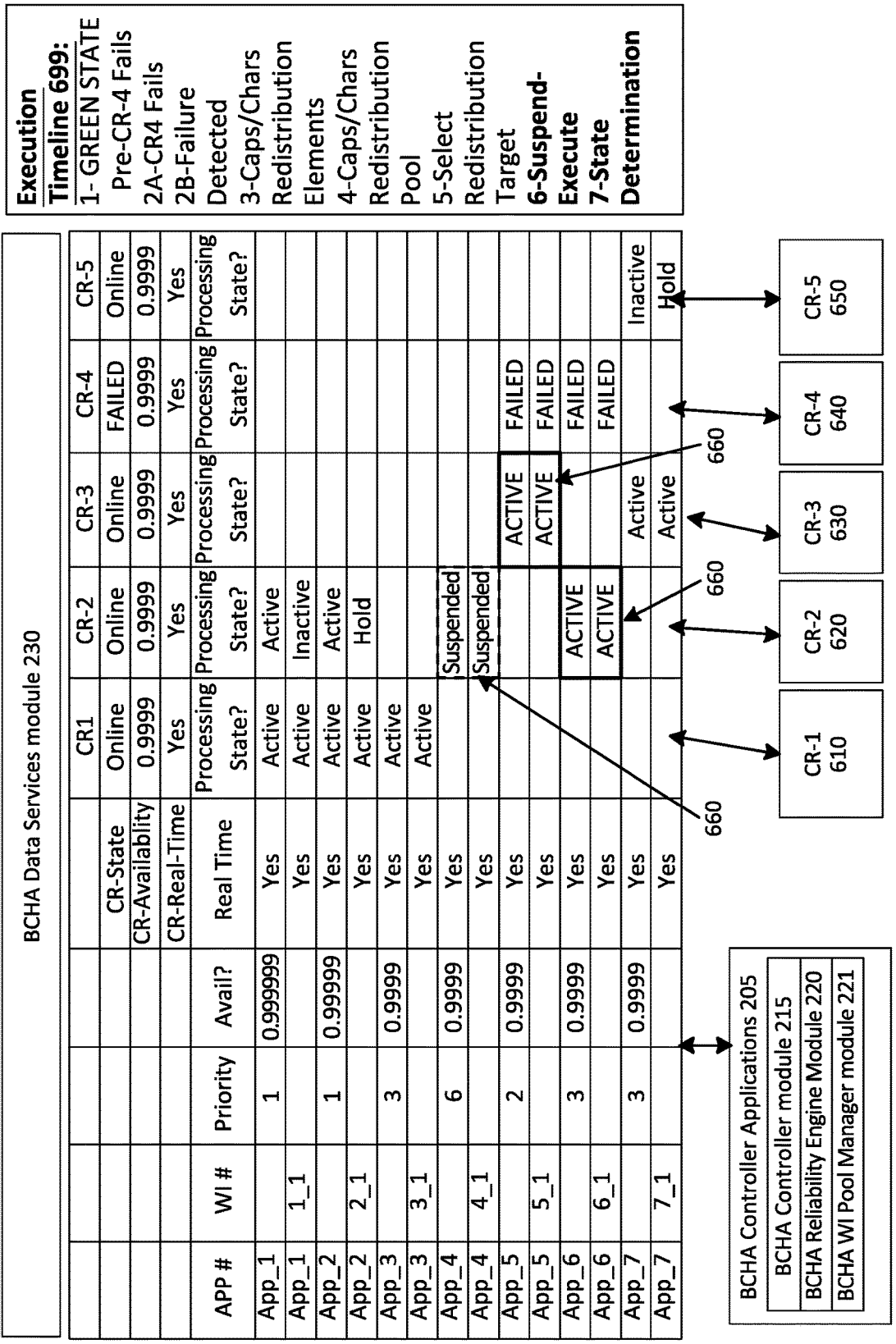
Fig. 6B7 – BCHA System Diagram – Remediation State Determination

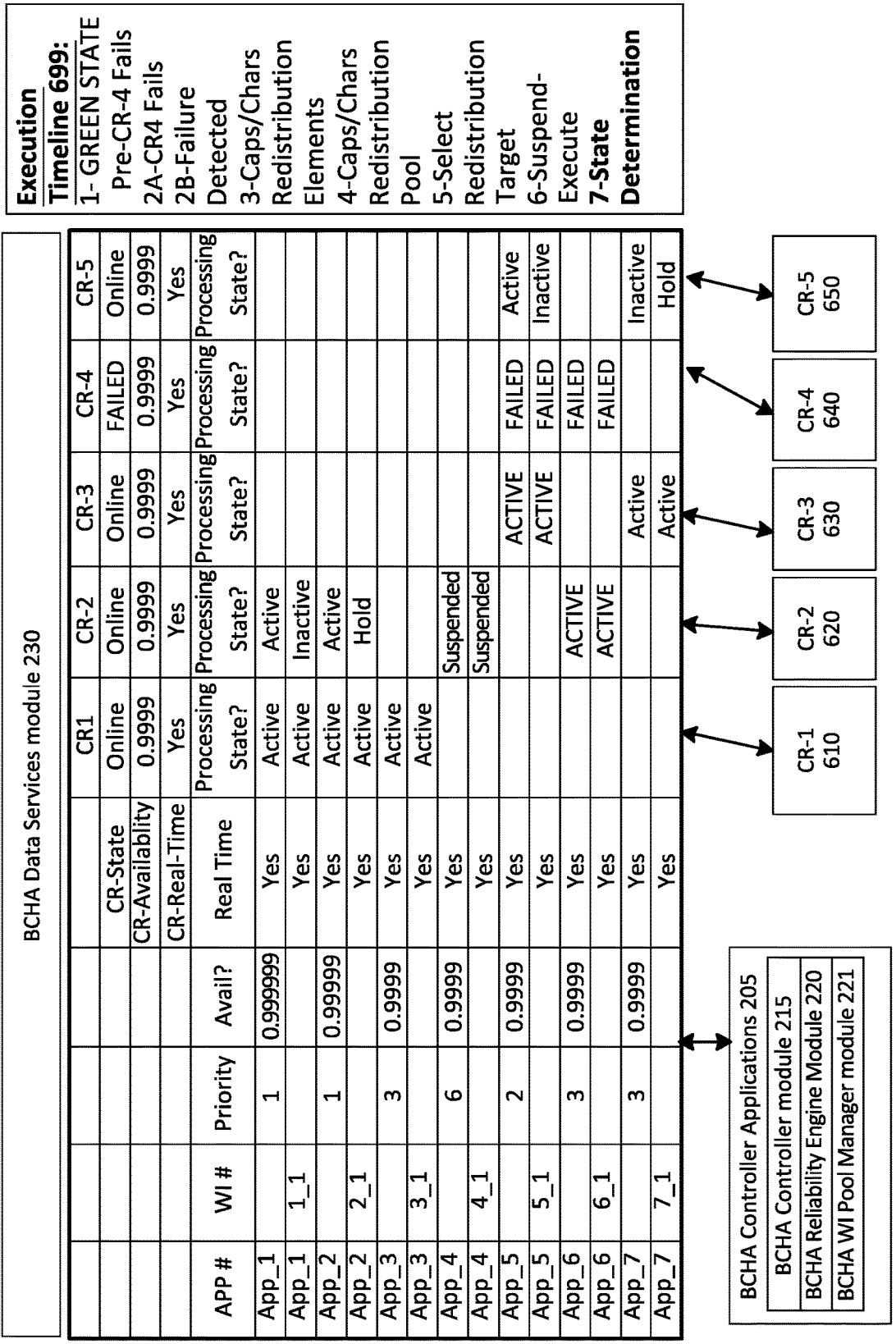

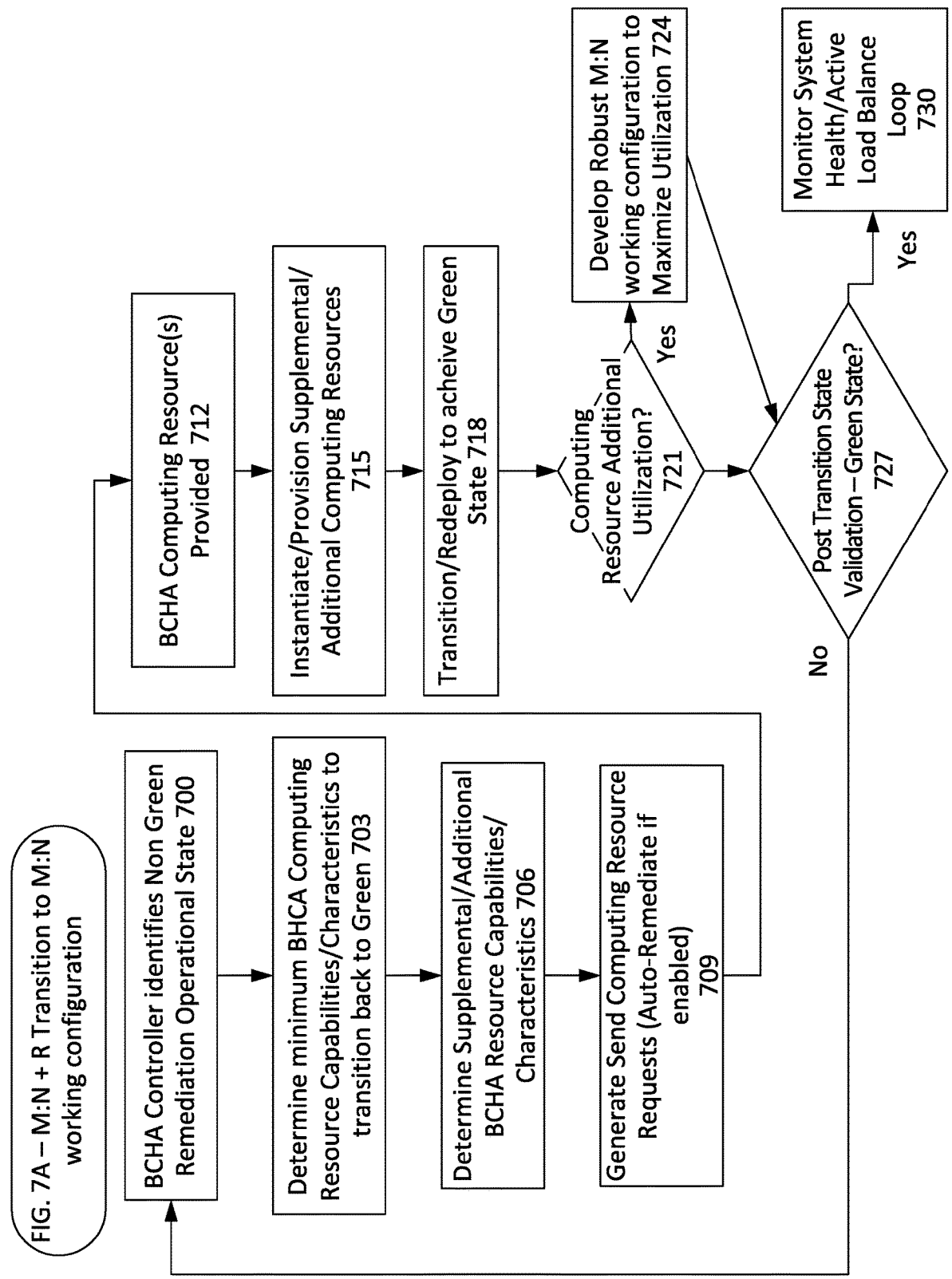

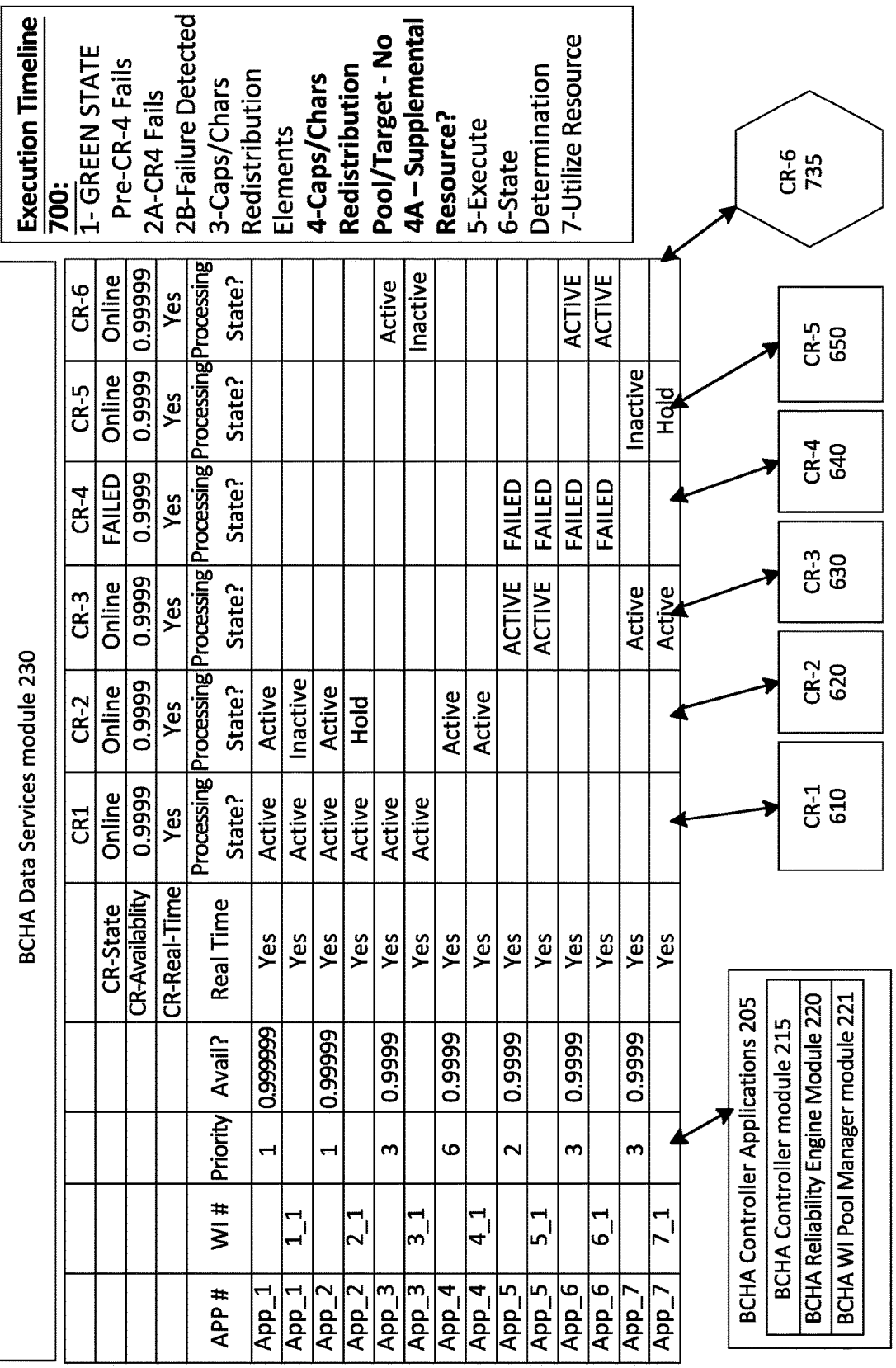

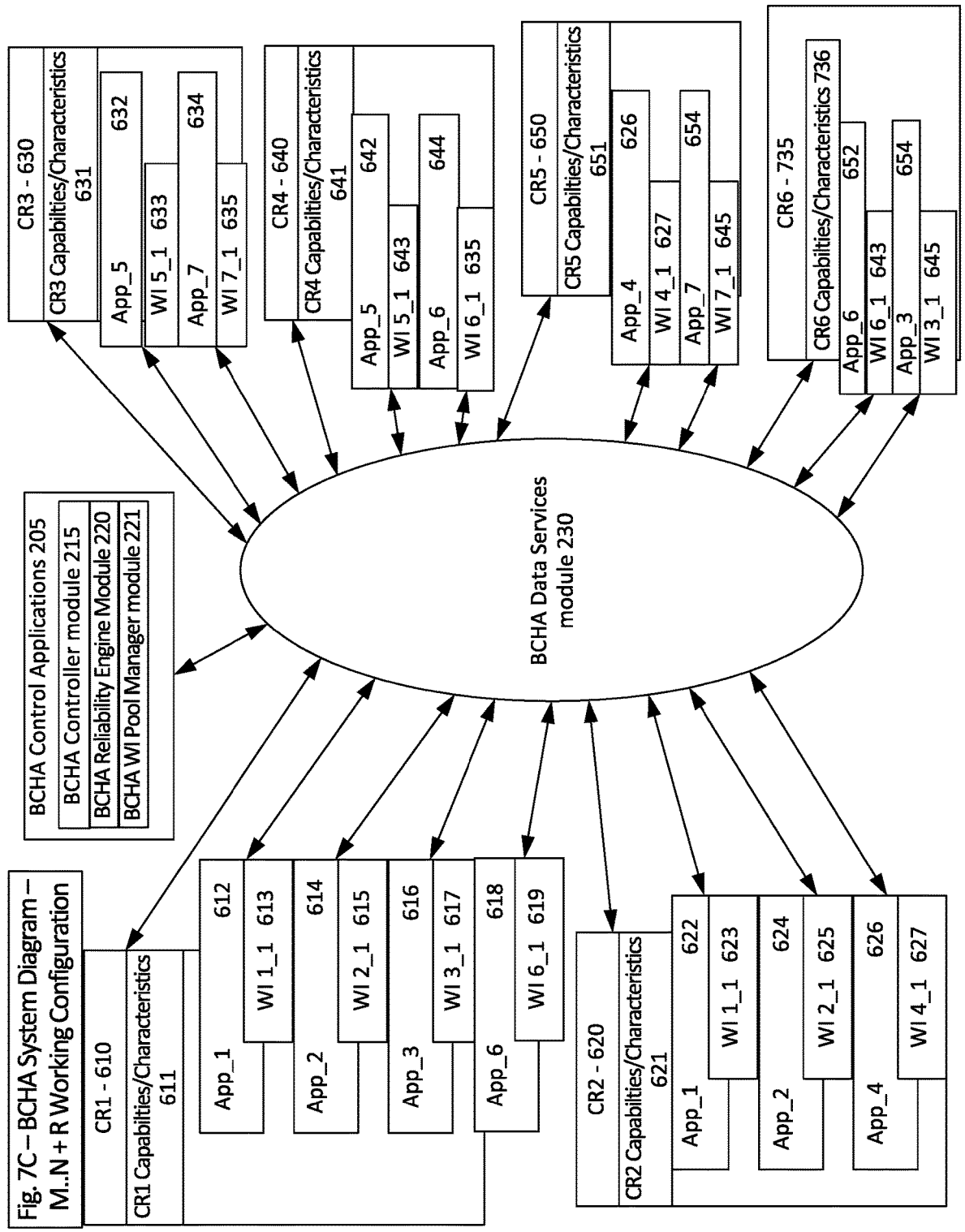
Fig. 7C – BCHA System Diagram – M.N + R Working Configuration

United States Patent Office document begins:

METHODS, SYSTEMS AND APPARATUS TO DYNAMICALLY FACILITATE BOUNDARYLESS, HIGH AVAILABILITY M..N WORKING CONFIGURATION MANAGEMENT WITH SUPPLEMENTAL RESOURCE

CROSS-REFERENCE TO RELATED APPLICATION(S)

This application is a U.S. National Stage entry from International Patent Application No. PCT/US2017/039145 filed on Jun. 23, 2017 which claims priority to and benefit from the following provisional patent application: (1) U.S. Provisional Application Ser. No. 62/354,669 titled "Boundaryless High Availability" filed on Jun. 24, 2016. The entire contents of the aforementioned patent applications are expressly incorporated by reference herein.

BRIEF DESCRIPTION OF THE DRAWINGS

FIG. 1C1 is a block diagram illustrating an example of a system implementing a 1:1 hardware failover/redundancy architecture.

FIG. 1C2 is a block diagram illustrating an example of a Boundaryless, High Availability ("BCHA") system implementing a M:N working configuration architecture in accordance with some embodiments of the disclosed technology.

FIG. 2A illustrates aspects of components associated with Boundaryless Control High Availability (BCHA) Architectures.

FIG. 2B is a flow diagram illustrating aspects of how a BCHA Commissioning module develops a BCHA system.

FIG. 3A illustrates aspects of a BCHA Architecture developed using a BCHA Commissioning module and instantiation of a BCHA data services module.

FIG. 3B illustrates aspects of provisioning Boundaryless Control High Availability (BCHA) computing resources.

FIG. 3C illustrates aspects of commissioning Boundaryless Control High Availability (BCHA) applications.

FIG. 3D illustrates aspects of provisioning Boundaryless Control High Availability (BCHA) Control applications—High Availability Control.

FIG. 3E illustrates aspects of provisioning Boundaryless Control High Availability (BCHA) work items.

FIG. 3F is a block diagram illustrating example aspects of the hierarchical, inheritance relationships for BCHA Architecture attributes FIG. 4 illustrates aspects of how Boundaryless Control High Availability (BCHA) BCHA application Execution;

FIG. 5A illustrates aspects of how BCHA system monitor operational states to facilitate Resource Failure Detection Load-Balancing and HA-M:N Validation Load-Balancing;

FIG. 5B1 is a flow diagram illustrating aspects of Resource Failure Detection Load-Balancing;

FIG. 5B2 is a flow diagram illustrating aspects of Resource Failure Detection Load-Balancing Remediation Operational State Determination;

FIG. 5C is a flow diagram illustrating aspects HA-M:N Validation Load-Balancing;

FIG. 6A is a system diagram illustrating aspects of a BCHA system M:N working configuration;

FIG. 6B1 is an operational state data diagram illustrating operational state assessment prior to computing resource failure;

FIG. 6B2 is an operational state data diagram illustrating failure detection—CR4 Fails/Failure Detected;

FIG. 6B3 is an operational state data diagram illustrating aspects of BCHA system redistribution element capability/characteristics determination;

FIG. 6B4 is an operational state data diagram illustrating aspects of BCHA system redistribution pool capability/characteristics determination;

FIG. 6B5 is an operational state data diagram illustrating aspects of BCHA system redistribution target selection;

FIG. 6B6 is an operational state data diagram illustrating aspects of BCHA system redistribution remediation FIG. 6B7 is an operational state data diagram illustrating aspects of BCHA system executes target selection/non-critical application suspension;

FIG. 6B8 is an operational state data diagram illustrating aspects of remediation operational state determination/validate M:N working configuration;

FIG. 7A is flow diagram illustrating aspects of developing a supplemental BCHA computing resource as a M:N+R working configuration;

FIG. 7B is an operational state data diagram illustrating aspects of a supplemental BCHA computing resource as a M:N+R working configuration;

FIG. 7C is system diagram illustrating aspects of a supplemental BCHA computing resource as a M:N+R working configuration;

BACKGROUND

Figure 1A:
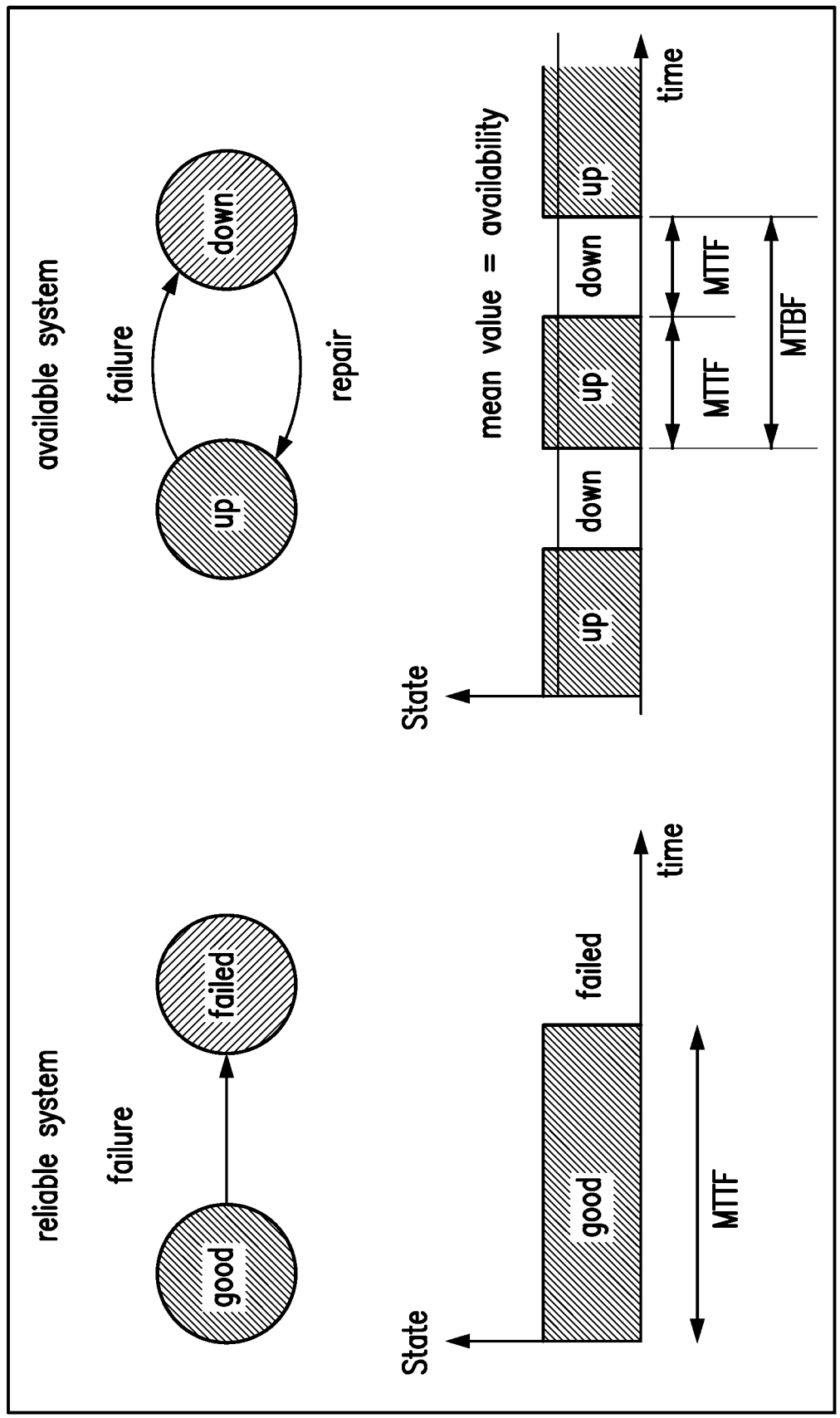
FIGS. 1A-B are block diagrams illustrating aspects of a reliable system and an available system.

Existing systems facilitate high availability features and functionality through the utilization of specialized 1:1 physical, redundant failover configurations using identical of nearly identical hardware. This type of 1:1 physical, redundant failover configuration is both expensive and difficult to scale effectively and efficiently. Further, the existing systems that use this 1:1 failover configuration typically require extended longevity of decades of runtime before replacements are done. Accordingly, 1:1 physical, redundant failover configurations involve significant engineering challenges to support old hardware modules with outdated components as various components encounter an end of life hardware failure and need physical replacement. This is further complicated as existing systems typically require formal hardware/software System definitions which require engineering effort to adjust whenever a plant is expanded to increase production.

SUMMARY

At least one aspect of the disclosure is directed toward a system for dynamically load-balancing at least one redistribution element across a group of computing resources that facilitate an Industrial Execution Process [or a component of an Industrial Execution Process] structured in an M:N working configuration, the system comprising, a system configured to, monitor a M:N working configuration component operational data, capabilities or characteristics associated with the M:N working configuration, detect a load-balancing opportunity to initiate redistribution of at least one redistribution element to a redistribution target selected from a redistribution target pool defined by remaining M computing resource components associated with the M:N computing resource working configuration, fail to identify at least one redistribution target from the redistribution target pool for redeployment of the at least one redistribution element, request supplemental M:N working configuration computing resource, redeploy the at least one redistribution element to the supplemental M:N working configuration computing resource as a redistribution target, and determine viable redeployment of the at least one redistribution element to the at least one supplemental M:N working configuration computing resource redistribution target.

In some embodiments, the system may further comprise facilitating redeployment when the load-balancing opportunity involves Resource Failure Detection load balancing. Additionally, at least one redistribution element may be associated with a failed M:N working configuration component and/or computing resource.

In some embodiments of the system, at least one redistribution element is an Application executing on the failed M:N working configuration component and/or computing resource. Further, at least one redistribution element may include an Application and a corresponding Work Item executing on the failed M:N working configuration component/computing resource. Additionally, the operational data, capabilities or characteristics associated with the at least one redistribution element may be compared with operational data, capabilities and characteristics associated with redistribution target pool components.

In some embodiments, the system may further comprise generating a minimum set of requested M:N working configuration component and/or computing resource capabilities and characteristics based on the at least one redistribution element.

In some embodiments, the system may further comprise generating an optimal set of requested M:N working configuration component and/or computing resource capabilities and characteristics based on the M:N working configuration resource capabilities and characteristics.

In some embodiments of the system, at least one redistribution element may be associated with an Active M:N working configuration component.

In some embodiments, the system may further comprise executing remediation operational state determination to determine viable redeployment that maintains M:N working configuration integrity.

In some embodiments, the system may further comprise maintaining M:N working configuration High Availability Requirements.

In some embodiments of the system, M:N working configuration integrity may be maintained and at least one M:N working configuration component Application or Work Item is suspended to maintain M:N working configuration integrity.

In some embodiments, the system may further comprise executing remediation operational state determination to determine viable redeployment, and determining M:N working configuration integrity has not been maintained.

In some embodiments, the system may further comprise generating a supplemental M:N working configuration component request that indicates the minimal supplement component requirements necessary to transition back to a viable M:N working configuration.

In some embodiments, the system may further comprise facilitating redeployment where the load-balancing opportunity involves Component Failure Simulation Validation.

In some embodiments, the system may further comprise simulating iteratively M:N working configuration component failure for each component in a M:N working configuration.

In some embodiments, the system may further comprise executing a Z Validation Degree computing resource failure simulation, wherein Z is greater than or equal to 1, and validating the M:N working configuration with supplemental M:N working configuration resource is robust.

In some embodiments, the system may further comprise generating a robust M:N working configuration remediation supplemental M:N+R working configuration component/computing resource request to facilitate transitioning to a robust M:N working configuration.

In some embodiments, the system may further comprise activating redistributed elements along with corresponding application or work item operational data stored in a data services module at or near the time of the computing resource failure.

According to one embodiment, a method is provided for dynamically load-balancing at least one redistribution element across a group of computing resources that facilitate an Industrial Execution Process and/or a component of an Industrial Execution Process, structured in an M:N working configuration, the method comprising, monitoring a M:N working configuration component operational data, capabilities or characteristics associated with the M:N working configuration, detecting a load-balancing opportunity to initiate redistribution of at least one redistribution element to a redistribution target selected from a redistribution target pool defined by remaining M computing resource components associated with the M:N computing resource working configuration, failing to identify at least one redistribution target from the redistribution target pool for redeployment of the at least one redistribution element, requesting supplemental M:N working configuration computing resource, redeploying the at least one redistribution element to the supplemental M:N working configuration computing resource as a redistribution target, and determining viable redeployment of the at least one redistribution element to the at least one supplemental M:N working configuration computing resource redistribution target.

In some embodiments, the method may further comprise facilitating redeployment when the load-balancing opportunity involves Resource Failure Detection load balancing. Additionally, at least one redistribution element may be associated with a failed M:N working configuration component and/or computing resource.

In some embodiments of the method, at least one redistribution element is an Application executing on the failed M:N working configuration component and/or computing resource. Further, at least one redistribution element may include an Application and a corresponding Work Item executing on the failed M:N working configuration component/computing resource. Additionally, the operational data, capabilities or characteristics associated with the at least one redistribution element may be compared with operational data, capabilities and characteristics associated with redistribution target pool components.

In some embodiments, the method may further comprise generating a minimum set of requested M:N working configuration component and/or computing resource capabilities and characteristics based on the at least one redistribution element.

In some embodiments, the method may further comprise generating an optimal set of requested M:N working configuration component and/or computing resource capabilities and characteristics based on the M:N working configuration resource capabilities and characteristics.

In some embodiments of the method, at least one redistribution element may be associated with an Active M:N working configuration component.

In some embodiments, the method may further comprise executing remediation operational state determination to determine viable redeployment that maintains M:N working configuration integrity.

In some embodiments, the method may further comprise maintaining M:N working configuration High Availability Requirements.

In some embodiments of the method, M:N working configuration integrity may be maintained and at least one M:N working configuration component Application or Work Item is suspended to maintain M:N working configuration integrity.

In some embodiments, the method may further comprise executing remediation operational state determination to determine viable redeployment, and determining M:N working configuration integrity has not been maintained.

In some embodiments, the method may further comprise generating a supplemental M:N working configuration component request that indicates the minimal supplement component requirements necessary to transition back to a viable M:N working configuration.

In some embodiments, the method may further comprise facilitating redeployment where the load-balancing opportunity involves Component Failure Simulation Validation.

In some embodiments, the method may further comprise simulating iteratively M:N working configuration component failure for each component in a M:N working configuration.

In some embodiments, the method may further comprise executing a Z Validation Degree computing resource failure simulation, wherein Z is greater than or equal to 1, and validating the M:N working configuration with supplemental M:N working configuration resource is robust.

In some embodiments, the method may further comprise generating a robust M:N working configuration remediation supplemental M:N +R working configuration component/computing resource request to facilitate transitioning to a robust M:N working configuration.

In some embodiments, the method may further comprise activating redistributed elements along with corresponding application or work item operational data stored in a data services module at or near the time of the computing resource failure.

According to one aspect, a non-transitory computer readable medium storing sequences of computer-executable instructions for dynamically load-balancing at least one redistribution element across a group of computing resources that facilitate an Industrial Execution Process and/or a component of an Industrial Execution Process, structured in an M:N working configuration, the sequences of computer-executable instructions including instructions that instruct at least one processor to, monitor a M:N working configuration component operational data, capabilities or characteristics associated with the M:N working configuration, detect a load-balancing opportunity to initiate redistribution of at least one redistribution element to a redistribution target selected from a redistribution target pool defined by remaining M computing resource components associated with the M:N computing resource working configuration, fail to identify at least one redistribution target from the redistribution target pool for redeployment of the at least one redistribution element, request supplemental M:N working configuration computing resource, redeploy the at least one redistribution element to the supplemental M:N working configuration computing resource as a redistribution target, and determine viable redeployment of the at least one redistribution element to the at least one supplemental M:N working configuration computing resource redistribution target.

DETAILED DESCRIPTION

The present disclosure describes features and functionality that facilitate managing a BCHA system of BCHA computing resources to achieve a specified availability to a BCHA system (e.g., industrial control system) to enable the BCHA system to deliver and maintain required Availability and/or functionality at a specified quality and lower cost without the need for 1:1 physical failover redundancy for each computing resource/machine. The disclosed technology utilizes a pool of multiple BCHA computing resources to facilitate dynamically achieving and maintaining the necessary high availability requirements for a particular BCHA system. In some embodiments, the disclosed technology monitors and reports a key performance indicator (KPI) such as BCHA system and/or BCHA computing resource availability and generates operational system metrics/recommendations for system operators to achieve the real time reliability and availability targets established for a particular BCHA system. The BCHA system described can also simulate how certain actions (e.g., adding or removing one or more computing resources) will impact, affect such availability and reliability metrics, and dynamically load-balance accordingly to facilitate achieving reliability and availability targets for the BCHA system and/or particular BCHA system components.

Figure 1B:
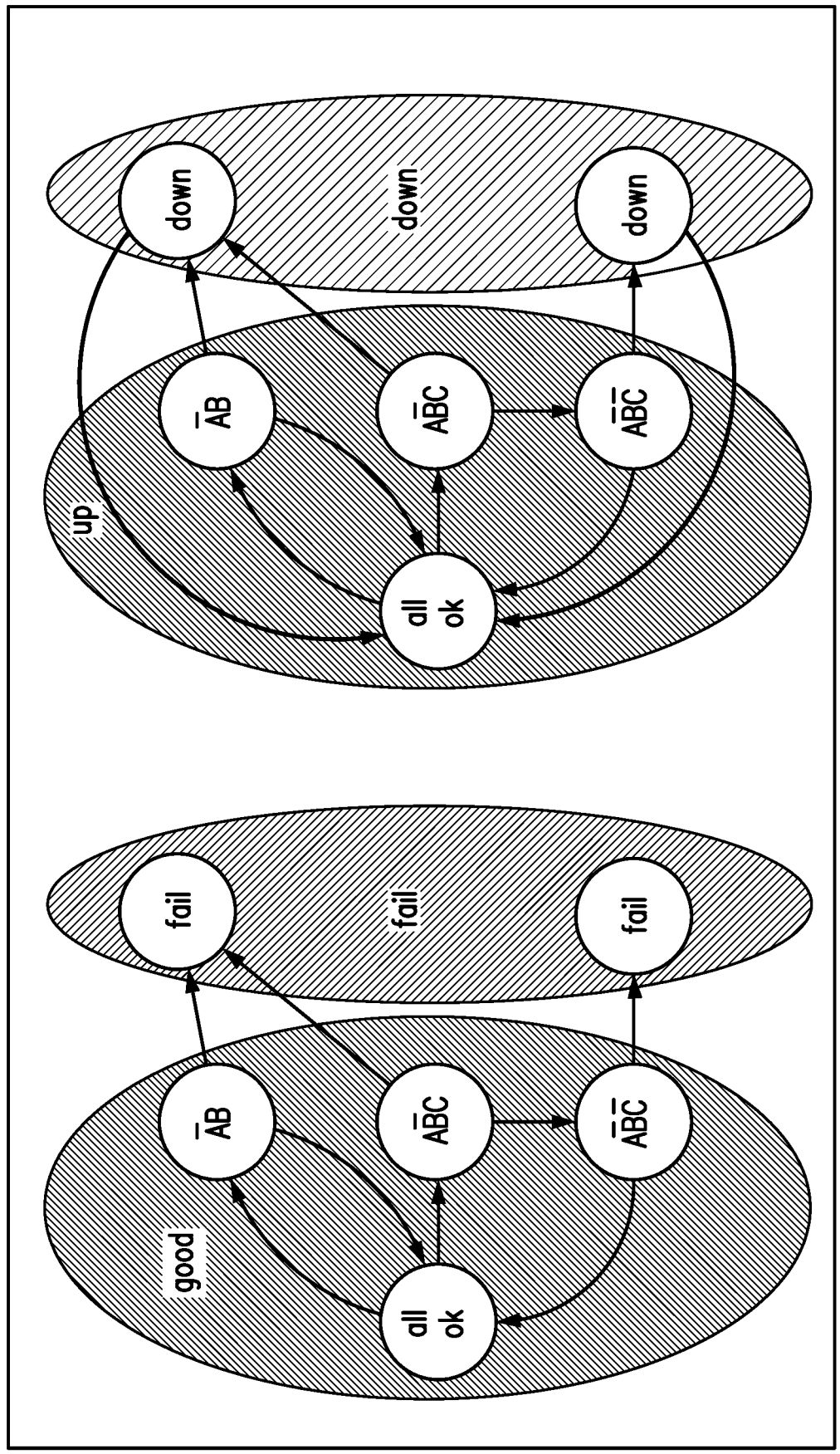

FIGS. 1A-B are block diagrams illustrating aspects of the relationship between a reliable system and an available system which are two key issues that Boundaryless Computing High Availability ("BCHA") systems address—more specifically a BCHA system analyzes BCHA system, BCHA component computing resource, BCHA component application and required BCHA component work item availability in order to distribute BCHA system redistribution elements including BCHA applications and BCHA work items ("WI") in order to dynamically manage and maximize system availability.

FIG. 1A illustrates a generic Markov diagram for failure without repair on the left side of the Figure. The right side of FIG. 1A, illustrates a generic Markov diagram for a failure that can be repaired and accordingly illustrates aspects of "Availability". In the examples illustrated in FIGS. 1A and 1B, Availability ("A") is the probability that a system/system applications are operating properly when needed for use. In other words, availability is the probability that a system is working, i.e., not failed or undergoing a repair action and therefore unusable. Reliability accounts for the time that it will take a component, part or system to fail while it is operating. It does not reflect how long it will take to get the unit under repair back into working condition, can be repaired or requires replacement. For example, a light bulb is a reliable element—eventually it will fail. However, once it has failed, it cannot be repaired and is thrown away. The lighting system for a building is an available system. When a bulb fails, one can replace it by another, but the replacement of the system component involves resource coordination and perhaps system component down time.

If a system can be split and managed across multiple computing resources, then the reliability of the system is increased in relation to a one computing resource system. For example, improved reliability/availability may be determined using $$\frac{F}{F_{100}} \approx k\frac{n-1}{n-k}.$$

In an example of sixteen machine node split into and managed across four discrete systems involves the following calculation:

$$\frac{16-1}{16-4} = 4\frac{15}{12} = 5.$$

The example system has five times more availability, which means if full capacity is to be maintained and a single system has a mean time between failures (MTBF) of ten years, then the split system has a MTBF of fifty years. If a system is split into k parts, then the chance of losing more than 1/k of its capacity is many, many times less than the change when a single system implemented on a single computing resource loses all its capacity. Depending on the scope/scale of the system, distributed availability can be measured in centuries.

In a BCHA system, which can comprise BCHA computing resources that include software and hardware elements (e.g., applications, components, modules, machines, logical hardware elements, software frameworks, communication frameworks, and the like), that control a process or process segment, availability ensures that important control algorithms, applications and work items continue running without interruption. Accordingly, system availability is the calculated availability based on the machines, computing resources, control applications, applied redundancy schemes, and the like, as well as the ability to maintain high availability operational states that ensure the system is available through managing and coordinating BCHA computing resources, BCHA applications, and BCHA work items.

As illustrated in FIG. 1C1, existing implementations achieve Industrial Control Systems ("ICS") high availability by building systems that have duplicative, physically redundant backup/failover hardware. These one to one (1:1) redundant hardware dedicated computing resource pair High Availability solutions may be cost prohibitive depending on the scope and scale of the system. Such systems use multiple one to one (1:1) redundant hardware dedicated computing resource pair, where a control application deployed on a primary machine can failover to a secondary or backup compute resource/machine in the event of a failure of the primary compute resource/machine. This setup of 1 to 1 redundant hardware dedicated computing resource pair provides high availability, but has the drawback of requiring two dedicated computing resources/machines for each control application, results in double the cost of the machines as well as poor scalability. Moreover, existing technologies use a Mean Time Between Failure and a Mean Time To Repair (MTBF and MTTR) set of functions to determine reliability metrics that are traditionally hardware component failure calculations. These calculations are performed during design and manufacture and are mostly static and may only be updated, only when hardware element (and their redundant failover hardware are introduced into the system and/or when system components change.

These and various other disadvantages of 1:1 architectures, as well as MTBF and MTTR reliability metrics are overcome by the features and functionality of the Boundaryless Computing High Availability ("BCHA") system described herein. Additional benefits may be realized by implementing a BCHA system as an M:N working configuration redundant system illustrated in FIG. 1C2, utilizing BCHA computing resources, BCHA applications, and BCHA work items. For example for a BCHA system:

(a) Availability can be specified as needed by a particular application and based on related control needs, instead of simply to comply with a 1:1 redundant control requirement;

(b) applications engineers do not have to consider the assignment of control loops to specific hardware—thereby reducing engineering time and simplifying engineering effort;

(c) obviating a 1:1 hardware requirement opens the possibility to support Availability Requirements through the use of Virtualized BCHA computing resources provisioned on IT servers; and (d) in some instances IO can be located remotely from a BCHA computing resource.

As used herein, Boundaryless Control (BC or bc) is a utilization of Boundaryless computing to control an industrial process, plant or operation. More specifically, Boundaryless control involves a flexible set of architecture principles, technologies, method and tools enabling the optimization of automation solutions throughout their lifecycle by leveraging evolved IT technologies and abstracting high level functions to facilitate a system that is scalable and expandable without limitations grounded in underlying operational hardware or software components, platform or applications. Boundaryless control systems facilitate and achieve this flexibility through utilizing a software defined application layer; a flexible and reliable communication backbone, smart connected assets, and a hard platform designed to leverage current technologies in a way that is also extensible and updatable to work with hardware resources as technology continues to evolve.

Advantageously, a BCHA machine or a BCHA computing resource can be a physical machine or a virtual machine with an operating system capable of hosting one or more BCHA applications. As used herein, a virtual machine (VM) includes a BCHA computing resource emulating a particular (or part of a) computer system. VMs operate based on the computer architecture and functions of a real or hypothetical computer and their implementations may involve specialized hardware, software, or a combination of both. In accordance with some embodiments, a BCHA computing resource has BC software resource that has three components/aspects that facilitate BCHA system/component operational infrastructure features/functionality: (1) the BCHA machine configuration aspect, (2) the BCHA physical computing resource/machine aspect, and (3) the system management aspect. As used herein, a BCHA computing resource is a resource capable of running one or more BC applications. A BCHA application can have four aspects in some embodiments. These include (1) role aspect, (2) instance (runtime) aspect, (3) visualization aspect, and (4) system management aspect.

A BCHA application or BCHA Control application has executable code that performs one or more functions within a BCHA computing resource. In some embodiments, a BCHA application (runtime) instance is provisioned as a separate executable independent of other BCHA applications. In various embodiments, a BCHA application can facilitate process control features and functionality, such as control algorithms, process optimization, cyber-physical computations, and the like. In some implementations, the BCHA applications may be configured to execute BCHA work items.

For BCHA work items, the fundamental concept is that software and firmware applications perform work, e.g., calculations or control elements. This work can be the execution of control algorithms, the scanning of IO, multi-variate computations, cyber-physical computations, etc . . . BCHA applications are deployed as software/firmware to BCHA computing resources, which are in turn computational elements defined as BCHA computing resource/Machines which bind infrastructural elements with a computational element. The computational engines which form a BCHA computing resource/Machine can be physical computers, virtualized machines or Containers.

A BCHA application can use the BCHA data services to exchange information with other BCHA applications, applications, heritage service, IA runtime, and the like. In some embodiments, groups outside a development organization can create BC applications, enabling full third party extensibility of a BC application or series of applications executing in a cloud/fog/edge/mist (and/or some combination thereof). A BCHA application can be a provider endpoint (EP) and/or a consumer EP.

In example BCHA system implementations involving an Industrial Control System (ICS), some BCHA control applications specialized in process control are used to control critical processes such as running safely within the thresholds set by the safety system (e.g., to avoid being switched off by a safety system) and producing products that meet certain specifications at the lowest possible cost. Some BCHA applications can also be used to optimize processes (and/or aspects of processes) and/or ensure BCHA system regulatory control compliance associated with the ICS process operation. For example, some control applications help run processes more economically, for example, using less energy, reducing the use of peak power, reducing use of expensive feed stock while maintaining quality, reducing footprint of the solution, and the like.

The BCHA system and architecture described herein manages BCHA computing resources in a way to load-balance BCHA applications while managing and coordinating BCHA system components to achieve system availability metrics. BCHA system availability requirements may be established to maintain BCHA application features/functionality. In some implementations, BCHA system availability may be established with additional thresholds that initiate remediative action based on risk tolerances of a system operator, the characteristics/operational constraints associated with a particular process and/or application, and/or a variety of other operational metrics. In some implementations, the BCHA system includes operational characteristic/constraint optimization features and functionality that achieve the required availability, as well as functionality balancing one or more operational constraints, such as at a specified manufacturing quality, acceptable safety metrics, and/or lowest possible cost.

In M:N working configuration operational implementations, one to one redundancy requirements for each machine are obviated leading to further system/operational cost efficiencies. In M:N operational implementations, a BCHA Control module manages and coordinates the BCHA application 268 across current BCHA computing resources to achieve and dynamically maintain the necessary high availability operational state utilizing only existing BCHA system components. In M:N+R operational implementations, a BCHA Control modules manages and coordinates the BCHA applications across current BCHA computing resources, but also requests additional Resource "R" to in additional to the existing BCHA computing resources provided to achieve the necessary high availability operational state. Advantageously, in an M:N+R working configuration, a 1:1 physically redundant, hardware requirement can still be avoided—the BCHA Control module may calculate/determine an appropriate amount of "R" supplemental/additional requested BCHA computing resource to provision with the existing BCHA computing resources to achieve and maintain established availability requirements, as well transition to a viable M:N working configuration once the additional BCHA computing resource is provisioned. The BCHA Control module can determine, coordinate and manage the BCHA computing resources to achieve machine/overall system availability in real time based on the BCHA system attributes—including BCHA system component capabilities and characteristics of the BCHA computing resources, BCHA applications, BCHA work items and distribution/management of the BCHA system components. As used herein, BCHA capability or characteristic is an BCHA attribute that defines an operational parameter or constraint of a BCHA computing resource, BCHA application and/or BCHA work item. Examples include but are not limited to: CPU impact, colocation requirements, memory needs, data service needs, CPU type requirement and co-location with other BC applications, application process criticality and/or the like.

In some embodiments, a BCHA system achieves high availability by BCHA Control applications to deploy, coordinate and manage BCHA applications/BCHA work items across computing resources in a M to N working configuration. A BCHA computing resource can host any BCHA application which is provisioned so long as the BCHA Attributes—BCHA system component capabilities/characteristics make it a suitable host. A single BCHA computing resource does not necessarily need to be fully redundant in nature, however more than one BCHA computing resources may be needed to achieve high availability.

The following sequence of Figures discuss various examples of additional BCHA system features/functionality that compound the high availability efficiencies achieved through BCHA application. For example, BCHA systems can have (1) increased reliability metrics, (2) provide reliable BCHA system components/computing resources, (3) decrease/minimize BCHA system down time, (4) decrease the time to detect BCHA computing resource BCHA application failure, (5) decrease the time to read/write data from/to the BCHA data services, 6) decrease the time for BCHA application redeployment, (8) provide alternate BCHA computing resources without a 1:1 physical, redundant failover requirement, (9) dynamically distribute BCHA applications over BCHA computing resources creating the optimal physical/virtual BCHA computing resource balanced usage, (10) switch BCHA applications to alternate BCHA computing resource in case a BCHA computing resource fails in a M:N working configuration or a M:N+R working configuration as appropriate, (11) minimize the time for a BCHA redistribution elements (e.g., BCHA application(s) and/or BCHA work items) to redeploy and continue on an alternate BCHC computing resource(s), as well as other BCHA benefits, solutions, features and functionality that are described in greater detail with regard to the Figures.

In some embodiments, BCHA system high availability requirements can be achieved via a BCHA Reliability Engine module which uses constraints (e.g., resource constraints, application constraints, process constraint alone or in coordination with BCHA system component capabilities, characteristics and/or operational data) to calculate the availability of the BCHA system. In some embodiments, the BCHA Reliability Engine module can be implemented as a component integrated with a BCHA Control module and make availability improvement recommendations or take actions such as:

(i) use the available (e.g., regained) computing resource/compute power to move and restart a critical application, taking into account potential action by the safety system; and/or (ii) in resource limited states, switch off the least critical or noncritical application.

The BCHA system facilitates optimizing toward and load-balancing based on availability selection by providing real time feedback on the overall BCHA system availability and/or a number of other BCHA system balancing optimization characteristics (e.g., computing resource application load levels). An optimal availability M:N working configuration may involve no Active redundancy for some BCHA applications (e.g., noncritical control application may be disabled or inactivated in the event of failure of a machine or resource and/or easily reinitiated on other BCHA computing resource(s)). In other examples, an optimal availability may involve even more availability through running active, redundant BCHA computing resources/BCHA application(s) (e.g., N to N redundancy where every online BCHA computing resource could potentially be used for failover, M:N redundancy where if one BCHA computing resource goes down, the BCHA applications/BCHA work items executed on the BCHA computing resource are redistributed to the remaining M BCHA computing resource associated with the M:N working configuration). The desired or specified availability a BCHA system facilitates enables a process to deliver products at a specified quality and lower cost without the need for 1:1 physically redundant, hardware for each computing resource.

Another advantage of the disclosed technology is that the system is self-healing. In a control system with M:N redundancy and/or if a BCHA Control module requests additional BCHA computing resource (e.g., M:N+R working configuration), as redeployment targets are selected (and/or provisioned and available for a M:N+R working configuration), they can be utilized to facilitate increased availability metrics, as well as lower the production cost.

In accordance with the disclosed technology, high availability can be achieved (e.g., in the event of a failure of a BCHA computing resource) by:

(i) Dynamically managing a M:N working configuration to facilitate a redundant system architecture; and/or (ii) BCHA Control applications actively monitoring system health/dynamically managing BCHA system components as the BCHA computing resources, BCHA application(s), and/or BCHA work items to facilitate an Industrial Execution Process or an Industrial System Control component associated with an Industrial Execution Process.

In some implementations, a BCHA Control module can temporarily or indefinitely suspend BCHA applications with lower priority/criticality and using the BCHA computing resources made available to run higher priority/critical BCHA applications. As used herein, BCHA application priority/criticality is an indication of how important a particular BCHA application is for an Industrial Execution Process. In some implementations, High BCHA application priority/criticality indicates that failure of the BCHA application can result in the safety system bringing a process to a safe state faster than for lower BCHA application priorities. This is useful measure to determine what type of BCHA computing resources can be requested and provided quickly and efficiently to facilitate a BCHA system repair time that happens before the safety system shutdown the Industrial Execution process.

FIG. 1C2 introduces aspects of a BCHA system architecture, as well as aspects of core BCHA system features and functionality—both of which are discussed in much greater detail throughout the subsequent Figures and corresponding text in the specification.

In some embodiments, a high availability controller works in coordination with a reliability engine to provide real-time metrics for the overall BCHA system to provide an indication of the control system's reliability and availability metrics. For example, some of the metrics can indicate that a few standby machines could potentially provide even higher availability than a dedicated one to one redundancy approach could provide.

FIG. 1C1 is a block diagram illustrating an example of a system implementing a 1:1 physical hardware failover/redundancy architecture. More specifically, each of the computing resources 105A1-105E1 have a dedicated 1:1 physically, redundant computing resource operatively connected in parallel as 105A2-105E2. In this type of example, the computing resources each have dedicated, redundant computing resources that may sit in an inactive state, unused until a failure is detected. Alternately, in some time sensitive implementations, the computing resources 105E1 and 105E2 may be running the same applications concurrently with only one actively participating in the system. Accordingly, if computing resource 105E1 fails, computing resource 105E2 steps into an active role, while minimizing any data, time switchover losses. However, as discussed above, this type of system has significant drawbacks.

FIG. 1C2 is a block diagram illustrating an example of a BCHA system 100 implementing an M:N working configuration architecture in accordance with some embodiments of the disclosed technology. BCHA applications ("BCHA App X") can be distributed across multiple computing resources 105A3-105E3. One or more BCHA applications (bcApps) can be provisioned to a BCHA computing resource. For example, the BCHA computing resource 105B can execute BCHA App A and BCHA App D. The BCHA system 100 also includes a BCHA Control module 120 with a BCHA reliability engine module 120. Additional improvements in efficiency and system efficacy are also achieved by implementing a BCHA data services module 130. Depending on the particular implementation, data storage services may be distributed or centralized. For the purposes of this discussion, the BCHA data services are illustrated as a central data store that each of the computing resources connect with and provide BCHA computing resource, BCHA application, as well as BCHA work item configuration data, status data, output data and other related BCHA system operational data parameters. As used herein, provisioning is the capability to install and activate a computing resource on a hardware starting point instance, as well as, an initiate a BCHA application and/or BCHA work item on a particular BCHA computing resource.

In some embodiments, the BCHA Control module 115 and BCHA Reliability Engine module 120 monitor system health and operational data such as BCHA computing resource availability and loading for each of the BCHA application instances executing on each of the respective computing resources 105A-105E across a M..N working configuration. In FIG. 1C2, the BCHA Control module 115 can detect if BCHA computing resource 105E3 fails and work to redistribute BCHA App E to an appropriate alternate BCHA computing resource within the M:N working configuration. As illustrated BCHA App 3 is redeployed to BCHA computing resource 105A3. Furthermore in some implementations, to the BCHA Control module 115 can also temporarily suspend BCHA App A or Redeploy BCHA App A to a different BCHA computing resource as appropriate to facilitate a redeployment. As illustrated, the BCHA Control module shifts BCHA App A to BCHA computing resource 105B3 to facilitate redeployment of BCHA App E to BCHA computing resource 105A3. Aspects of BCHA system load balancing are discussed in greater detail with regards to the FIGS. 5A-7C.

In some embodiments the BCHA system coordinates BCHA computing resource activity to achieve availability is at least as high as the High Availability requirements which defined for whichever BCHA application is the highest priority/most critical BCHA application. The BCHA Reliability Engine module 120 utilizes BCHA application attributes, that identify availability capabilities/characteristics of the BCHA application(s)/BCHA computing resource(s) ("BCHA system attributes") to manage and monitor the availability of the system. In some embodiments, BCHA Reliability Engine module 120, in managing the BCHA system availability requirements, can utilize BCHA computing resources attributes and ultimately identify which computing resources are suitable as a redistribution target for the redeployment of a given BCHA application.

Managing the BCHA system availability can include, for example, using BCHA application attributes to determine the BCHA system's requirements for BCHA computing resources, which can then be used to facilitate coordinating and managing provisioning rules, active BCHA application management, BCHA computing resource load-balancing and/or the like. As used herein, a BCHA application attribute is an accessible parameter of a BCHA computing resource, a BCHA application, and/or a BCHC work item. Depending on the BCHA application, application or work item, an attribute generally has an identification, data type, security, classifications (runtime and/or input and/or config), and the like. Some BCHA attributes give the user the possibility to configure a BCHA application. Runtime attributes may have a quality indication and/or a time indication. Values of some attributes can be dynamically changed based on another BCHA attribute in the system (i.e., input parameters). BCHA Attributes are data parameters stored in the BCHA data services module 130 and will be discussed in greater detail below as characteristics, capabilities, and/or operational constraints.

In some embodiments, the BCHA Reliability Engine module 120 can be implemented on a controller (not shown). In other embodiments, the BCHA Reliability Engine module 120 can be deployed in coordination with or as integrated with on a BCHA Control module 115 or independently executed on one more of the BCHA computing resources (e.g., resources 105A-E). The BCHA Control applications BCHA Commissioner module 110, BCHA Control module 115, and BCHA Reliability Engine module 120 as described above can facilitate control application provisioning, load-balancing, caching of data (e.g., control application data), monitoring status, operation, performance, and the like. BCHA computing resources/BCHA Applications interface with the control applications via an application programming interface (API) in some embodiments.

The BCHA data services module 130 may utilize multiple technologies. For example, a faster technology providing high-speed and low latency may be utilized for run-time and external IO data access, and a slower technology for configuration data access. In some embodiments, some of the data may be cached more local to the BCHA application instance such as on the BC resources for improved performance. The BCHA data services module 110 ensures that data can be written in a timely manner and that data is available in a timely manner to BCHA computing resources, BCHA applications and BCHA work items. In some embodiments, the data service read/write access ability is at least as fast as needed by the fasted BCHA application.

In accordance with the disclosed technology, the BCHA Control module 115 can actively manage and re-deploy a BCHA application/ BCHA work item from one BCHA computing resource to another. For example, in the system 100, the BCHA Control module can move BCHA App A from BCHA computing resource 105A3 to resource 105B3 (e.g., due to resource 105A being down or to create availability for a redeployment). The decision to move to resource 105B may be based on the operational characteristics and/or system metrics (e.g., cached and/or accessed from the BCHA data services module 130). For example, BCHA App A may be a critical application and resource 105B may have computing resource available to execute BCHA App A. BCHA App A, moving from one resource to another resource, can resume within the time constant of the process section or segment the control application (BCHA App A in this example) controls.

In some embodiments of the disclosed technology, some BCHA applications can be critical while others can be noncritical. The noncritical BCHA applications can be given lower priority for failover in some instances. For example, in the BCHA system 100, BCHA App E may be a noncritical control application, and in order to maintain availability of the overall system, bcApp E may be suspended not be restarted on another resource if processing availability does not exist. When BCHA processing availability does exist for example, on BCHA computing resource 105A, the noncritical BCHA application App E can be provisioned thereon and restarted/or pick up in the middle of processing by accessing the last viable date state from BCHA data services module 130.

Accordingly, the BCHA systems, features and functionalities described facilitate significant gains in a BCHA system's abilities to:
  achieve, monitor and maintain high-availability system requirements for a number of networked, connected devices;
  significantly reduce hardware and resource requirements and expenses through implementation of M . . . N failover architectures instead of 1:1 physically redundant, fail-over architecture; and
  achieve improved system architectures management through M:N+R working configuration that ultimately facilitate more robust M:N working configurations through supplemental resource commissioning/deployment.

Accordingly, in order to illustrate various aspects of each of these core BCHA system benefits/optimizations, as well as related system benefits and efficiencies realized by implementing a BCHA system architecture the following description will discuss aspects of:
  (1) how a BCHA system is developed/commissioned;
  (2) BCHA system features and functionality, and related logic flows associated with various operational features and functionality for HA-M:N Validation Load-Balancing, as well as a failure detection/remediation;
  (3) a working example of a BCHA load-balancing failure detection/re-mediation; and (4) BCHA system HA-M:N Validation Load-Balancing supplemental computing resource commissioning/distribution.

FIG. 2A illustrates aspects of components associated with Boundaryless Control High Availability (BCHA) architectures and components of a BCHA system 200. The BCHA System Commissioner module 210 is a BCHA system module responsible for receiving and executing a BCHA system development commissioning plan during initial BCHA system development. After the system is commissioned, operational management transitions to the BCHA Control module 215 to coordinate work item management and BCHA system load balancing (Resource Failure Detection load-balancing, as well as Active load balancing/M:N working configuration validation). In some implementations, the BCHA System Commissioner module 210/BCHA Control module 215 may also have roles in provisioning computing resources, applications and/or work items after initial BCHA system development as Supplemental/Additional BCHA computing resources 240/250 are provided for the BCHA system 200. Depending on the particular implementation details, the BCHA commissioner module 210 may be instantiated on its own BCHA computing resource, incorporated with the BCHA Control module 215 or in some implementations the commissioner features/functionality either integrated with BCHA Control module 215 and/or executed remotely as a cloud service.

After the BCHA System Commissioner module 210 validates initial configuration and commissioning of the BCHA system 200, the BCHA Control module 215 drives operational run-time management working to achieve the availability requirement/metrics defined in the BCHA system development commissioning plan. One or more BCHA computing resources 240/250 may be provisioned by the BCHA System Commissioner module 210 to effectively host the BCHA applications 268 executed by the BCHA system 200, as well as the BCHA work items 270 executed on respective BCHA applications. BCHA System Commissioner module 210 is configured to achieve most of the commissioning functionality associated with the BCHA system 200, but works with two BCHA control applications 205 that have specialized utility: (1) the BCHA Application Configurator 211—used for developing BCHA work items; and (2) a BCHA Control Application Configurator 212 used for developing BCHA control applications 205 such as the BCHA Control module 215, the BCHA Reliability Engine module 220 and the BCHA WI Pool Manager module 221. Ultimately, the BCHA computing resources 240/250, BCHA applications 268 and respective BCHA work items 270 are commissioned and managed to facilitate an Industrial Execution process. Given the flexibility of the BCHA system 200, the Industrial Execution process may be an entire workstream, industrial control process or an element/component workstream within an industrial control process—e.g., coordinating a manufacturing line or elements of the manufacturing line such as a conveyer assembly.

The configuration, operational and BCHA system management data, for the BCHA system 200 is stored in BCHA data services module 230. The BCHA Control module 215 manages (or works with BCHA WI Pool Manager module 221 to manage) work item distribution. In the event of BCHA computing resource 240/250 failure—BCHA application/BCHA work item failure, storing the BCHA computing resource, BCHA application, BCHA work item configuration data, as well as the operational/output data centrally (or distributed but independently from local storage at the respective computing resource) leads to significant system flexibility and facilitates one of the key benefits of M:N architecture—if one computing resource fails, the high availability controller can redistribute/re-deploy application(s) and work item(s) from one computing resource to another quickly and efficiently.

As illustrated in FIG. 2A, BCHA data services module 230 is configured as a centralized data store/database that stores and makes accessible various commissioning system/computing resource/application characteristics and capabilities. The data stored in the BCHA data services module 230 is used by the BCHA Control module 215 working in coordination with the BCHA Reliability Engine module 220 to actively/passively monitor system health, system operational characteristics and works to achieve BCHA system availability metrics/requirements for the system 200, and the BCHA work item ("WI") Pool Manager 221.

Depending on the nature of available resources, the BCHA computing resources 240/250 associated with a particular BCHA system may be a heterogenous mixture of a variety of physical BCHA computing resources 240 or Virtual BCHA computing resources 250 provisioned based on a diverse spectrum of heterogenous computing resource hardware starting points. The physical and virtual computing resources may be configured and built upon any number of bare metal platforms. For example, in FIG. 2A, physical BCHA computing resource 240 is illustrated as a being provisioned based on a BC HW resource 243, which may be something as straightforward as a Raspberry Pi, alternately physical computing resource 241 may be developed from an on-premise PC-Server hardware resource 246. Similarly, Virtual BCHA computing resources 250 may be developed using virtual machines hosted on-premise PC-Server HW Resources 253, on-premise cloud computing resources 256, and/or public could computing resource 259 computing resource starting points. For the BCHA system 200, regardless of the underlying computing resource starting point, the BCHA System Commissioner module 210 instantiates the BC HW Resource Starting Point 262 with BC Resource Operating System 264 and BCHA Resources 266 that include logistical software components such as BCHA Technology Stack Services, BC Machine Software and/or Container Management Services, as well as the BCHA applications 268. As will be described in greater detail in FIG. 3D, the BCHA application(s) 268 are the BCHA system elements that execute the BCHA work items 270 and in turn ultimately achieve the Industrial Execution process.

It is to be understood that the various BCHA system architecture described facilitates significant flexibility, and as such, a wide variety of BCHA system 200 implementations are possible. Various aspects of the BCHA system 200 features, functionality, data processing and storage may be re-configured to meet the operational constraints, needs and requirements of a variety of differing end implementations/Industrial Execution processes. For example, although FIG. 2A illustrates discrete system modules for BCHA data services module 230, BCHA System Commissioner module 210, BCHA Control module 215, as well as BCHA Reliability Engine module 220, the features/functionality associated with one or more of those modules may be implemented as discrete modules or for some BCHA system architecture implementations, incorporated with and/or distributed across one or more other BCHA system control applications 205 and/or other BCHA system modules/computing resources. Furthermore, depending on the nature of the particular Industrial Execution process application associated with the BCHA system 200, aspects of the underlying features or functionality may be configured to execute as event driven tasks, continuously looped activities, and/or some combination of the events/loops.

FIG. 2B is a flow diagram illustrating aspects of how a BCHA system Commissioner module 210 develops a BCHA system 200. More specifically, FIG. 2B is a flow diagram illustrating aspects of how the BCHA System Commissioner module 210 develops and commissions various BCHA computing resources 240/250 associated with a BCHA system 200 and works in coordination with other BCHA Control applications 205 in accordance with the BCHA system development commissioning plan, in step 273. In Step 275, the BCHA System Commissioner module 210 instantiates the BCHA data services module 230. After the BCHA data services module 230 is established, the BCHA System Commissioner module 210 compares available computing resource hardware starting points with the BCHA system development commissioning plan to check if sufficient computing resources can develop BCHA computing resources 240/250 to facilitate the Industrial Execution process, in step 276. Steps 281 and 284, involve identifying any additional bare hardware starting point resource requirements, accessing and any provided additional resources.

The BCHA System Commissioner module 210 iteratively provisions the BCHA computing resources 240/250 as well as instantiates appropriate BCHA application(s) 268 on the respective BCHA computing resources 240/250, in step 287. Each of the BCHA computing resources 240/250 and respective BCHA application(s) 268 are in turn, registered with the BCHA data services module 230, in step 290 (although illustrated as discrete steps, instantiation and registration may occur as the commissioning module works with each respective computing resource).

In step 293, the BCHA System Commissioner module 210 or a BCHA Control Application Configurator 211 works with one of the BCHA computing resources 240/250 to instantiate one or more a BCHA control application(s) 205 and corresponding computing resource(s). More specifically, a BCHA control application may be configured as the BCHA Control module 215 which also includes the BCHA Reliability Engine module 220 and/or BCHA WI Pool Manager module 221, both which are also registered with BCHA data services module 230. An aspect of commissioning/instantiating the BCHA Control module 215 and the Reliability Engine module 220 involves processing aspects of the BCHA system development commissioning plan, to develop availability and operational requirement metrics for the BCHA system. The BCHA Control module 215, the BCHA Reliability Engine module 220 and the BCHA WI management pool manager 221 manage and coordinate BCHA work items 270 across the registered BCHA computing resources 240/250 to maintain: (1) BCHA system operation, (1A) a viable M:N working configuration and (1B) BCHA High Availability Operational Requirements.

In some implementations, the BCHA Control module 215 will initiate load-balancing activities based on operational state or based on a computing resource failure detection(s). In step 294, as part of BCHA Control module 215 commissioning, the BCHA system control Application Configurator module 212 also instantiates the BCHA WI management pool manager 221. Once the WI pool is created, the BCHA System Commissioner module 210 instantiates and registers the initial set of work items with the BCHA data services module 230, as well as populates the pool with registered work items for distribution by the BCHA WI management pool manager 221, in step 295. After instantiating the various BCHA system elements, the BCHA system control applications 205 establish high availability/redundancy for BCHA system critical elements, such as the BCHA data services module 230, the BCHA Control module 215, and the BCHA Reliability engine module 220, in step 297. The BCHA System Commissioner module 210 validates the commissioned BCHA system architecture to confirm consistency with the BCHA system development commissioning plan. If the validation is successful, the BCHA system 200 then transitions into an operational state, in step 298. If there are any issues with the validation, the BCHA System Commissioner module 210 works with the BCHA system control applications 205 to rectify any issues/inconsistencies identified during the validation, and then transitions into the operational state.

After baseline BCHA system 200 development and instantiation, the BCHA Control module 215 monitors system health/load balancing metrics associated with the BCHA applications 268 processing BCHA work items 270 across the respective BCHA computing resources 240/250 as the BCHA system 200 works to achieve the Industrial Execution process. The Industrial Execution process is the ultimate execution goal of the process control system (or the respective workstream [or sub-workstream] that is the reason the BCHA system 200 was created to do—drive a manufacturing line or a component of a manufacturing line. An Industrial Execution process is identified and defined for a particular BCHA system and includes operational/configuration details as to some aspects of requirements for BCHA computing resource 240/250, BCHA applications 268, BCHA system availability/reliability metrics, and a variety of other operational characteristic/capability definitions that are used to develop BCHA foundational baseline system requirements. The baseline requirements are downloaded to BCHA System Commissioner module 210 and used effectively as a roadmap to develop the various components/elements associated with a BCHA system commissioning plan.

Aspects of the BCHA System Commissioner module 210 provisioning respective system elements and components, such as BCHA computing resources 240/250, BCHA applications 268, BCHA work items 270, BCHA data services module are described in greater detail with regards to FIGS. 3A-3F.

FIG. 3A illustrates aspects of a BCHA System Commissioner module and instantiation of a BCHA data services module 230. The BCHA system commissioning plan is downloaded to the BCHA System Commissioner module 210 and in turn used to instantiate BCHA data services module 230. The process starts with the BCHA System Commissioner module 210 instantiating some of the baseline BCHA system architecture data 300 in accordance with the commissioning plan. For example, the BCHA System Commissioner module 210 instantiates the preliminary data records for the BCHA computing resources 240/250 associated with the commissioning plan. The instantiated computing resource data and other BCHA system component data 305 are populated as each of the other components/elements are instantiated as the BCHA System Commissioner module 210 progresses developing the BCHA system 200 executing the configuration/commissioning process. The BCHA data services module 230 includes data parameters associated with the BCHA system architecture 300, the Industrial Execution process 301, BCHA component capability/characteristic data 302, operational data output data 303. The BCHA data services module 230 also includes data records associated with the BCHA control applications 205. BCHA system Commissioner module data 306, BCHA Control module data 307, BCHA Reliability Engine module data 308 as well as BCHA WI Pool Manager Data 309. BCHA system Component Data records 310 and related parameter data are also maintained for data associated with respective BCHA computing resources 311, 312, BCHA applications 313, 314, and 315 executing on the respective computing resources, as well as BCHA work items 316, 317, and 318 executed by the BCHA application 314. BCHA Control module The BCHA data services module 230 can be a highly available (centralized or distributed) data store/service (e.g., implementing redundancy) that is accessible to all the BCHA computing resources 240/250, BCHA applications 268/work items 270 executing on the computing resources 240/250, the BCHA commissioner module 210, the BCHA Control module 215 and the BCHA Reliability Engine Module 220, and the BCHA WI Pool Manager 221. In some embodiments, the data service availability is at least as high as the availability for the most critical BC application. In some embodiments, BCHA data services module 230 can also store data such as, but not limited to:

boundaryless name space management all BCHA computing resource 240/250, BCHA application 268 and BCHA work item 270 run-time data aspect BCHA application capability/characteristic data/parameters, application configuration data/parameters, application constraint data/parameters BCHA application operational status data/parameters; and all external IO data, IO VTQ, collected by external IO interfaces and stored in the data services by one or more BC IO applications.

FIG. 3B illustrates aspects of developing Boundaryless Control High Availability (BCHA) Architecture computing resources. In FIG. 3B, step 325, BCHA System Commissioner module 210 uses a BCHA system commissioning plan to develop the BCHA computing resources 240/250 necessary to execute BCHA applications 268 and BCHA work items 270 that in turn, execute the Industrial Execution process. The BCHA System Commissioner module 210 accesses the commissioning plan to determine number/type of BCHA computing resources 240/250 available meet the requirements established in the commissioning plan, in step 327. More specifically, BCHA System Commissioner module 210 confirms existing physical/virtual bare metal/starting point resources exist and are capable of configuration to meet Industrial Execution process BCHA computing resource processing requirements. In step 329, the BCHA System Commissioner module 210 requests additional resource starting points to satisfy any discrepancies between the Execution plan computing resource requirements and the available resource starting points. Once the additional resource is provided, in step 331, BCHA system the commissioning module re-validates the plan and available starting resources. After validation, the BCHA System Commissioner module 210 systematically provisions each BCHA computing resource starting point with the logistical software/firmware modules to facilitate BCHA services.

In step 333, the computing resource starting point is configured with an Operating System. Once the operating system is instantiated, BCHA System Commissioner module 210 con Figures (a) computing resource technology stack services, (b) BCHA Machine software, and/or (c) container management services, in step 335. With the computing resource logistical software components in place, BCHA System Commissioner module 210 iteratively instantiates computing resource BCHA application(s) 268 in steps 337, 338 for BCHA application(s) 268 associated with the particular BCHA computing resource(s) 240/250 thatare instantiated. The BCHA applications 268 are configured and commissioned in accordance with the requirements identified in the commissioning plan, for the particular BCHA computing resource(s) 240/250 and to facilitate the Industrial Execution process. BCHA application instantiation is discussed in greater detail in FIG. 3C. In step 340, the respective BCHA computing resource(s) 240/250 and corresponding BCHA applications 268 are registered with the BCHA data services module 230. Although this is illustrated as a discrete step, depending on the implementation, each BCHA computing resource(s) 240/250 and corresponding BCHA application(s) 268 may register with the BCHA data services module 230 after the BCHA System Commissioner module 210 completes the instantiation process. Step 342, illustrates iteration loop(s) as the BCHA System Commissioner module 210 progresses through instantiation and registration for each of the BCHA computing resources 240/250 associated with the BCHA system 200. After the BCHA computing resources 240/250 and corresponding BCHA application(s) 268 have been commissioned and registered, in step 344, BCHA System Commissioner module 210 starts instantiating BCHA control applications and work items 270 (discussed in greater detail in FIGS. 3D and 3E respectively).

FIG. 3C illustrates aspects of commissioning Boundaryless Control High Availability (BCHA) applications. As discussed with regards to the FIG. 3B, one aspect of commissioning the BCHA computing resources 240/250 involves instantiating the various BCHA application(s) 268 that the respective computing resources will execute to facilitate the Industrial Execution Process. FIG. 3C illustrates aspects of how each BCHA application 268 is instantiated. For each BCHA application 268 associated with a BCHA computing resource 240/250, the BCHA system control applications 205 instantiate as a series of services. More specifically, as illustrated State Services 345, WI Management Services 346, Health Service 347 and Data Services 348 are established for each BCHA application 268.

FIG. 3D illustrates aspects of instantiating BCHA system Control application(s) 205. The BCHA Control Application Configurator 212 is responsible for initial provisioning of BCHA system Control applications 205. BCHA system Control applications 205 have a similar start as BCHA applications 268 discussed above with regard to FIG. 3C and start as BCHA applications 268, instantiated on BCHA computing resources 240/250. The BCHA System Commissioner module 210 progresses a step further to provide BCHA Control application with additional enhanced features/functional modules that facilitate key hierarchical control roles 355 within the BCHA system 200. For example, the BCHA Control module 215 is developed as a BCHA computing resource 240/250 with BCHA application 268 that is enhanced with additional load balancing operational capabilities, as are the BCHA Reliability Engine module 220 and the BCHA WI Pool Manager 221.

The BCHA Reliability Engine module 220 is primarily responsible for working with BCHA Control module 215 to facilitate Resource Failure Detection load-balancing deployment and HA-M:N Validation load-balancing. The BCHA Reliability Engine module 220 may also monitor active BCHA system 200 availability/operational metrics to determine when WI load-balancing is appropriate. When the BCHA Reliability Engine module 220 conducts an operational state assessment and determines that load balancing is appropriate, the BCHA Control module 215 coordinates with BCHA WI Pool manager module 221 and facilitates re-deployment.

The BCHA Reliability Engine module 220/BCHA WI Pool Manager 221 facilitate various load balancing types through monitoring operational state/loading data and the re-deployment of BCHA work items 270. In Resource Failure Detection Load-Balancing, the BCHA Reliability Engine module 220 can detect BCHA computing resource 240/250 failure and initiate a BCHA Control module 215/BCHA WI Pool Manager 221 redistribution element redeployment to redeploy and load-balance of BCHA applications 268/BCHA work items 270 associated with the failed BCHA computing resource(s) 240/250.

As another example, BCHA Control module 221 can facilitate HA-M:N Validation Load-Balancing and simulate BCHA Computing resource failures to determine and validate a M:N working configuration ability to maintain High Availability requirements despite simulate BCHA computing resource failure.

These two examples of BCHA system load-balancing are illustrative of aspects of features and functionalities associated with the BCHA system and it is to be understood that other types of BCHA system load-balancing are also possible. These two types of BCHA system load-balancing will be the focus of FIGS. 5A-7C FIG. 3E illustrates aspects of developing Boundaryless Control High Availability (BCHA) Architecture work items. In FIG. 3E, BCHA work items 270 are created during the BCHA system 200 instantiation process as part of executing the BCHA system development commissioning plan. In step 357, BCHA System Commissioner module 210 works with the BCHA Application Configurator 211 atomizes an element of the Industrial Execution Process to create a BCHA work item 270 as a computational or control element unit that executable by a BCHA application 268. More specifically, in step 358 the BCHA System Commissioner module 210/BCHA Application Configurator 211 processes an Industrial Execution process element with a concrete generation model—for example IAS 88 Control Model 358A or 61580 Control Model 358B. In step 360, as part of the WI generation, BCHA System Commissioner module 210/BCHA Application Configurator 211 creates two parts to the work item: (1) a compartmentalized, self contained computational/control unit based on the concrete model; and (2) a work item abstraction model that includes metadata associated with the BC work item 270 (e.g., BCHA application execution type, WI processing execution/load requirements, timing constraints, input/output data element requirements, etc . . . ).

In step 362, the WI Pool Manager 221 processes the abstraction model to match and distribute work items 270 BCHA Control module 215 for execution by the BCHA process applications 268/BCHA computing resources 240/250. For example, in WI Assignment step 364, the BCHA WI Pool Manager 221 processes WI abstraction model 364A and determines the WI metadata indicates the WI has two operational characteristics (1) the WI needs an IEC 61131 BC application for execution; and (2) the WI will consume five execution/loading units on any BC computing resource 240/250 the work item 270 is ultimately assigned to. The WI Pool Manager 221 accesses BCHA data services module 230 and searches for any BCHA computing resources 240/250 that may be a match and identifies 364B—a computing resource 240/250 with WI API metrics indicating the BC application is an IEC 61131 BC application Runtime Instance; and has 25 execution/loading units available.

Depending on the nature of the application and implementation, the BCHA Control module 215/BCHA WI Pool Manager module may be configured to assign a BC work item 270 as soon as a match is found. Alternately, it may iterate through BCHA computing resources 240/250 to not only identify a potential match, but also identify an optimal match based on a variety of optimization methodologies/criteria.

In alternate embodiments, BCHA work items 270 (or groups of work items) may be pre-configured for a variety of process controls, preferred failover default targets, and/or included as pre-configured components within the BCHA system development commissioning plan. BC applications 268 for control and other functions in PLCs and DCSs focus on high granularity control applications. The high granularity facilitates the ability to break an Industrial Execution process down into these atomized elements and in turn create, a level of independence between the work item 270 and the underlying computing resource 240/250. So long as an BCHA application 268 is running that is capable of executing the BCHA work item 270, the BCHA computing resource 240/250 executing the BCHA application 268 is not directly critical. In a PLC environment typically "Programs" are created using any of the IEC 61131 languages. The created program is then sent to a PLC where it is executed. In DCS systems there is a mix of programmed control applications and configuration based control applications. However, in both scenarios the configuration is targeted to specific controllers within the system.

BCHA work items 270 define work to be performed by any BCHA applications 268 in the BCHA system 200 such as control, IO Scanning, Alarming, Multi-variate optimizations, Asset Management, etc. The BCHA work item 270 types will grow and expand as new BC applications are developed. The BCHA system 200 must provide an abstraction around BC work item management to support both the diversity as well as the expandability. As illustrated in FIG. 3E, an abstraction model/definition of a BCHA work item 270 is created in step 358, by the BCHA Commissioning module utilizing a BCHA Application Configurator 211 and various BCHA applications 268 associated with the BCHA system 200.

This information can be used to facilitate a best-fit match with a BCHA application 268 during a WI load-balancing event. The BCHA work item 270 also contains a generic set of data parameters/fields common to all BCHA work items 270 (e.g., number of computational loading units for execution, etc . . . ). The generic information is used for the assignment of BCHA work items 270 to BCHA applications 268. The generic information is the only work item data visible to the BCHA system 200 outside of the BCHA Application Configurator 211. The BCHA Application Configurator 211 segments the definitions created into BCHA work items 270 independently of any user interaction. BCHA work items 270 are created based on rules which are specific to the BCHA Application Configurator 211.

As an example, a loop editor, may segment a loop definition into multiple BCHA work items 270; primary control, secondary control, IO for primary input, IO for secondary input, IO for output. The decision on the number of BCHA work items 270 generated is done by the BC Application Configurator 211 based on its internal processing rules, the scope/scale of the Industrial Execution process, and the BCHA system Architecture Commissioning Plan and other operational capabilities/characteristics. The abstraction through BCHA work items 270 allows the BCHA system 200 to manage the assignment of BCHA work items 270 to BCHA applications 268 with no knowledge of the information contained within the work assignment or the nature of the underlying computational element or control element. This abstraction provides a high level of extensibility.

Another benefit of the separation between concrete and abstracted behavior to the BCHA work items 270 is the ability for varied concrete models to be applied to the BCHA system 200. The concrete models and their specific definitions are not known to the BCHA system 200, such as the BCHA Control module 215 and/or other BCHA system infrastructure which manages to an abstract model. This allows flexibility and expandability of the BCHA system 200. As an example, a BCHA Application Configurator 211 associated with the BCHA Commissioning module 210 can present to the user an ISA88 view for control definitions. The same BCHA Application Configurator 211 can present to the user an IEC61850 view of the BCHA system 200. In both cases the BCHA Application Configurator 211 may be presenting a loop editor to the user to generate the concrete work item units for execution. However, in one scenario the BCHA Application Configurator 211 can show process assets alone and or in combination with a second scenario that includes electrical station components. In this example, the two physical asset models are implemented with no architectural changes to the BCHA system 200. The BCHA system 200 and the BCHA Control module 215 distributes the created BCHA work items 270 with no knowledge of the underlying concrete units/representation. New concrete models are merely new inputs for BCHA Application Configurators and new BCHA applications 268 in the system facilitated by the BCHA commissioner module 210 and as such, advantageously, the BCHA system 200 can facilitate new data models, features and/or functionality without necessarily requiring BCHA system architectural change(s).

The assignment of BCHA work items 270 to BCHA application 268 is abstracted based on BCHA system 200 Attributes including characteristics and capabilities. However, the BCHA system 200 does require information about which BCHA application 268 can process the BCHA work item 270 as well as other information that supports the allocation. BCHA work items 270 abstraction models contain meta-data information that characterizes the BC work item 270 and its intended usage without going into the details associated with the concrete model. The BCHA applications 268 also publish meta-data describing what capabilities they provide working in the BCHA data services module 230. The meta-data is not fixed and is extensible as a BCHA system 200 evolves. The meta-data contained in the BCHA work items 270 can also be updated, supplemented, complemented or otherwise changed over time. An old BCHA work item 270 may have less meta-data information than a newer BCHA work item 270. The BCHA system 200 and BCHA Control module 215 will use as much information that exists to determine the assignment and re-deployment during a load-balancing event. Similarly, a new BCHA work item 270 may contain additional meta-data information that is not known to the BCHA system 200. Again, the BCHA system 200 will use as much meta-data as is available and known to determine the assignments. In all cases the BCHA application 268 may reject the assignment/redeployment requiring the BCHA system 200 to assign the BC work item 270 to a different target re-deployment BCHA application 268. Work item matching, management and re-deployment are discussed in greater detail with regard to FIGS. 4A1 and 4A2.

The BCHA system components identify load-balancing opportunities, as well as execute a WI load-balancing event through the redistribution of BCHA components as redistribution elements. Depending on the particular implementation, the type of load balancing achieved may be established by a system operator and several types of load balancing are possible using the systems described (e.g., operational state, active system load balancing failure detection, etc . . . ). Furthermore, it may be possible to implement an optimization model that optimizes system load-balancing according to more than one load-balancing type. However, for the purposes of illustrating the flexibility and benefits achieved by implementing BCHA Control module 215, the following examples may focus initially on load balancing events to achieve maintaining a required level of 'availability', and/or distributing redistribution elements, (e.g., BCHA applications 268/work items 270) to maximize system availability and/or broadly distribute work item execution/processor load across the computing resources 240/250 associated with BCHA system 200. The BCHA Control module 215 may also achieve load balancing through temporarily suspending non-critical BCHA applications 268/work items 270. In certain instances, non-critical BCHA applications 268/work items 270 may be suspended indefinitely or until additional resource is provide to the BCHA system 200.

The BCHA Control module 215/ BCHA WI Pool Manager 221 utilize work item meta-data to facilitate WI redistribution. A BCHA work item 270 will contain a variable amount of information including operational data, configuration metadata (as the Abstract model discussed above with regard to FIG. 3E). At a minimum, the metadata specifies the BCHA application type and performance characteristics. It may also include other capabilities or characteristics such as a WI priority; an interrupt/suspension capability or other aspects of WI operational execution.

Although, in the following example the BCHA Control module 215/BCHA WI Pool Manager 221 redistributes BCHA work items 270 based on matching the type of BCHA application 268 that can execute BCHA work items 270, and system computing resource redistribution availability, a secondary redistribution metric involves distributing the processing load broadly across the BCHA computing resources 240/250. The redistribution metrics and/or work item 270 performance characteristics are not static. The initial configuration established the BCHA commissioner module 210 will execute an initial distribution and generate estimates for the BCHA work item 270 loading characteristics. As a BCHA application 268 executes a BCHA work item 270, it can generate and track operational metrics such as the actual loading characteristics. These operational metrics (and the underlying data/statistics) are maintained in the BCHA data services module 230 and may entail more information than was what initially generated by the BCHA Commissioner modules 210. The run-time refinements for the performance characteristics will be written back to the BCHA work item 270. The refined information will be used by the BCHA system 200 if the BCHA work item 270 is redistributed to a different BCHA application 268 as well as the BCHA system Commissioner module 210, the BCHA Control module 215 and/or related BCHA Control applications for resource planning, adjustment and BCHA component redistribution.

Loading characteristics are specific to the BCHA application 268 which assigned to process the BCHA work item 270. The loading is a representation of the computational resources that the BCHA work item 270 consumes in the BCHA application(s) 268 and will described as described as an execution unit. The BCHA application 268 loading is used by the BCHA application Manager to instantiate new instances of BCHA applications for load balancing and more importantly to maintain the required availability level of the BCHA system 200. The characteristics in the BCHA work item will be categorized into "must have" and "desirable". The BCHA system 200 must match all "must have" characteristics before for making an redistribution/assignment. The "desirable" characteristics will be matched if possible. However, other restraints such as lack of available resources may lead to assignments which do not match the "desirable" characteristics.

Rules for assignment will evolve with the BCHA system 200. Initial rules may only take into account matching BCHA application types and total execution unit loading. However, rules such as multi-core, asset type, platform type, and others may be applied in the future. These assignment rules may be extended by the BCHA Application Configurators as BCHA work items are generated and/or updated. As previously stated, the BCHA work item assignment may not succeed if meta-data is either missing or if there is more meta-data than is understood. In these cases sub-optimal assignments may occur but there will be no system failures. The new rules will follow the paradigm of required and ancillary. Note that if a required rule is not known to the Boundary-less system, assignment will still be performed with the expectation that the BC application Runtime Instances will reject the assignment if inappropriate. The BCHA application 268 should match the configurator and understand the latest characteristics specified by the configurator.

Resource planning is related but completely separate from BCHA work items and BCHA work item assignments. The BCHA system 200 services for BCHA work item assignment merely assign BCHA work items 270 to available BCHA computing resources 240/250. If there are insufficient resources then errors will be generated and remediated by the BCHA WI Pool Manager module 221. Another of the BCHA system control application is a BCHA Application Planner module 213. Through the BCHA Application Planner module, BCHA applications 268 as well as Core BCHA services and applications are designated for deployment to BCHA computing resources 240/250. The output from the BCHA Application Planner module 213 is used by the provisioning services to set up the resources for the BCHA system 200 (described in FIG. 3A). The BCHA Application Planner 213 can utilize the information in BCHA work items 270 as a guide for planning. The capacity characteristics in the BCHA work items 270 can be used by the BCHA Application Planner 213 when calculating recommended BCHA system 200 configurations, number of BCHA applications 268 and BCHA computing resource 240/250 needed to achieve the required availability for particular Industrial Execution Process. Similarly, the BCHA Control module 215 and BC work item Pool Manager module 221 can provide system notifications that there are insufficient resources available. Similarly, additional system load can be create as BCHA Application Configurators 211 generate additional BCHA work items 270 for execution. Users can interact with the BCHA Application Planner 213/BCHA System Commissioner module 210 to provision additional BCHA computing resource 240/250.

BCHA work items provide a finer granularity of work definitions than a classical configuration which is deployed to a specific PLC or DCS controller. One advantage of the finer granularity is automatic BCHA Controller module 215/BCHA WI Pool Manager module 221 load balancing in the BCHA system 200. Rather than requiring a user to calculate the system loading and assign BCHA applications 268 to different BCHA computing resources 240/250, the BCHA system 200 can continuously monitor and adjust the load placed on BCHA computing resources 240/250. The load balancing will initially implement preliminary rules such as maintaining an even BCHA work item 270 load on every BCHA computing resources 240/250. However, the load balancing can be expanded to incorporate more complex rules such as shifting work to low energy consumption resources allowing more profitable BCHA system 200 utilization.

Granularity also allows the work being performed in a given BCHA application 268 can be redistributed among other BCHA applications 268 in the case of a BCHA computing resources 240/250 failure (described below in FIGS. 5A, 5B1, and 5B2). Rather than shifting all of the work to a BCHA applications in a spare BCHA computing resources 240/250, the work can be divided among any BCHA application(s) associated with remaining Active BCHA computing resources 240/250 associated with a M:N working configuration. This BCHA work item management implements M:N working configuration redundancy models. In some instances, a M:N+R working configuration redundancy model may be implemented where one or more addition BCHA computing resources 240/250 need to be requested and provisioned to supplement existing BCHA computing resources 240/250 and provide a redistribution target for a particular redistribution element. Performance considerations may require that BCHA applications 268 have configuration data pre-loaded for BCHA work items 270 which they may be asked to execute but are not currently executing. This allows a faster failover as the re-assignment of a BCHA work item(s) and would require the new BCHA application 268 to load the latest state data and not the full configuration for the BC work item.

FIG. 3F1 illustrates aspects of how Boundaryless Control High Availability (BCHA) Architecture attributes, capabilities, and characteristics are managed and coordinated using BCHA data services Module 230. Each BCHA component associated with the BCHA system architecture has BCHA system attributes that include BCHA component capabilities and characteristics that are stored in HA Data Services Module 230 as each of the components are instantiated/registered during the BCHA system development process. FIG. 3F1 illustrates a hierarchical interdependence of the layered elements associated with a BCHA system component. Specifically as illustrated in FIG. 3F each layer BCHA application work item layer 376, BCHA application layer 377, BCHA Control application layer 378, BCHA Container/Resource layer 379 and BCHA computing resource layer 380 respectively contribute BCHA system Attributes for a BCHA system component as capabilities/characteristic. BCHA system Attributes ultimately factor in the BCHA Control module BCHA system management and/or BCHA redistribution element redeployment.

The BCHA system control applications 205, such as BCHA Control module and/or BCHA Reliability Engine module uses these requirements to determine the system needs for BCHA computing resources 240/250 to facilitate load-balancing. BCHA Control module 215 can use BCHA system Attributes to identify which BCHA computing resources 240/250 are suitable for a given application based upon predetermined application characteristics (e.g., application meta-data). The BCHA reliability engine module 220 can use BCHA application characteristics to manage provisioning rules. The BCHA reliability engine module 220 can also compute system availability metrics for the BCHA system 200. This algorithm to calculate real-time BCHA system 200 availability metrics maximizes the opportunity for system users to achieve best opportunity to respond before negative impact (e.g., provide additional requested resources before a safety system shuts down the BCHA system). In some embodiments, the actual availability of the system is based on current available BCHA computing resource 240/250 and the BCHA Active/Inactive applications 268, the number of failed resources, the number of running BCHA applications 268, applications and their priority/criticality, the number of inactive applications and their criticality, number of additional resources need to be provisioned to run every required application, and/or the like. BCHA systems facilitate significant flexibility in system implementations and be configured to achieve the described benefits involving BCHA system management in a variety of different implementations/configurations. The following sequence of Figures and corresponding description will describe in greater detail how these features and functionality are achieved and accordingly describe how efficiencies and system efficacy improvements are also achieved.

FIG. 4 illustrates aspects of how Boundaryless Control High Availability (BCHA) application(s) are executed. In FIG. 4, BCHA application 268 executes as App_1 450 on a BCHA computing resource 240/250. The BCHA computing resource 240/250 registered capabilities/characteristics are updated with the BCHA Data Service 230 as any change are detected in a control loop monitoring BCHA computing resource 240/250 data. App_1 450, connects with the BCHA Data Service in 451, updates BCHA application capabilities/characteristics in step 452 (if appropriate) and gets any assigned BCHA work items 270, in step 453.

In executing assigned BCHA work item 270, App 1 updates the operational state in step 455, process work item 1_1, in step 456, updates work item capabilities/characteristics in step 457 (if appropriate). Steps BCHA work item execution 458, operational state update 459, WI data record update in BCHA data services module 220 and loop until complete step 461 illustrate an example of elements associated with application work item processing. The BCHA application periodically checks to determine whether BCHA data services module 230 has additional BCHA work items to be assigned to the particular BCHA application in step 462.

FIG. 5A illustrates aspects of BCHA load-balancing opportunities for a BCHA system. One key aspect of BCHA system 200 functionality is the ability to load balance system elements to achieve High Availability requirements associated with a particular Industrial Execution Process and related process control application requirements. Dynamic load balancing is a key feature that also facilitates making M:N working configurations possible and viable for BCHA systems 200 where redundancy and high availability are key BCHA system 200 requirements. FIG. 5A illustrates aspects of load-balancing types associated with a BCHA system 200, such as Resource Failure Detection Load-Balancing/Redistribution and HA-M:N Validation Load-Balancing. It is to be understood that other types of load-balancing are also possible, depending on the nature of the particular implementation and BCHA system components, characteristics, and/or capabilities.

In FIG. 5A, the BCHA Application Configurator 211 provisions an initial pool of BCHA work items 270 for distribution as the system transitions to an "Operational" state, in step 500. The BCHA Control applications 205 engage the BCHA system 200, in step 503. The BCHA WI Pool Manager module distributes the BCHA work items 270 to the appropriate BCHA applications 268/BCHA computing resources 240/250. In step 506, the BCHA Control module 215/BCHA Reliability Engine 220 start monitoring system health/operational state data maintained in the BCHA data services module 230. BCHA Control module 215/BCHA Reliability Engine module 220 are monitoring BCHA system 200 health/operational state in order to identify Resource Failure Detection Load Balancing opportunities 509 and loop through step 511, and back to step 506 to continuously monitor until a failure is detected. Depending on the particular implementation and Industrial Execution process requirements, the frequency of the looping may be adjusted according to the particular implementation, to range from constant looping as a background workstream, to 5 ms, to 5 seconds, to 5 minutes to every 5 hours or otherwise adjusted based what may be appropriate for the particular BCHA system 200 implementation.

In step 509, if a Resource Failure Detection load-balancing opportunity is identified, a Resource Failure Detection load-balancing opportunity is initiated in step 513 and will determine the next steps/timeline for BCHA system action. In step 515, the BCHA system 200 and BCHA Control module Resource Failure Detection load-balancing determines which BCHA system components should be redistributed as redistribution elements based on which BCHA computing resource 240/250 has failed. The BCHA Control module 215 determines the Redistribution type in step 517, determining a Redistribution Pool in step 518 and a specific redistribution target in step 519. In step 521, the BCHA Control module 215 executes the redistribution transferring the Redistribution elements to the Redistribution targets. The BCHA Control module 215 attempts to maintain (1) system viability; and (1A) system high availability operational characteristics and consequently a viable M:N working configuration. For a Resource Failure Detection Redistribution, the BCHA system is challenged to maintain (1) system viability; and (1A) system high availability operational characteristics despite an actual computing resource 240/250 failure.

The BCHA Control module 215 runs a background task that iteratively simulates BCHA system 200 computing resource 240/250 failures to validate BCHA system high availability requirements and a viable M:N working configuration—as HA-M:N Validation Load-Balancing in step 523. The BCHA Control module 215 iteratively loops, and simulates the respective computing resource(s) 240/250 associated with the BCHA system failing and being redeployed in accordance with a Resource Failure Detection Redistribution in step 525. After the Resource Failure Detection Redistribution, the BCHA Control module 215 determines the Remediation Operational State in step 527. If after the simulation of each computing resource 240/250, the Resource Failure Detection Redistribution result in all Green state redeployments—the BCHA system is indeed a viable M:N working configuration. If there is a non-Green state after each simulated the Resource Failure Detection Redistribution, then the BCHA system 200 is an M:N+R working configuration—additional computing resource is necessary to maintain the High Availability Requirements of the BCHA system 200 and transition the BCHA system to a viable M:N working configuration. Resource Failure Detection Redistribution and Active Load Balancing/Simulation are described in greater detail with regard to FIGS. 5B1-5B2 and 5C, respectively.

FIG. 5B1 illustrates aspects of BCHA load-balancing opportunities associated with Failure Detection/Remediation for a BCHA system. In the event of BCHA computing resource 240/250 failure, the BCHA system 200 executes Resource Failure Load-Balancing Redistribution and works to maintain (1) system viability, (1A) viable M:N working configurations, as well as (1B) system high availability operational characteristics. Depending on the particular Industrial Execution process and application, the BCHA system 200 may be configured to focus primarily on 1 and 1A, while 1B may not be as critical of an operational requirement. The BCHA system 200 may be pre-configured request, receive, provision and transition redistribution elements to supplemental resources quickly and efficiently—effectively operating an M:N+R working configuration. In some implementations the BCHA system 200 can auto-remediate by working with a BCHA computing resource provider to obtain pre-configured BCHA computing resources 240/250 without generating a request for additional resource. Both M:N and M:N+R BCHA system working configurations achieve the benefit of obviating all the additional cost/expenses of 1:1 physical hardware redundant working configurations. Also, both also achieve better operational efficiency and resource utilization characteristics, as compared with 1:1 physical hardware redundant working configurations.

In FIG. 5B1, step 531, the BCHA Controller 215/BCHA Reliability 220 Engine monitoring the BCHA data services module 230 detect a BCHA computing resource 240/250 failure. In step 533, after detecting the failure, the BCHA Controller 215 determines which BCHA system components were executing on the failed BCHA computing resource 240/250 and need to be redistributed as redistribution elements (e.g., BCHA applications 268 and/or BCHA work items 270 executing on the failed BCHA computing resource 240/250). Once the redistribution elements are determined, the characteristics/capabilities associated with both the failed BCHA computing resources 240/250, and the redistribution elements are analyzed, in addition to a current redistribution type setting in step 535. A variety of redistribution types are possible including fastest redistribution, balanced redistribution, optimal redistribution, critical redistribution element redeployment or maximized use of existing resources (where supplemental/additional BCHA computing resources 240/250 may be scarce and/or difficult to provide). These redistribution types are provided as non-limiting examples, other types are possible depending on the particular BCHA system implementation, corresponding Industrial Execution process and/or other configuration or operational characteristics/capabilities. In step 538, the BCHA Control module 215 starts to determine redistribution target pool (based on the determination and analysis from steps 533 and 535) identifying possible redistribution targets (e.g., BCHA applications 268 and/or BCHA computing resources 240/250) that potentially may be used for redeployment of the redistribution elements.

In order to maximize the likelihood of a viable existing resource redistribution target pool, the match matching methodology focuses on two groups of parameters associated with BCHA system component capabilities and characteristics—(1) BCHA redeployment requirements (e.g., high availability requirement; particular I/O type; execution unit processing load; and (2) BCHA redeployment preferences (e.g., near-real time execution, etc.). There are typically two possible types of redistribution target Pools: (1) a target pool using only existing resources (e.g., M:N working configuration) where all BCHA redeployment requirements are met and the redeployment option that maximizes the number of BCHA redeployment preference(s) satisfied is selected; or (2) a target pool using existing resources and supplemental requested resources (e.g., M:N+1 or M:N+R). In FIG. 5B1, step 539 involves determining the best solution possible as a redistribution target pool created from existing BCHA system components with several options for various redistribution element redeployment targets. A variation of this option is a perfect fit scenario, in which there is at least one existing BCHA target(s) that facilitates a single redeployment option—meeting all BCHA redeployment requirements. In step 539, the BCHA Control module determines whether there is an immediate target redeployment option available. If there is more than one potential redistribution target option as determined in step 541, the BCHA Control module 215 analyzes BCHA redeployment requirements and BCHA redeployment preferences to identify an option that complies with redistribution type (e.g., fastest failover type is the first redistribution option identified even if other may exist; optimal is the redistribution option that meets the most redeployment requirements/preferences) and selects a redistribution target in step 543. In step 544 the redistribution elements are transitioned to the redistribution targets and made active in step 544. In some implementations, the redistribution elements access the BCHA data services module 230 and get the operational/configuration data associated with the deployment at the time (or just before) of the BCHA computing resource failure. Accordingly the redistribution elements can effectively pick up where they stopped with minimal time/data loss.

If there is not an immediate target available in step 539, in step 545 the BCHA Control module 215 can execute a simulated working configuration load redistribution to determine if shifting active BCHA applications 268/BCHA work items 270 creates an available target for the redistribution element without stopping BCHA Components or requesting supplemental BCHA computing resources 240/250. If the simulated working configuration load redistribution creates a redistribution target, the BCHA Control module redistributes the active BCHA applications 268 /BCHA work items 270 to create the target in step 542 and select the target in step 543. In step 544, the redistribution elements are distributed to the redistribution target and made active.

If simulated working configuration load redistribution in step 545 does not create an available redistribution target, the BCHA Control module 215 attempt to stop non-critical (and/or some implementations low priority) Components to try to creates an available redistribution target in step 547. If stopping a non-critical BCHA computing resource 240/250 creates an available redistribution target, the BCHA Control module 215 determines whether degraded non-critical time-slicing processing is enabled in step 548, and if it is shifts non-critical BCHA component(s) into a time-slicing queue where the member of the queue each a portion of dedicated processing execution resource (if and as additional processing resource is provided) in step 549. For example, if two non-critical applications are in the queue, each would get have the normal processing execution resource. The queue may also rebalance based on BCHA application priority, e.g., if App_1 may get 75% of the processing execution resource because it is higher priority than App 2 which only gets 25% of the processing execution resource. The BCHA Control module 215 the stops the non-critical BCHA component(s) in step 550 and creates the target pool in step 552. In step 544, the redistribution elements are distributed to the redistribution target and made active. If stopping non-critical component(s) did not create an available redistribution target, the BCHA Control module 215 attempts to create an available redistribution target by also stopping critical BCHA components in step 551 to try create an available redistribution target. If stopping critical BCHA components in step 551 creates an available redistribution target, the BCHA Control module stops at least one critical BCHA component and one or more non-critical component in step 552 and 550, respectively to create the target redistribution pool in step 542 and select the redistribution target in step 543. In step 544, the redistribution elements are distributed to the redistribution target and made active.

At this point, after conducting simulated working configuration load redistribution, checking non-critical components, and checking critical components (alone or in combination with non-critical components) the BCHA Control module 215 may have to request (or auto-remediate) supplemental BCHA computing resources 240/250 in step 553 and provision supplemental BCHA computing resources 240/250 in step 554. Having conducted each of the previous checks, the BCHA Control module can identify which attempt was the closest to actually creating an availability redistribution target and define the type, size capabilities/characteristics associated with the requested supplement BCHA computing resource to minimize cost or provisioning time or a number of the BCHA computing resource parameters. In some implementations, the supplement BCHA computing resource configuration may be based on a BCHA Control module determination of what would be necessary to provision to ensure robust M:N working configuration. With the provisioned supplemental BCHA computing resource 240/250, the BCHA Control module can create the redistribution target pool in step 442 and select the redistribution target in 543. In step 544, the redistribution elements are distributed to the redistribution target and made active.

FIG. 5B2 illustrates aspects of BCHA system recovery operational state associated Failure Detection/Remediation load balancing opportunities for a BCHA system. In FIG. 5B2, in step 560 after the BCHA system 200 facilitates redistribution/redeployment to maintain system viability as the primary goal of the BCHA system 200, in step 560 the BCHA Control module 215/BCHA Reliability Engine 220 checks BCHA operational state to try to comply with BCHA system goal 1A—complying with BCHA system High Availability Requirements. In step 563, the BCHA Reliability Engine module 220 check operational metrics/state data in the BCHA data services module 230 and confirms that Green state remediation has been achieved. More specifically, in state diagram element 565, all BCHA applications 268 and BCHA work items 270 have been redeployed and are fully operational with all BCHA system High Availability requirements. If Green state remediation is achieved, the BCHA Control module 215 transitions back to periodic/continuous BCHA system health/operational status monitoring, in step 568.

In step 563, if BCHA Control module 215 determines green state remediation has not been achieved, the controller will develop and execute a BCHA system recovery plan in step 571. In FIG. 5B2, the first aspect of developing a BCHA system recovery plan is determining which Non-Green state is associated with the BCHA system 200 operational state. If as Failure Detection Redistribution, the BCHA Control module 215 was able to keep the system running but had to suspend a critical BCHA application 268, in order to keep a higher priority critical BCHA application 268 running, the BCHA system 200 is considered to be in a Red Operational State—as in state diagram element 573. If the BCHA Control module 215 was able to keep the system running but had to suspend one or more non-critical BCHA application(s) 268, the BCHA system 200 is considered to be in an Orange Operational State—as in state diagram element 575. A third non-green operational state is a yellow state (state diagram element 577) in which all redistribution elements have successfully been redeployed, but the BCHA system 200 has one or more BCHA applications 268 that do not meet BCHA system 200 High Availability requirements.

In some implementations, suspended non-critical applications may be maintained in an active, yet degraded operational state. More specifically, suspended non-critical applications may be added to a degraded progression queue and the BCHA Control module 215 can sequentially iterate through the suspended applications to provide partial processing/computing resources for some aspects of the redistribution elements in order to keep the system operational until additional resource can be provided. The BCHA Control module 215 sequentially iterates a degraded application 268/work item 270 queue and systematically provides at least a portion of the redistribution element's requested computing resource execution unit requirements.

In all Red and Orange operational states, the BCHA Control module 215 can determine how much and what type of supplemental BCHA computing resources would be necessary to transition the BCHA system 200 back to a full Green operational state (565). The BCHA system can also determine and report whether the repair time—the time to transition back to a Green operational state (565) can be achieved before an Industrial Execution process safety system will transition shut down the Industrial Execution process in order to avoid unsafe conditions/operation. Depending on the particular implementation, as well as the current operational characteristics, determined operational state and availability of supplemental BCHA computing resources 240/250, the transition back to green state may be a full, direct transition from Red, Orange to Green or it may be a gradual, transition back to the Green operational state (either path would have a repair time that is less that the Industrial Execution process safety system shut down time).

The operational states discussed in FIG. 5B2 as Green, Yellow, Orange and Red Operational states are provided to help illustrate aspects of how a BCHA system 200 can dynamically manage and coordinate various BCHA system components includes BCHA computing resources 240/250, BCHA applications, 268 and BCHA work items to maintain one or more BCHA system 200 operational integrity, a viable M:N Working Configuration, and operation in accordance BCHA system 200/BCHA application High Availability Requirements. Depending on the implementation, different functional operational state names, operational characteristics and even number of operational may be implemented. For example, Green may be renamed as "Viable MNHA Operational State" and abbreviated as "MNOK_HAOK", Yellow may be renamed as "Viable MN Operational State" and abbreviated as "MNOK_HADG", Orange may be renamed as "Degraded MN Operational State" and abbreviated as "MNDG_HACRT" and Red may be renamed "Critical Systems" Operational State" and abbreviated as "CS" or "MNCRT_HACRT." Instead of involving both M:N and HA operational states, a subset is also possible focused on one BCHA operational parameter. For example, a BCHA system configured with three operational states (or sub-states) focused on one BCHA operational parameter is possible as "Viable HA" or "Viable MN"; "Degraded HA" or "Degraded MN"; "Critical HA" or "Critical M:N." Other BCHA operational parameters may also be used to develop state controls, (e.g., work item execution load distribution as "Heavy", "Medium", and/or "Light". As another example, a BCHA system 200 can be configured with binary operational states, where the system is either "Operational or Non-Operational." These examples are provided to be non-limiting examples and the BCHA system 200 can be configured to facilitate a number of other operational implementations.

FIG. 5C illustrates aspects of active BCHA system load-balancing/remediation associated with M:N Validation. FIG. 5C illustrates aspects associated with HA-M:N Validation Load-Balancing and M:N working group validation/remediation. More specifically, in order to ensure a viable M:N working configuration that has sufficient spare computing resource execution availability without the actual 1:1 redundant physical hardware, the BCHA Control module 220 executes a Background activity involving HA-M:N Validation Load-Balancing to facilitate M:N working group validation/remediation scenario testing. M:N working group validation/remediation executes as an ancillary BCHA application 268 to iteratively simulate BCHA computing resource 240/250 failure, resource failure detection load balancing, and subsequent operational state testing to determine whether for a particular BCHA computing resource 240/250 failure the M:N working configuration has sufficient computing resources execution availability to facilitate a redeployment using only existing computing resources 240/250 while maintaining the High Availability operational requirements associated with the BCHA system 200. HA-M:N Validation Load-Balancing is a flexible simulation process and can validate a variety of BCHA system configuration. In the example described in FIG. 5C, the BCHA Control module 215 steps through and simulates a $1^{st}$ degree failure, where the validation report reflects an aggregated remediation state—the results of simulating a failure for each BCHA computing resource 240/250 associated with an M:N working configuration one at a time—for example a BCHA system with five BCHA computing resource 240/250 would execute five simulation loops—and during each simulation loop a different BCHA computing resource 240/250 would fail. If each of the five simulation loops have a green remediation state, the M:N working configuration has been validated. If any one of the simulation loops result in a non-green remediation state, the M:N working configuration may have to be further develop as an M:N+R working configuration, i.e., supplemental resource may be necessary to achieve a viable M:N working configuration that executes with an optimized balance of spare execution resource, while minimizing additional computing resource requirements and still completely obviating the old 1:1 redundant physical hardware requirements.

In FIG. 5C, the BCHA Control module initiates a HA-M:N Validation Load-Balancing execution cycle in step 575. Depending on the implementation, corresponding Industrial Execution process and other operational characteristics, HA-M:N Validation Load-Balancing may be executed as a continuous loop, or with a static or dynamic execution frequency—Industrial Execution processes associated with Oil and Gas refinery operational control system may involve more time critical/sensitive operations, than Industrial Execution processes associated with a waste water treatment plant or other less time critical/sensitive operations. In step 577, the BCHA Controller 220 determines the HA-M:N Validation Load-Balancing validation degree as for example a $1^{st}$ degree failure simulation. In some implementations, the simulation failure degree may be established as system default and updated by a system operator as appropriate. The validation degree sets the number of computing resources 240/250 failures(s) that BCHA Controller 220 will simulate during an iteration (e.g. $1^{st}$ degree failure simulations validate M:N working configuration where one computing resource 240/250 fails, $2^{nd}$ degree failure simulations validate instances where two computing resources 240/250 fail, etc . . . ). In the example from FIG. 5C, the BCHA Controller 220 works in a sequestered segment of the BCHA Data Service module 230 that is populated with BCHA system 200 architecture, component, operational data associated with the system as the time an instance of HA-M:N Validation Load-Balancing is initiated. In step 579, BCHA Controller 220 simulates the failure of a first computing resource 240/250 associated with the BCHA system 200. In step 581, the BCHA Controller module 215 simulates BCHA Failure Detection Resource Redeployment as described in FIG. 5B1 and FIG. 5B2. In step 583, the BCHA Controller module 215 determines the Remediation Operational State after the failure redistribution elements have been redeployed to redistribution targets. If the Remediation Operational State involves a Green state in step 585, the M:N working configuration is validated for the failure of the respective BCHA computing resource 240/250. However, a robust viable M:N working configuration, each BCHA computing resource 240/250 associated with the BCHA system 200 would also have to have a Green state Remediation Operational State. Accordingly, the Remediation Operational State is recorded for the respective loop of the HA-M:N Validation Load-Balancing validation in step 587, the BCHA Control module 220 checks if additional BCHA computing resource 240/250 failures need to be simulated for the validation in step 589. In step 591, the M:N working configuration computing resource count is incremented and the simulation initiates the next loop simulating failure of the next BCHA computing resource 240/250 in the sequence, looping back to the step 579.

In FIG. 5C, if the Remediation Operational State determination in step 583 identifies a non-Green state as in step 593, the simulated failure of the respective computing resource 240/250 does not comply with a M:N working configuration. The system may still be operational, but in a M:N+R working configuration where supplemental/additional computing resource 240/250 may be necessary to transition Remediation Operational State back into the Green state and achieve a viable M:N working configuration. Based on the capabilities/characteristics of the failed computing resource 240/250, as well as the capabilities/characteristics of the redistribution elements, the BCHA controller 220 can determine what type/how much supplemental/additional computing resource 240/250 may be necessary to shift from M:N+R working configuration to a viable M:N working configuration. Depending on the particular system configuration, the M:N+R working configuration transition requirements may be reported as they are detected. Alternately, as in the example illustrated in FIG. 5C, the M:N+R working configuration transition requirements are determined in step 593 and recorded in step 587.

If all failures have been simulated for all Working Configuration BCHA computing resources 240/250 in step 589 associated with the BCHA system 200, step 595 involves developing the M:N Working Configuration Validation Report and confirming an Auto-Execution for system request for supplemental/additional BCHA computing resource 240/250 based on any M:N+R working configuration transition requirements associated with the executed HA-M:N Validation Load-Balancing validation. In some implementations, M:N Working Configuration Validation Report may identify a variety of operational validation results, as well as system generated remediation actions to address issues identified during the simulation/validation.

For example, system generated remediation actions may include a proposed system-generated list of supplemental computing resource(s) 240/250 to be requested, provided, and provisioned to achieve a viable M:N working configuration for the BCHA system 200. The report may also include detail as to how one or more specific computing resource 240/250 failure(s) is accounted for in proposed system-generated list of supplemental computing resource(s).

In an implementation, the BCHA Control module 215 may include an auto-remediate feature as in 595. More specifically, the BCHA Control module 215 may be configured to connect with a pre-approved BCHA computing resource 240/250 provider (e.g., Public Cloud Service Provider). Once connected with the provider, the BCHA Control module 215 may directly access and request provisioning of one or more pre-configured or customized BCHA computing resources 240/250. Accordingly, the BCHA Control module 215 can quickly, efficiently remediate an issue determined through HA-M:N Validation Load-Balancing, request, provision, and redeploy redistribution element to Supplement BHCA computing resources 240/250. The BCHA Control module 215 may select compare pre-configured BCHA computing resources 240/250 with the redistribution required capabilities and characteristics to determine a best fit pre-configured BCHA computing resources 240/250. The BCHA Control module 215 may select compare pre-configured BCHA computing resources 240/250 that have additional capabilities and characteristics than those identified to remediate issues identified during remediation operational state determination. The BCHA Control module 215 can generate a similar request for a Customized BHCA computing resource 240/250—specifically requesting a Customized BHCA computing resource 240/250 additional capabilities and characteristics than those identified to remediate issues identified during remediation operational state determination.

With the additional capabilities and characteristics, the BCHA Control module 215 may execute an optimal load redistribution to shift applications across available BCHA computing resources to minimize processor load, BCHA work item execution unit load, BCHA application load, and/or a combination of two or more minimization parameters (e.g. $1^{st}$ BCHA work item execution unit load, and $2^{nd}$ BCHA application load). The BCHA Control module 215 can conduct the optimal load redistribution determination ahead requesting either a pre-configured or customized BCHA computing resource. 240/250.

FIG. 6A-FIG. 6B7 illustrate aspects of an example of how a BCHA system 200 works to remediate BCHA computing resource 240/250 failures and maintain a viable M:N working configuration. FIG. 6A illustrates a BCHA system that includes five BCHA computing resources 240/250 (identified in FIG. 6A as CR-1 610, CR-2 620, CR-3 630, CR-4 640 and CR-5 650), respective BCHA application(s) 268 (identified in FIG. 6A as App_1 612, App_2 614, App_3 616, App_4 626, App_5 642, App_6 645 and App_7 654) executing on the BCHA computing resources 240/250, and BCHA work items 270 (identified in FIG. 6A as WI 1_1 613, WI 2_1 615, WI 3_1 617, WI 4_1 627, WI 5_1 633, WI 6_1 645 and App_7_1 655) executing on the respective BCHA applications 268. Each of the BCHA system components are in operative communication with BCHA data services 230 and BCHA Control applications 205, specifically BCHA Control module 215, BCHA Reliability Engine module 220, and BCHA WI Pool Manager module 221 are actively engaging the BCHA system 200 components.

The FIG. sequence 6B1-6B7 is an example implementation of how the BCHA system 200 works to identify and remediate the failure of an BCHA computing resource 240/250 and redeployment of redistribution elements associated with the failed BCHA computing resource 240/250. redistribution elements may include the BCHA application(s) 268 executing on the BCHA computing resource and/or the respective BCHA Work items 270 executed by respective BCHA application(s) 268. Each of the FIGS. 6B1-6B7 illustrate the key operational states associated with each of the steps the BCHA system executes to remediate a Resource Failure Detection as Execution Timeline 699.

FIG. 6B1 illustrates BCHA computing resource 240/250 and BCHA application 268 capabilities, characteristics, as well as BCHA operational state associated with the BCHA work item 270. In FIG. 6B1, the BCHA system is operating in a Green state with all high availability requirements satisfied.

The BCHA system 200 components are illustrated in FIG. 6B1 is a steady state operational view as BCHA data services data associated with and stored in BCHA Date Services as of a time/state 1 600. In State 1, all BCHA computing resources 240/250 are executing in a Green state as a viable M:N working configuration, where all BCHA system 200 High Availability operational requirements are satisfied. State 1 Diagram 600 illustrates the respective capabilities/characteristics of computing resources CR1-CR5, APP 1-App 7 and the respective work items 1_1-7_1, as well as the BCHA system component operational state associated with each BCHA system component as Active, Inactive, Hold, (and in FIG. 6B2 after computing resource CR-4 fails—"Failed") respectively. The FIG. sequence is an example implementation of how the BCHA system 200 works to identify and remediate the failure of an BCHA computing resource 240/250, the BCHA application(s) 268 ex FIG. 6B2—BCHA—Failure Detection/HA Operational assessment—CR4 Fails/Failure Detection;

FIG. 6B2 illustrates the operational states as BCHA computing resource CR-4 fails, as well as the instances of App_5/work item 5_1 and App 6/work item 6_1. After CR-4 Fails, BCHA Control module 215 detects the failure in BCHA data services module 230 and updates the operational state associated with CR-4.

In FIG. 6B3, the BCHA Control module 215 determines the capabilities and characteristics associated with the failed computing resource 240/250, including computing resource Availability Requirements, as well as Real-Time operational requirements. The BCHA Control module 215 also determines the capabilities and characteristics associated with App_5/work item 5_1 and App 65/work item 6_1 including application Priority, application Availability Requirement, as well as application Real-Time Requirements. In some BCHA system 200 implementations, BCHA application 268 priority is used to execute the Redistribution Type—for example, higher priority redistribution elements may be redeployed before lower priority redistribution elements to potential redistributions target(s) with in a Fast redeployment redistribution type. In an optimal redeployment redistribution type, the BCHA Control module may attempt to suspend lower priority applications, in favor of creating availability for a redeployment for higher priority applications. Depending on the implementation, other capabilities/characteristics may include dedicated I/O connections associated with a particular computing resource 240/250 or BCHA application 268/BCHA work item 270, as well as processor loading capabilities or processor execution requirements.

In FIG. 6B4, the BCHA Control module 215 assesses the capabilities, the characteristics and availability requirements of the other existing computing resources 240/250 (e.g., CR-1, CR-2, CR-3 and CR-5) associated with the BCHA system 200. In the example, each computing resource 240/250 has a capability, with regards to processing memory/processing power, to support three BCHA applications 268/work item 270. Accordingly, CR1 and CR-2 are excluded by the BCHA Control module 215 from the redistribution pool of potential redeployment targets. As such, the redistribution pool is generated as including CR-3 and CR-5. In order to maintain a viable M:N working configuration, the BCHA Control module 215 will check the other characteristics/capabilities of CR-3 and CR-5, as well as App_5/work item 5_1 and App 6/work item 5_1 and see that both CR-3 and CR-5 are potential targets capable of taking either for both redistribution elements—failed application/work items in this example as the redistribution pool.

The BCHA Control module 215 selects CR-3 as the redistribution target for App 5 since CR-3 meets these first two checking (i.e (1) availability to take a redistribution element; and (2) has an existing instance of the redistribution in an Active/Inactive state). The BCHA Control module 215 tries to balance fast failover while also trying to balance/spread the redistribution elements across redistribution pool potential targets to minimize processor loading and to keep as many available redistribution slots open across the BCHA computing resources 240/250 associated with a particular M:N working configuration. By working to maximize, as many available redistribution slots as possible, the BCHA Control module maximizes the likelihood a redeployment is possible within an existing M:N working configuration, particular in working configurations that includes a broad heterogenous pool of BCHA computing resources 240/250 and BCHA application system types/hardware types with a corresponding broad ranging spectrum of capabilities and characteristics.

FIG. 6B5 illustrates how the aspects of how the BCHA Control module 215 selecting specific BCHA computing resources 240/250 as redistribution targets for the respective redistribution elements. In the example, BCHA Control module 215 determines the redistribution type selected is (instead of "Balanced Failover Redeployment," "Optimal Failover Redeployment," or "Fastest Failover Redeployment"). The redistribution types are particularly useful in determining redistribution targets, where the several possible redeployment target scenarios for a particular redistribution pool. Depending on the implementation, the M:N working configuration operational data, BCHA system component capabilities/characteristics and the particular available redistribution types, there may be instances where each redeployment type would result in selecting the same redistribution targets. There may also be instances depending on the loading characteristics of a particular M:N working configuration as well as the particular type of Resource failure, where supplemental/additional computing resources are going to be necessary to maintain system viability, as well as BCHA system high availability requirements. For a Balanced Redistribution type, after checking for existing instance that are Inactive and can be made active and take on a redistribution element, or that have processing load availability (e.g., executing fewer than 3 applications at the time of assessment).

In the example, the "Balanced Failover type" the BCHA Control module 215 checks if any of the redistribution targets in the redistribution pool currently have an existing instance of the application executing in an Active/inactive state (this is also a first check for the Fastest Failover Redeployment redistribution type). Accordingly, FIG. 6B5, the BCHA Control module 215 identifies an instance of App_5 executing on CR-3 in an inactive state. After confirming CR-3 has does not have a fully loaded processor, BCHA Control module 215 confirms whether CR-3 matches any other required redistribution characteristics/capabilities associated with failed App 5, as well as checks if any secondary redistribution characteristics/capabilities associated with failed App_5, (e.g., a particular processing speed/processing power). In a "Balanced Failover type" If all required redistribution characteristics/capabilities are satisfied by more than one potential redistribution target in a redistribution pool, the potential redistribution target that satisfies the most secondary redistribution characteristics/capabilities may be selected as the redistribution target (this is true for Optimal Failover Redeployment redistribution types as well).

FIG. 6B6 illustrates BCHA Control module redistribution of App_5/work item 5_1 and App_6/work item 6_1 from failed computing resource CR-4, onto selected redistribution targets with App_5/work item 5_1 shifting to CR-3 and App_6/work item 6_1 being instantiated and on CR-5 to execute work item 6-1, respectively. For this example, the BCHA Controller redeployed the system by developing a redistribution pool from existing M:N working configuration resource.

In some implementations, in order to ensure the BCHA system 200 continued operation using existing BCHA system components within an M:N working configuration, the BCHA Controller 215 may temporarily/indefinitely suspend non-critical BCHA applications. For example, in an alternative embodiment illustrated FIG. 6B7, changes a few of the capabilities/characteristics associated with the example embodiment described in FIGS. 6B1-6B6. More specifically, in the example illustrated in FIG. 6B6, CR-4, App_6 has a redistribution capability/characteristic requirement that does not make a redeployment to CR-5 viable. For example, CR-4, App may have an I/O sensor input requirement that is not connected to CR-5. Instead, in the example, CR-2 is the only other BCHA computing resource 240/250 that meets the I/O sensor input requirement at the time of the failure of CR-4 for the M:N working configuration. Accordingly, as described in the example embodiment described in FIGS. 6B1-6B6, CR-2 was excluded from the Redistribution target pool based on processor/load requirement where the computing resources 240/250 cannot execute more than three BCHA applications at a given time. However, in this example, the BCHA application IO requirement in coordination with the App_6 has an application priority of 3, whereas App_4 has having an application priority of 6. BCHA applications can also be tagged as Critical or Non-critical, which is a key parameter in determining whether a BCHA application 268 can temporarily/indefinitely suspended to create processor load availability and accommodate redistribution elements. In FIG. 6B7, App_4 is temporarily suspended, which creates processor load availability to accommodate a redeployment of FAILED App_6.

Once the redistribution elements have been redeployed to the selected targets and are active, the BCHA Controller 215 executes a remediation state determination to verify whether even though BCHA redistribution elements have been redeployed and are active, the BCHA system availability requirements have been maintained. If the remediation operational state (illustrated in FIG. 5B2) is Green, BCHA system goals of (1) maintaining system operational, (1A) using only the existing BCHA system components to facilitate Resource Failure Redistribution; and (1B) maintain BCHA system High Availability Requirements have all been met. If the remediation operational state is not Green, the BCHA system may have achieved only (1) if the state is Red or (1) and (1A) if the state is Orange or Yellow. In any event, if the remediation operational state is not Green, the BCHA Control module may need to request BCHA supplemental/additional resources to execute a transition back to a Green operational state where (1), (1A) and (1B) are all satisfied.

In FIG. 6B8, the BCHA Control module 215 determines through remediation state determination whether each application executing has the required High Availability by analyzing the High Availability Requirement for the particular BCHA application and adding the computing resource—Availability characteristics for each computing resource executing an Active/Inactive instance of the particular BCHA application. In the illustrated example, APP_1 has a High Availability requirement set to 0.999999; and App-1 is executing on two discrete BCHA computing resources 240/250, specifically CR-1 and CR-2. Accordingly, the BCHA system 200 meets App_1 High Availability Requirements despite the Failure of computing resource CR-4 and redeploying redistribution element using only existing computing resources 240/250 selected from the M:N working configuration. The BCHA Control module 215 iteratively checks the High Availability Requirement for each BCHA application 268 (in the example in FIGS. 6A-6B for App 1-App7). If the verification is negative—for example App_5 has a High Availability Requirement of 0.99999 and was redeployed to CR-3 which has a High Availability characteristic of 0.9999. The App_5 high availability requirement of 0.99999 is no longer Green state, because of the failure of CR-4. When CR-4 was "Online," CR-4's High Availability characteristic of 0.99999 was sufficient to meet App_5's High Availability Requirement. However, Resource Failure Detection remediation state determination demonstrates that BCHA system goals (1) and (1A) have been met, 1B fails because if at least one BCHA application 268 High Availability Requirement is not met, BCHA system High Availability Requirement also fail.

It is to be understood examples used herein are intended to illustrate various features/functionality associated with BCHA system load-balancing (both Resource Failure detection load balancing and Active Load Balancing). There may be other methodologies that can be used or implemented by the BCHA system to calculate High Availability Requirements/determining High Availability Compliance. Furthermore, it is to be understood that the addition of BCHA computing resource 240/250 High Availability characteristics and comparison with an BCHA applications High Availability is just is one non-limiting example of calculating High Availability Requirements/determining High Availability Compliance—other BCHA system operational parameter calculations are possible and may be used in coordination with the BCHA system components in similar ways to those described herein to achieve BCHA system Goals of (1), (1A) and (1B).

The High Availability Compliance failure discussed with regard to FIG. 6B8 is an example of a Failure that would have been identified and remediated by BCHA Active Load Balancing described with Regard to FIG. 5C. In the context of FIG. 6B8, with Z degree validation setting of 1, the BCHA Controller 215 would have iterated through simulations failing each of CR-1, CR-2, CR-3, CR-4, and CR-5 during the Execution Timeline 699—State 1 "Green" while all BCHA computing resources were Online, prior to CR-4's actual Failure. After simulating Resource Failure Detection Redistributions for CR-1, CR-2, CR-3, the BCHA Controller 215 would simulate CR-4's Failure and identified—a Remediation Operational State of Yellow due to App_5 High Availability Requirement noncompliance with App_5's 0.9999 High Availability requirements in view of the loss of CR-4's 0.99999 High Availability Characteristic. In accordance with FIG. 5C's step 595, the BCHA Control module develops the M:N Working configuration validation report and in this example would identify App_5's High Availability Requirement non-compliance (as well as any other non-compliance issues for the other BCHA applications based on the iterative BCHA computing resource failure simulations). In addition to generating the report, the BCHA Control module can generate requests for additional BCHA computing resources to remediate any High Availability Requirement non-compliance and/or M:N working configuration non-compliance. Such remediation would involve a transition plan to shift from M:N+R working configuration back to a viable, Green state M:N working configuration where all High Availability Requirements are satisfied.

FIG. 7A illustrates a flow diagram illustrating aspects of how the BCHA Control module 215 transitions from non-Green Remediation Operational State to a Green Remediation Operational State based on supplemental/additional computing resource 240/250 requests developed based on (a) the Control module not having enough redistribution potential targets to generate a viable redistribution pool; or (b) the resulting Report generated by Z-Degree HA-M:N Validation Load-Balancing to achieve working Configuration validation. In step 700, the BCHA Control module 215 identifies a non-Green Remediation Operational State and determines the minimum BCHA computing resource Capabilities/Characteristics to transition the remediation operational state back to Green state and achieve a M:N working configuration that also complies with BCHA system 200 an BCHA application 268 High Availability Requirements. In some instances the BCHA system may executed auto-remediation to obtain the appropriate BCHA computing resources 240/250.

Depending on the implementation, minimum BCHA computing resource capabilities/characteristics to transition to Green state operational may be derived from the validation report generated by Z-Degree Active Load Balancing or includes with a Supplemental/Additional Resource request generated during Resource Failure Detection Load Balancing. In some implementations, in step 706, the BCHA Control module 215 includes Supplemental/Additional BCHA computing resource request information that is included and is not necessarily required to facilitate the transition to Green state operation, instead the Supplemental/Additional BCHA computing resource request information may facilitate providing a more robust M:N working configuration. Supplemental/Additional BCHA computing resource request information may be generated and derived from the computing resources failure simulations executed during Z-Degree Live Load Balancing/M:N Working Configuration validation. In step 709, the computing resource request(s) can be combined into a single request or the requests for minimal computing resource request to facilitate Green state transition may be issued separately from the supplemental/additional BCHA computing resource request. In step 715, the BCHA Commissioning module 210 and the BCHA Control module 215 work together to provision any requested BCHA hardware resource starting points that are provided in step 712 into Online BCHA computing resources 240/250. In step, 718 the BCHA Control module 215 redeploys the appropriate BCHA applications 268 and corresponding BCHA work items 270 to facilitate transition back to the Green State. The BCHA Control module determines if any Supplemental/Additional BCHA have also been provided beyond the minimum requested resource in step 721 that can be used for additional system utilization or operational as a more robust M:N working configuration. In step 724, the BCHA Control module instantiates BCHA applications to facilitate a more robust M:N working configuration. In step 727, the BCHA Control module conducts a post-transition operational state validation and loops back to step 700 if any issues are identified. The BCHA Control module 215 shifts into monitoring BCHA system health/operational data and executing Active Load Balancing in step 730.

The operational diagram illustrated in FIG. 7B illustrates a requested, fully provisioned BCHA computing resource 240/250 as CR-6 735. In this example, the BCHA Control module 215 identified a redistribution element capability/characteristic requirement involving an I/O connection for App_6 that was previously executing on Failed CR-4. In contrast to the example above in 6B8, where CR-2 met the redistribution element capability/characteristic requirement, in this example only Failed CR-4 complied. Accordingly, as part of the Resource Failure Detection Load Balancing initiated by the BCHA Control module 215, the BCHA Control module 215 recognized the current M:N working configuration could not comply and immediate issued a request for supplemental/additional computing resource 240/250 to comply with the requirement.

In the example of FIG. 7B, based on Active Load Balancing, the BCHA Control module 215 also requested supplemental/additional computing resource to ensure robust green state, M:N working configuration. Specifically, conducting Z=1 degree Active Load Balancing, the BCHA Control module 215 identified an opportunity to facilitate more robust green state, operation requesting BCHA computing resource that has a 0.99999 High Availability Characteristic so that App_1, App_2 and App_3 would have a viable failover target should App_3 (also with a 0.99999 application Availability requirement) need a computing resource if fully loaded CR-1 fail. FIG. 7C illustrates the additional CR-6 BCHA computing resource as it is deployed corresponding to the operational diagram of FIG. 7B

In some embodiments, the BCHA Control module 215 may use aspects of the reliability monitor metrics to facilitate system load balancing. For example, the reliability engine module can use capability, characteristics as redistribution constraints (e.g., an OS requirement for a particular BC application, application element and/or work item type) to:
  (i) Determine the number of resources required to run all applications.
  (ii) Determine the required system availability for various applications with different OS requirements. This can be calculated for the whole process or process segments such as units, trains and equipment.
  (iii) Determine what applications are critical to the process or for running a plant. If a critical application stops and is not restarted on an alternate resource, then the safety system can terminate the process to put the plant into a safe state.
  (iv) Determine the required criticality for every BC application.
  (v) Determine what applications constraints are (e.g., two control applications may be required to run on the same resource).

These are some examples/of different load balancing/availability management metrics may be monitored by the reliability engine. Working with the High Availability Controller to dynamically coordinate computing resources/application/work item management, these modules can help ensure efficient, effective, system operational parameters and work to achieve target availability metrics for a system.

Based on one or more of the above determinations, the BCHA control 120 working in coordination with reliability monitor 115 can compute the availability of the system and facilitate load balancing optimizations. For example, the high availability controller 120/reliability monitor 115 can, in the event of machine failure or resource limited states, temporarily or switch off a noncritical or least critical application (e.g., optimization control application) so that the available compute power can be used to run the critical control application(s). The high availability controller 120/reliability monitor 115 can achieve this failover quickly without triggering the process termination/safety system. By way of another example, the high availability controller 120/reliability monitor 115 can use the available or regained computing resource/availability (or additional/supplemental provided resources (e.g., once a machine comes back online) to re-distribute move and restart a critical application taking into account potential action by the safety system (e.g., shutdown action). In some embodiments, the reliability monitor can also spread BC application instance work items across multiple BC resources to manage resource loadings.

In some embodiments, various system metrics for the BCHA system 200 can be computed in real time. These system metrics can be indicative of the BCHA system 200 reliability and/or availability. In some embodiments, the BCHA system 200 metrics can also be communicated to a user (e.g., to a client device, human machine interface). Examples of the BCHA system 200 metrics include, but are not limited to:
  (a) Number of hardware and resources necessary to run all applications at a desired or required availability.
  (b) Number of machines required to run applications above a specified criticality.
  (c) High Availability number (HAN), a key performance indicator (KPI) indicating the overall availability of the system, as well as BCHA system Operational metrics including:
    i. The actual availability of the BCHA system 200 based on the currently available BCHA computing resources 240/250 and the active BCHA applications 268.
    ii. Number of failed BCHA computing resources 240/250.
    iii. Number of running BCHA application(s) 268 and their criticality and/or priority.
    iv. Number of inactive BCHA application(s) 268 and their criticality and/or priority.
    v. Lost revenue due to inactivity of noncritical BCHA application(s) 268.
    vi. Number of additional BCHA computing resources 240/250 to be provisioned to run every BCHA application 268.
    vii. Change in overall BCHA system 200 reliability and availability if BCHA computing resources 240/250 were added or removed from the pool of available BCHA computing resources 240/250.

Computer Systemization

BCHA system components may include a physical machine or physical computer hardware ("computer system") within which a set of instructions for causing the computer system to perform any one or more of the methodologies discussed herein can be executed will now be discussed. Software or firmware for use in the BCHA system facilitating the features and/or functionality discussed in the Figures and described here may be stored on a machine-readable storage medium and may be executed by one or more general-purpose or special purpose programmable microprocessors.

The computer system can include a processor, main memory, non-volatile memory, and an interface device. Various common components (e.g., cache memory) are omitted for simplicity. The computer system is intended to illustrate a hardware device on which any of the components and methodologies described in this specification can be implemented. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor, a single-core processor or any multi-core processor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not described herein can reside in the interface.

In operation, the computer system can be controlled by operating system software that may include a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments of the disclosed technology have been described herein for purposes of illustration, but that various modifications may be made without deviating from the spirit and scope of the embodiments.

The invention claimed is:

1. A system for dynamically load-balancing at least one redistribution element across a group of computing resources that facilitate at least a portion of an Industrial Execution Process structured in an M:N working configuration, comprising: a system configured to:
monitor a M:N working configuration component operational data, capabilities or characteristics associated with the M:N working configuration; detect a load-balancing opportunity to initiate redistribution of at least one redistribution element to a redistribution target selected from a redistribution target pool defined by remaining M computing resource components associated with the M:N computing resource working configuration; fail to identify at least one redistribution target from the redistribution target pool for redeployment of the at least one redistribution element; request supplemental M:N working configuration computing resource redeploy the at least one redistribution element to the supplemental M:N working configuration computing resource as a redistribution target; and determine viable redeployment of the at least one redistribution element to the at least one supplemental M:N working configuration computing resource redistribution target.

2. The system for dynamically load-balancing the at least one redistribution element of claim 1, further comprising: facilitating redeployment when the load-balancing opportunity involves Resource Failure Detection load balancing.

3. The system of claim 2, wherein the at least one redistribution element is associated with a failed M:N working configuration component/computing resource.

4. The system of claim 3, wherein the least one redistribution element is an Application executing on the failed M:N working configuration component/computing resource.

5. The system of claim 3, wherein the least one redistribution element includes an Application and a corresponding Work Item executing on the failed M:N working configuration component/computing resource.

6. The system of claim 3, wherein the operational data, capabilities or characteristics associated with the at least one redistribution element are compared with operational data, capabilities and characteristics associated with redistribution target pool components.

7. The system of claim 6, further comprising: generating a minimum set of requested M:N working configuration component/computing resource capabilities and characteristics based on the at least one redistribution element.

8. The system of claim 7, further comprising: generating an optimal set of requested M:N working configuration component/computing resource capabilities and characteristics based on the M:N working configuration resource capabilities and characteristics.

9. The system of claim 3, wherein the least one redistribution element is associated with an Active M:N working configuration component.

10. The system of claim 1 further comprising: executing remediation operational state determination to determine viable redeployment that maintains M:N working configuration integrity.

11. The system of claim 10, further comprising: maintaining M:N working configuration High Availability Requirements.

12. The system of claim 10, wherein M:N working configuration integrity is maintained and at least one M:N working configuration component Application or Work Item is suspended to maintain M:N working configuration integrity.

13. The system of claim 1 further comprising: executing remediation operational state determination to determine viable redeployment; and determining M:N working configuration integrity has not been maintained.

14. The system of claim 9, further comprising: generating a supplemental M:N working configuration component request that indicates the minimal supplement component requirements necessary to transition back to a viable M:N working configuration.

15. The system of claim 1, further comprising: facilitating redeployment where the load-balancing opportunity involves Component Failure Simulation Validation.

16. The system of claim 15, further comprising: simulating iteratively M:N working configuration component failure for each component in a M:N working configuration.

17. The system of claim 15, further comprising: executing a Z Validation Degree computing resource failure simulation, wherein Z is greater than or equal to 1; and validating the M:N working configuration with supplemental M:N working configuration resource is robust.

18. The system of claim 15, further comprising: generating a robust M:N working configuration remediation supplemental M:N+R working configuration component/computing resource request to facilitate transitioning to a robust M:N working configuration.

19. The system of claim 5, further comprising: activating redistributed elements along with corresponding application or work item operational data stored in a data services module at or near the time of the computing resource failure.

20. A method for dynamically load-balancing at least one redistribution element across a group of computing resources that f facilitate at least a portion of an Industrial Execution Process structured in a M:N working configuration comprising: monitoring a M:N working configuration component operational data, capabilities or characteristics associated with the M:N working configuration; detecting a load-balancing opportunity to initiate redistribution of at least one redistribution element to a redistribution target selected from a redistribution target pool defined by remaining M computing resource components associated with the M:N computing resource working configuration; failing to identify at least one redistribution target from the redistribution target pool for redeployment of the at least one redistribution element; requesting supplemental M:N working configuration computing resource; redeploying the at least one redistribution element to the supplemental M:N working configuration computing resource as a redistribution target; and determining viable redeployment of the at least one redistribution element to the at least one supplemental M:N working configuration computing resource redistribution target.

21. The method for dynamically load-balancing the at least one redistribution element of claim 20, further comprising: facilitating redeployment when the load-balancing opportunity involves Resource Failure Detection load balancing.

22. The method of claim 21, wherein the at least one redistribution element is associated with a failed M:N working configuration component/computing resource.

23. The method of claim 22, wherein the least one redistribution element is an Application executing on the failed M:N working configuration component/computing resource.

24. The method of claim 22, wherein the least one redistribution element includes an Application and a corresponding Work Item executing on the failed M:N working configuration component/computing resource.

25. The method of claim 22, wherein the operational data, capabilities or characteristics associated with the at least one redistribution element are compared with operational data, capabilities and characteristics associated with redistribution target pool components.

26. The method of claim 25, further comprising: generating a minimum set of requested M:N working configuration component/computing resource capabilities and characteristics based on the at least one redistribution element.

27. The method of claim 26, further comprising: generating an optimal set of requested M:N working configuration component/computing resource capabilities and characteristics based on the M:N working configuration resource capabilities and characteristics.

28. The method of claim 22, wherein the least one redistribution element is associated with an Active M:N working configuration component.

29. The method of claim 20 further comprising: executing remediation operational state determination to determine viable redeployment that maintains M:N working configuration integrity.

30. The method of claim 29, further comprising: maintaining M:N working configuration High Availability Requirements.

31. The method of claim 29, wherein M:N working configuration integrity is maintained and at least one M:N working configuration component Application or Work Item is suspended to maintain M:N working configuration integrity.

32. The method of claim 20 further comprising: executing remediation operational state determination to determine viable redeployment; and determining M:N working configuration integrity has not been maintained.

33. The method of claim 28, further comprising: generating a supplemental M:N working configuration component request that indicates the minimal supplement component requirements necessary to transition back to a viable M:N working configuration.

34. The method of claim 20, further comprising: facilitating redeployment where the load-balancing opportunity involves Component Failure Simulation Validation.

35. The method of claim 34, further comprising: simulating iteratively M:N working configuration component failure for each component in a M:N working configuration.

36. The method of claim 34, further comprising: executing a Z Validation Degree computing resource failure simulation, wherein Z is greater than or equal to 1; and validating the M:N working configuration with supplemental M:N working configuration resource is robust.

37. The method of claim 34, further comprising: generating a robust M:N working configuration remediation supplemental M:N+R working configuration component/computing resource request to facilitate transitioning to a robust M:N working configuration.

38. The method of claim 24, further comprising: activating redistributed elements along with corresponding application or work item operational data stored in a data services module at or near the time of the computing resource failure.

39. A non-transitory computer readable medium storing sequences of computer-executable instructions for dynamically load-balancing at least one redistribution element across a group of computing resources that facilitate at least a portion of an Industrial Execution Process structured in an M:N working configuration, the sequences of computer-executable instructions including instructions that instruct at least one processor to: monitor a M:N working configuration component operational data, capabilities or characteristics associated with the M:N working configuration; detect a load-balancing opportunity to initiate redistribution of at least one redistribution element to a redistribution target selected from a redistribution target pool defined by remaining M computing resource components associated with the M:N computing resource working configuration; fail to identify at least one redistribution target from the redistribution target pool for redeployment of the at least one redistribution element; request supplemental M:N working configuration computing resource;

redeploy the at least one redistribution element to the supplemental M:N working configuration computing resource as a redistribution target; and determine viable redeployment of the at least one redistribution element to the at least one supplemental M:N working configuration computing resource redistribution target.

* * * * *